United States Patent
Yeo et al.

(10) Patent No.: US 12,556,302 B2
(45) Date of Patent: *Feb. 17, 2026

(54) METHOD AND APPARATUS FOR TRANSMISSION OR RECEPTION OF DATA IN COMMUNICATION SYSTEM

(71) Applicant: Samsung Electronics Co., Ltd., Suwon-si (KR)

(72) Inventors: Jeongho Yeo, Suwon-si (KR); Seho Myung, Suwon-si (KR); Yongok Kim, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 386 days.

This patent is subject to a terminal disclaimer.

(21) Appl. No.: 18/346,564

(22) Filed: Jul. 3, 2023

(65) Prior Publication Data

US 2023/0370195 A1 Nov. 16, 2023

Related U.S. Application Data

(63) Continuation of application No. 16/793,499, filed on Feb. 18, 2020, now Pat. No. 11,695,506.

(30) Foreign Application Priority Data

| Feb. 15, 2019 | (KR) | 10-2019-0018093 |
| Feb. 26, 2019 | (KR) | 10-2019-0022813 |
| Apr. 5, 2019 | (KR) | 10-2019-0040464 |

(51) Int. Cl.
*H04L 27/36* (2006.01)
*H04L 1/00* (2006.01)
(Continued)

(52) U.S. Cl.
CPC .......... *H04L 1/0061* (2013.01); *H04L 1/0003* (2013.01); *H04L 1/0013* (2013.01);
(Continued)

(58) Field of Classification Search
CPC ...... H04W 4/50; H04W 80/08; H04L 5/0053; H04L 5/0044; H04L 5/0092;
(Continued)

(56) References Cited

U.S. PATENT DOCUMENTS 10,944,508 B2 * 3/2021 Zheng ............... H03M 13/6362
2017/0070978 A1 3/2017 Davydov et al.
(Continued)

FOREIGN PATENT DOCUMENTS

WO 2019/027185 A1 2/2019

OTHER PUBLICATIONS

Qualcomm Incorporated; UE capability for Maximum channel bandwidth; 3GPP TSG-RAN WG2 Meeting #102; R2-1807109; Busan, South Korea; May 21-25, 2018; May 10, 2018.
(Continued)

*Primary Examiner* — Phong La
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and apparatus according to an embodiment may allow a terminal or a base station to configure parameters for supporting limited buffer rate matching
(Continued)

(LBRM) by using higher layer signaling or enable a suitable configuration to be made in a case of not configuring parameters for supporting the LBRM using the higher layer signaling.

20 Claims, 27 Drawing Sheets

(51) Int. Cl.
*H04L 1/1829* (2023.01)
*H04L 5/00* (2006.01)
*H04W 80/08* (2009.01)

(52) U.S. Cl.
CPC .......... *H04L 1/1835* (2013.01); *H04L 5/0092* (2013.01); *H04L 27/362* (2013.01); *H04W 80/08* (2013.01)

(58) Field of Classification Search
CPC ... H04L 1/0016; H04L 1/0013; H04L 1/1835; H04L 1/0003; H04L 1/0061; H04L 1/1819; H04L 1/1874; H04L 1/0057
See application file for complete search history.

(56) References Cited

U.S. PATENT DOCUMENTS

| | | | |
|---|---|---|---|
| 2017/0207878 | A1 | 7/2017 | Chen et al. |
| 2018/0035409 | A1* | 2/2018 | Chmiel ................ H04L 1/1835 |
| 2018/0242288 | A1* | 8/2018 | Kim ...................... H04W 72/23 |
| 2019/0013901 | A1 | 1/2019 | Nimbalker et al. |
| 2019/0141647 | A1* | 5/2019 | Nimbalker ............ H04L 5/0048 |
| 2019/0149365 | A1* | 5/2019 | Chatterjee ............ H04W 76/11 370/329 |
| 2020/0106547 | A1 | 4/2020 | Wu et al. |
| 2020/0112965 | A1* | 4/2020 | Kim ...................... H04L 5/0064 |
| 2020/0236587 | A1 | 7/2020 | Kim et al. |
| 2020/0304235 | A1* | 9/2020 | Li ......................... H04L 1/0071 |
| 2021/0014167 | A1 | 1/2021 | Feng et al. |
| 2021/0218493 | A1 | 7/2021 | Chen et al. |
| 2021/0234628 | A1 | 7/2021 | Nakamura et al. |

OTHER PUBLICATIONS

Chinese Notice of Allowance with English translation dated Jul. 12, 2024; Chinese Appln. No. 202080006093.2.
Australian Office Action dated Aug. 22, 2024; Australian Appln. No. 2020221134.
3rd Generation Partnership Project; Technical Specification Group Radio Access Network; NR; Multiplexing and channel coding (Release 15), 650 Route des Lucioles—Sophia Antipolis Valbonne—France, 3GPP TS 38.212 V15.4.0 (Dec. 2018).
3rd Generation Partnership Project; Technical Specification Group Radio Access Network; NR; User Equipment (UE) radio access capabilities (Release 15), 650 Route des Lucioles—Sophia Antipolis Valbonne—France, 3GPP TS 38.306 V15.4.0 (Dec. 2018).
European Office Action dated Jan. 3, 2023, issued in European Application No. 20755970.9.
Intel Corp.; "Discussion on standardization impacts of UL 256QAM"; 3GPP TSG-RAN WG1 #84bis; R1-163696; Apr. 18, 206, Busan, Korea.
Intel Corporation "Soft buffer management for NR", 3GPP TSG RAN WG1 Meeting #91, R1-1720098, Nov. 18, 2017, Reno, USA, Nov. 27-Dec. 1, 2017.
Huawei et al: "Soft Buffer Dimensioning", 3GPP TSG-RAN, WG4 Meeting #86, R4-1802860, Athens, Greece, Feb. 26-Mar. 2, 2018.
European Search Report dated Oct. 19, 2021, issued in European Application No. 20755970.9.
3GPP; TSG RAN; NR; "Physical layer procedures for data (Release 15)", 3GPP TS 38.214 V15.4.0, Jan. 11, 2019.
International Search Report dated Jun. 1, 2020, issued in International Application No. PCT/KR2020/002216.
Canadian Office Action dated Jan. 15, 2025; Canadian Appln. No. 3,119,323.
Intel Corporation; NR Scheduling and HARQ Procedures; 3GPP TSG RAN WG1 Meeting #94; R1-1809731; Gothenburg, Sweden; Aug. 20-24, 2018.
Korean Office Action with English translation dated Dec. 11, 2023; Korean Appln. No. 10-2019-0040464.
Extended European Search Report dated May 7, 2025; European Appln. No. 25151662.1-1206 / 4518269.
Indian Office Action dated Jul. 15, 2025; Indian Appln. No. 202137034411.
Indian Office Action dated Jul. 7, 2023, issued in Indian Application No. 202137034411.
Chinese Office Action with English translation dated Nov. 8, 2023; Chinese Appln. No. 202080006093.2.

* cited by examiner (a) CHANNEL CODING BLOCK DIAGRAM IF OUTER CODE IS NOT USED (600)

(B) CHANNEL CODING BLOCK DIAGRAM IF OUTER CODE IS USED (650)

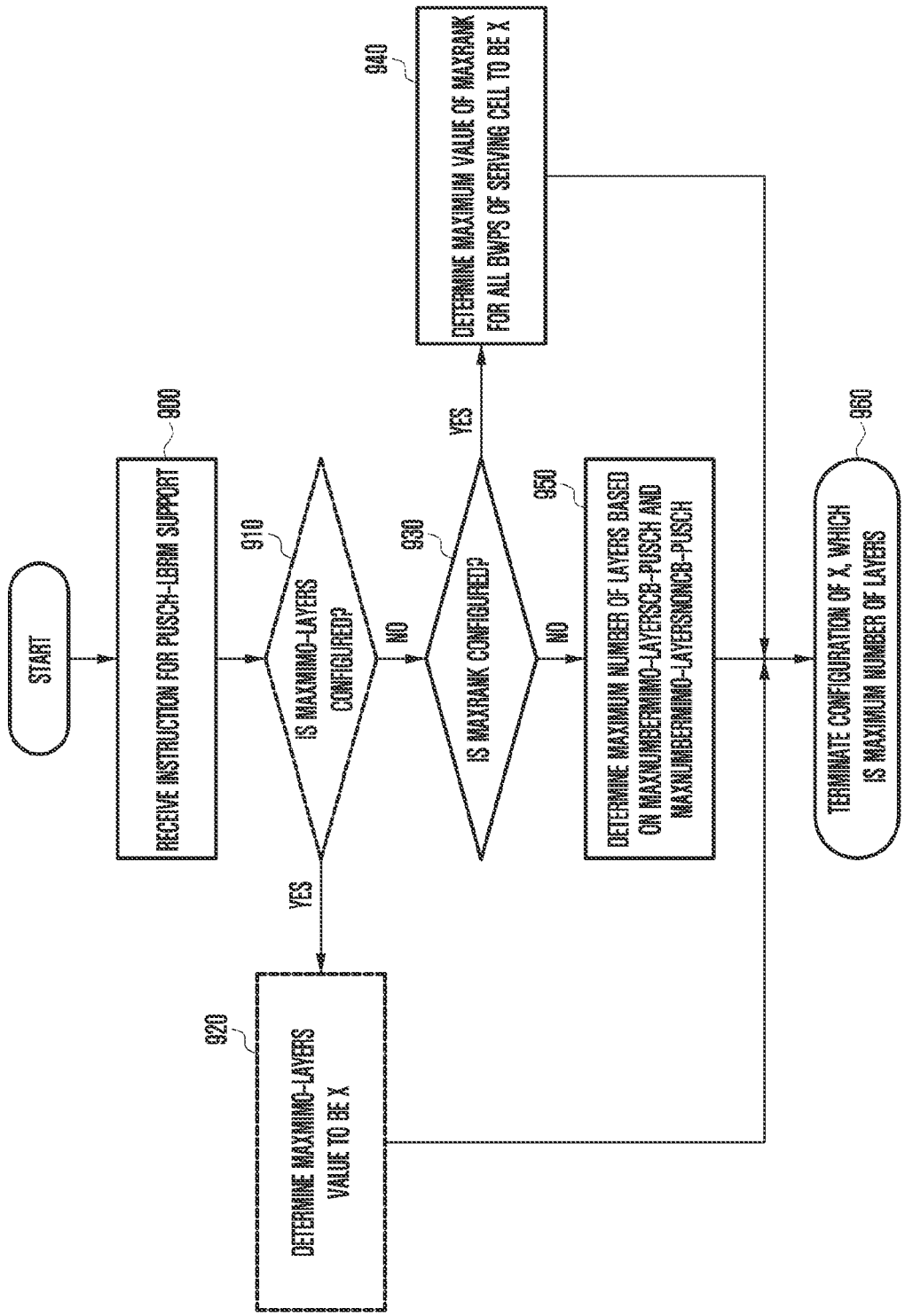

METHOD AND APPARATUS FOR TRANSMISSION OR RECEPTION OF DATA IN COMMUNICATION SYSTEM

CROSS-REFERENCE TO RELATED APPLICATION(S)

This application is a continuation application of prior application Ser. No. 16/793,499 filed on Feb. 18, 2020, which has issued as U.S. Pat. No. 11,695,506 on Jul. 4, 2023, which is based on and claims priority under 35 U.S.C. § 119(a) of Korean patent application number 10-2019-0018093 filed on Feb. 15, 2019 in the Korean Intellectual Property Office, Korean patent application number 10-2019-0022813 filed on Feb. 26, 2019 in the Korean Intellectual Property Office and Korean patent application number 10-2019-0040464 filed on Apr. 5, 2019 in the Korean Intellectual Property Office, the disclosure of each of which is incorporated by reference herein in its entirety.

BACKGROUND

1) Field

The disclosure relates to a communication system. More particularly, the disclosure relates to a method and apparatus for scheduling and transmitting or receiving data according to an amount of data or a data rate, which can be processed by a terminal.

2) Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart homes, smart buildings, smartcities, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to effectively transmit data in an NR system, a low-density parity-check code (LDPC) may be applied. In addition, there are two methods of transmitting parity bits generated by LDPC coding. A method for allowing all parity bits generated by LDPC coding to be transmitted may be referred to as full buffer rate matching (FBRM) and a method for limiting the number of parity bits that can be transmitted may be referred to as limited buffer rate matching (LBRM).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for configuring LBRM-related parameters in order to effectively perform LBRM on uplink data or downlink data, or suitably configuring LBRM parameters if parameters are not configured.

Additional aspects will be set forth in part in the description which follows and, in part, will be apparent from the description, or may be learned by practice of the presented embodiments.

In accordance with an aspect of the disclosure, a method performed by a base station in a communication system is provided. The method includes identifying that a downlink limited buffer rate matching (LBRM) is applied, encoding information bits to be transmitted to a terminal using a low-density parity-check code (LDPC), identifying a length of a circular buffer $N_{cb}$ based on a transport block size (TBS) for the downlink LBRM, determining a bit sequence based on the $N_{cb}$ and the encoded information bits, and transmitting, to the terminal, the bit sequence, wherein the TBS for the downlink LBRM is identified based on a downlink maximum modulation order, and wherein the downlink maximum modulation order is identified as either 8 or 6 according to a higher layer signaling.

In accordance with another aspect of the present disclosure, a method performed by a terminal in a communication system is provided, the method includes identifying that a downlink limited buffer rate matching (LBRM) is applied; identifying a length of a circular buffer Ncb for receiving information bits from a base station based on a transport block size (TBS) for the downlink LBRM; receiving, from the base station, downlink data signal; and obtaining information bits associated with the downlink data signal based on the $N_{cb}$, wherein the TBS for the downlink LBRM is identified based on a downlink maximum modulation order, and wherein the downlink maximum modulation order is identified as either 8 or 6 based on based on bandwidth part (BWP) configuration in higher layer signaling.

In accordance with another aspect of the present disclosure, a base station in a communication system is provided. The base station includes a transceiver; and at least one processor configured to: identify that a downlink limited buffer rate matching (LBRM) is applied, encode information bits to be transmitted to a terminal using a low-density parity-check code (LDPC), identify a length of a circular buffer Ncb based on a transport block size (TBS) for the downlink LBRM, determine a bit sequence based on the $N_{cb}$ and the encoded information bits, and transmit, to the terminal via the transceiver, the bit sequence, wherein the TBS for the downlink LBRM is identified based on a downlink maximum modulation order, and wherein the downlink maximum modulation order is identified as either 8 or 6 based on based on bandwidth part (BWP) configuration in higher layer signaling.

In accordance with another aspect of the present disclosure, a terminal in a communication system is provided. The terminal includes a transceiver; and at least one processor configured to: identify that a downlink limited buffer rate matching (LBRM) is applied, identify a length of a circular buffer Ncb for receiving information bits from a base station based on a transport block size (TBS) for the downlink LBRM, receive, from the base station via the transceiver, a downlink data signal, and obtain information bits associated with the downlink data signal based on the $N_{cb}$, wherein the TBS for the downlink LBRM is identified based on a downlink maximum modulation order, and wherein the downlink maximum modulation order is identified as either 8 or 6 based on bandwidth part (BWP) configuration in higher layer signaling.

According to the disclosure, LBRM can be effectively performed by configuring LBRM-related parameters suitable for uplink data or downlink data.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates a terminal operation for supporting PUSCH-LBRM according to an embodiment of the disclosure;

Throughout the drawings, like reference numerals will be understood to refer to like parts, components, and structures.

DETAILED DESCRIPTION

Figure 1:
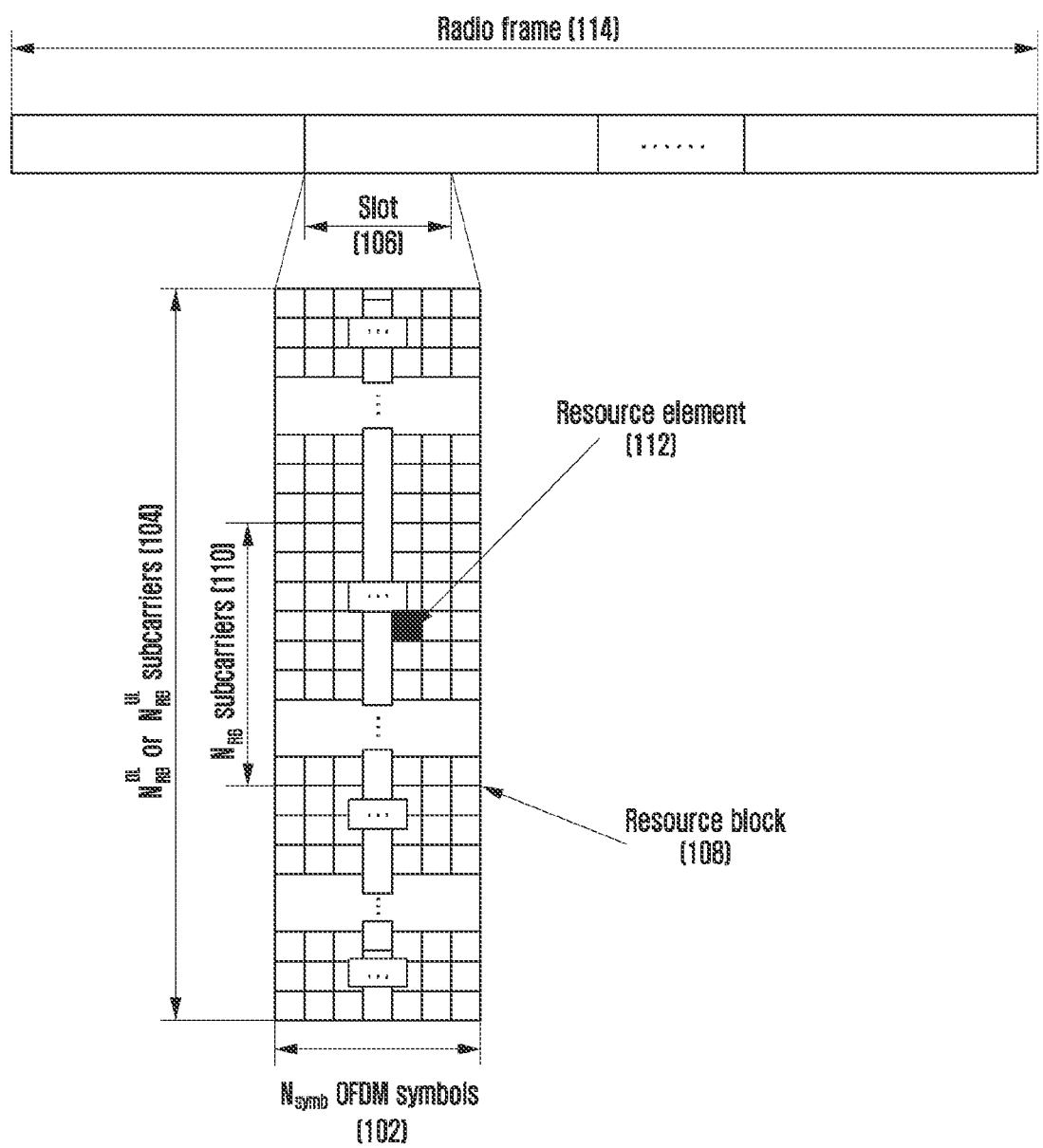
FIG. 1 illustrates a basic structure of a time-frequency domain, which is a radio resource region in which data or a control channel is transmitted in downlink or uplink of an NR system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

New radio access technology (NR), which is new 5G communication, is designed in order to allow various services to be freely multiplexed in time and frequency resources. Accordingly, a waveform/numerology, a reference signal, and the like may be dynamically or freely allocated according to the needs of a corresponding service. In order to provide an optimized service to a terminal in wireless communication, optimized data transmission through channel quality and interference amount measurement is important, and therefore accurate channel state measurement is essential. However, unlike 4G communication, in which channel and interference characteristics do not change greatly according to a frequency resource, in a case of 5G channels, the channel and interference characteristics may change greatly depending on a service. Accordingly, it is required to support subsets of frequency resource group (FRG), which can separately measure 4G and 5G channels. On the other hand, in the NR system, types of supported services can be divided into categories, such as enhanced mobile broadband (eMBB), massive machine type communications (mMTC), ultra-reliable and low-latency communications (URLLC), and the like. The eMBB may be a service for high-speed transmission of high-capacity data, the mMTC may be a service that aims to minimize the power of a terminal and access a plurality of terminals, and the URLLC may be a service that aims at high reliability and low latency. Different requirements may be applied depending on the type of service applied to the terminal.

Recently, with the development of research on a next-generation communication system, various schemes for scheduling communication with a terminal have been discussed. Accordingly, there is a need for an efficient scheduling and data transmission/reception scheme considering the characteristics of the next-generation communication system.

As such, a plurality of services may be provided to a user in a communication system, and thus a method capable of providing respective services within the same time interval according to a feature in order to provide the plurality of services to a user and an apparatus using the same may be required.

Hereinafter, embodiments will be described in detail with reference to the accompanying drawings.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the following embodiments and may be implemented in various different forms, and the embodiments are provided to make the disclosure perfect and completely inform those skilled in the art belonging to the disclosure of the scope of the disclosure and the disclosure is only defined by the scope of the claims. Throughout the specification, the same or like reference numerals designate the same or like elements.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational operations to be performed on the computer or other programming data processing apparatus to produce a computer implemented process such that the instructions that are executed on the computer or other programmable apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements divided into a larger number of elements. Moreover, the elements and "units" may be implemented to reproduce one or more CPUs within a device or a security multimedia card. Also, in an embodiment, the "~unit" may include one or more processors.

A wireless communication system has developed to be a broadband wireless communication system that provides a high speed and high quality packet data service, like the communication standards, for example, high speed packet access (HSPA), long term evolution (LTE) or evolved universal terrestrial radio access (E-UTRA), and LTE-advanced (LTE-A) of 3GPP; high rate packet data (HRPD) and ultra-mobile broadband (UMB) of 3GPP2; and 802.16e of IEEE, beyond the voice-based service provided at the initial stage. Also, communication standard of 5G or new radio (NR) is being developed into a 5G wireless communication system.

As a representative example of a broadband wireless communication system, an orthogonal frequency division multiplexing (OFDM) scheme is adopted in downlink (DL) and uplink of an NR system. A cyclic-prefix OFDM (CP-OFDM) scheme is adopted for the downlink, and two schemes of a discrete Fourier transform spreading OFDM (DFT-S-OFDM) scheme together with the CP-OFDM scheme are adopted for the uplink. The uplink refers to a radio link through which a terminal (also referred to as a user equipment (UE) or a mobile station (MS) and may include a cellular phone, a smart phone, a computer, or a multimedia system capable of performing a communication function) transmits data or a control signal to a base station (also referred to as a gNode B or BS, and may be a subject that performs resource allocation of the terminal and may be one of a radio access unit, a base station controller, or a node on a network), and the downlink refers to a radio link through which a base station transmits data or a control signal to a terminal. In such a multiple access scheme, time-frequency resources for transmitting data or control information to each user are allocated and operated such that the time-frequency resources do not overlap each other, that is, orthogonality is established, to enable data or control information of each user to be distinguishable.

If decoding fails at the initial transmission, the NR system adopts a hybrid automatic repeat request (HARQ) scheme of retransmitting corresponding data in a physical layer. If a receiver fails to accurately decode data, the HARQ scheme allows the receiver to transmit information (negative acknowledgement (NACK)) notifying of decoding failure to a transmitter so as to allow the transmitter to retransmit the corresponding data in the physical layer. The receiver may combine data, which is retransmitted by the transmitter, with data, decoding of which has failed previously, to enhance data reception performance. Also, if the receiver accurately decodes data, the receiver transmits information (acknowledgement (ACK) information) notifying that decoding is successful to the transmitter so as to allow the transmitter to transmit new data.

FIG. 1 illustrates a basic structure of a time-frequency domain, which is a radio resource region in which data or a control channel is transmitted in the downlink or the uplink of an NR system according to an embodiment of the disclosure.

Referring to FIG. 1, a horizontal axis indicates a time domain, and a vertical axis indicates a frequency domain. The minimum transmission unit in the time domain is an OFDM symbol, and Nsymb number of OFDM symbols 102 may be collected to configure one slot 106. The length of the subframe may be defined by 1.0 ms, and the radio frame 114 may be defined by 10 ms. The minimum transmission unit in the frequency domain is a subcarrier, and the bandwidth of an entire system transmission bandwidth may be configured by a total $N_{RB}^{DL}$ or $N_{RB}^{UL}$ number of subcarriers 104.

In the time-frequency domain, the basic unit of resource is a resource element (RE) 112, and the RE may be expressed by an OFDM symbol index and a subcarrier index. A resource block (RB or Physical Resource Block (PRB)) 108 is defined by $N_{RB}$ number of consecutive subcarriers 110 in the frequency domain. In general, the minimum transmission unit of data is the unit of RB. In the NR system, in general, $N_{symb}$ is 14, NRB is 12, and $N_{RB}^{DL}$, $N_{RB}^{UL}$, and $N_{RB}$ are proportional to the bandwidth of a system transmission band. In addition, a data rate may increase in proportion to the number of RBs scheduled to a terminal.

In an FDD system in which downlink and uplink are divided by frequency and operated in the NR system, the downlink transmission bandwidth and the uplink transmission bandwidth may be different from each other. A channel bandwidth may indicate an RF bandwidth corresponding to a system transmission bandwidth. <Table 1> shows a correspondence between a system transmission bandwidth and a channel bandwidth defined in an LTE system, the fourth generation wireless communication, before the NR system. For example, in an LTE system having a channel bandwidth of 10 MHz, a transmission bandwidth may include 50 RBs.

TABLE 1

| Channel bandwidth BW$_{Channel}$ [MHz] | 1.4 | 3 | 5 | 10 | 15 | 20 |
|---|---|---|---|---|---|---|
| Transmission bandwidth configuration N$_{RB}$ | 6 | 15 | 25 | 50 | 75 | 100 |

The NR system may operate at a wider channel bandwidth than the channel bandwidth of LTE proposed in <Table 1>.

For example, the NR system may have a configuration as shown in <Table 2> and <Table 3>. <Table 2> describes the frequency axis resource configuration of frequency range 1 (FR1), and <Table 3> describes the frequency axis resource configuration of frequency range 2 (FR2).

TABLE 2

| SCS (kHz) | 5 MHZ $N_{RB}$ | 10 MHz $N_{RB}$ | 15 MHZ $N_{RB}$ | 20 MHz $N_{RB}$ | 25 MHz $N_{RB}$ | 30 MHz $N_{RB}$ | 40 MHZ $N_{RB}$ | 50 MHz $N_{RB}$ | 60 MHZ $N_{RB}$ | 80 MHz $N_{RB}$ | 90 MHz $N_{RB}$ | 100 MHz $N_{RB}$ |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

TABLE 3

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

The frequency range in the NR system may be divided and defined by FR1 and FR2, as in <Table 4> below.

TABLE 4

| Frequency range designation | Corresponding frequency range |
|---|---|
| FR1 | 450 MHz-6000 MHz |
| FR2 | 24250 MHz-52600 MHz |

In the above tables, the ranges of FR1 and FR2 may be differently applied. For example, the frequency range of FR1 can be changed from 450 MHz to 7125 MHz, and the range of FR2 can be changed if necessary.

In the NR system, scheduling information for downlink data or uplink data may be transmitted from a base station to a terminal through downlink control information (DCI). The DCI is defined according to various formats, and each format may be determined according to whether it is scheduling information (UL grant) for uplink data or scheduling information (DL grant) for downlink data, whether the DCI is a compact DCI having a small amount of control information, whether or not spatial multiplexing using multiple antennas is applied, and whether or not the DCI is for power control.

In a case of physical uplink shared channel (PUSCH) transmission, a time domain resource assignment included in DCI may be transmitted via information about a slot in which a PUSCH is transmitted, a start symbol position S in the corresponding slot, and the number L of symbols to which the PUSCH is mapped. S may be a relative position from the start of a slot, L may be the number of consecutive symbols, and S and L may be determined based on a start and length indicator value (SLIV) defined as follows.

if (L−1)≤7 then $$SLIV=14 \cdot (L-1)+S$$

else $$SLIV=14 \cdot (14-L+1)+(14-1-S)$$

where 0<L≤14−S

Generally, the NR system may receive, through RRC configuration, configuration of a table in which an SLIV value, a PDSCH, a PUSCH mapping type, and information on a slot in which the PDSCH and PUSCH are transmitted are included in one row. Subsequently, in the time domain resource assignment of the DCI, by indicating an index value in the table configured as above, a base station may transmit, to a terminal, the SLIV value, the PDSCH, PUSCH mapping type, and information on the slot in which the PDSCH and the PUSCH are transmitted.

In the NR system, the PUSCH mapping type is defined by type A and type B. In the PUSCH mapping type A, the first symbol among DMRS symbols is located at the second or the third OFDM symbol in a slot. In the PUSCH mapping type B, the first symbol among DMRS symbols is located at the first OFDM symbol in a time domain resource assigned via PUSCH transmission.

In the NR system, the PDSCH mapping type is defined by type A and type B, similar to that of PUSCH. <Table 5> and <Table 6> indicate a combination of S and L, which are supported for each type of the PDSCH and the PUSCH.

TABLE 5

| PDSCH mapping type | Normal cyclic prefix | | | Extended cyclic prefix | | |
|---|---|---|---|---|---|---|
| | S | L | S + L | S | L | S + L |
| Type A | {0, 1, 2, 3} (Note 1) | {3, . . . , 14} | {3, . . . , 14} | {0, 1, 2, 3} (Note 1) | {3, . . . , 12} | {3, . . . , 12} |
| Type B | {0, . . . , 12} | (2, 4, 7) | {2, . . . , 14} | {0, . . . , 10} | (2, 4, 6) | {2, . . . , 12} |

Note 1:
S = 3 is applicable only if dmrs-TypeA-Position = 3

TABLE 6

| PDSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

The DCI may be subjected to a channel coding and modulation process, and may then be transmitted through a physical downlink control channel (PDCCH) (or "control information", hereinafter used interchangeably), which is a downlink physical control channel.

Generally, the DCI is scrambled with a specific radio network temporary identifier (RNTI) (or a terminal identifier), independently for each terminal, a cyclic redundancy identify (CRC) is added thereto, and channel coding is performed, whereby each independent PDCCH is configured and transmitted. The PDCCH is mapped and transmitted in a control resource set (CORESET) configured for a terminal.

The downlink data may be transmitted through a physical downlink shared channel (PDSCH) serving as a physical channel for downlink data transmission. The PDSCH may be transmitted after a control channel transmission interval, and scheduling information, such as a specific mapping position and modulation scheme, in the frequency domain may be determined based on DCI transmitted through the PDCCH.

Through an MCS among control information included in the DCI, a base station may notify a terminal of a modulation scheme applied to a PDSCH to be transmitted, and the size (transport block size (TBS)) of data to be transmitted. In an embodiment, the MCS may be configured by 5 bits or more or fewer bits. The TBS corresponds to the size of data (transport block, TB) that the base station desires to transmit, before channel coding for error correction is applied to the data.

In the disclosure, a transport block (TB) may include a medium access control (MAC) header, a MAC control element (CE), one or more MAC service data units (SDUs), and padding bits. According to another embodiment, the TB may indicate the unit of data, which is dropped from a MAC layer to a physical layer, or a MAC protocol data unit (MAP PDU).

The modulation schemes supported by the NR system are quadrature phase shift keying (QPSK), 16 quadrature amplitude modulation (16 QAM), 64 QAM, and 256 QAM, and modulation orders ($Q_m$) of the QPSK, 16 QAM, 64 QAM, and 256 QAM correspond to 2, 4, 6, and 8, respectively. That is, 2 bits per symbol in the case of QPSK modulation, 4 bits per symbol in the case of 16 QAM modulation, 6 bits per symbol in the case of 64 QAM modulation, and 8 bits per symbol in the case of 256 QAM modulation may be transmitted.

Figure 2:
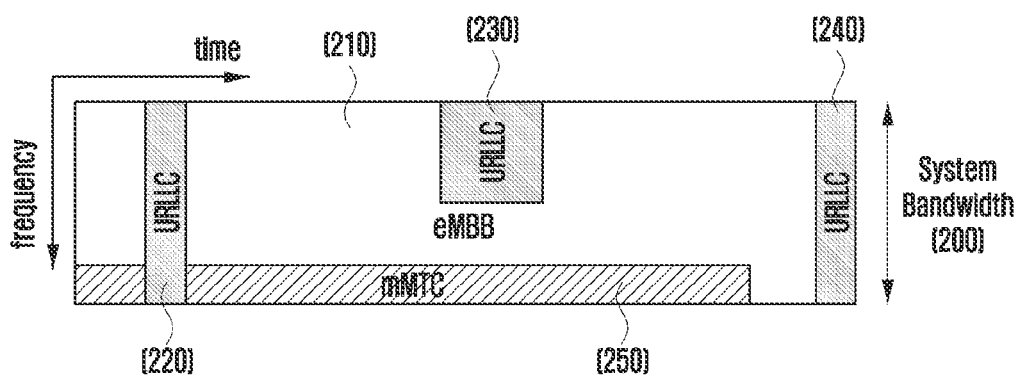
FIG. 2 illustrates an aspect in which pieces of data for eMBB, URLLC, and mMTC, which are services considered in a 5G or NR system, are allocated in a frequency-time resource.
Figure 3:
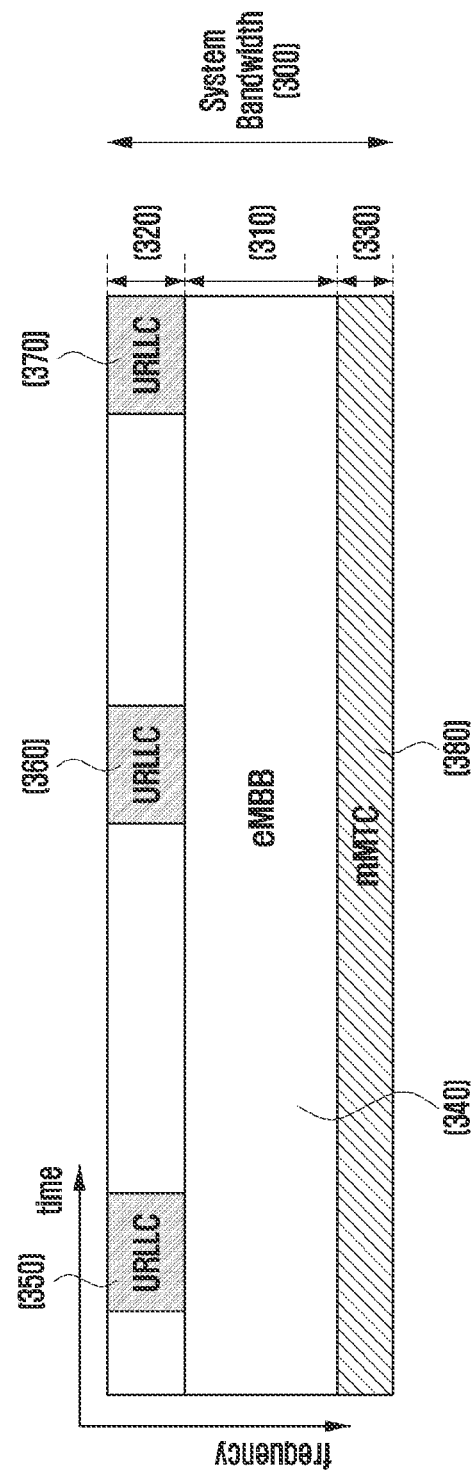
FIG. 3 illustrates an aspect in which pieces of data for eMBB, URLLC, and mMTC, which are services considered in a 5G or NR system, are allocated in a frequency-time resource according to an embodiment of the disclosure.

FIG. 2 illustrates an aspect in which pieces of data for eMBB, URLLC, and mMTC, which are services considered in the 5G or NR system, are allocated in frequency-time resources according to an embodiment of the disclosure. FIG. 3 illustrates an aspect in which pieces of data for eMBB, URLLC, and mMTC, which are services considered in the 5G or NR system, are allocated in frequency-time resources according to an embodiment of the disclosure.

Referring to FIGS. 2 and 3, a scheme, in which frequency and time resources are allocated for performing information transmission in each system, may be identified.

FIG. 2 illustrates an example in which data for eMBB, URLLC, and mMTC are allocated in the entire system frequency bandwidth 200. In the middle of allocating eMBB data 210 and mMTC data 250 in a specific frequency bandwidth and performing transmission thereof, if URLLC data 220, 230, and 240 are generated and transmission of the URLLC data 220, 230, and 240 is necessary, a base station or a terminal may transmit the URLLC data 220, 230, and 240 without emptying a portion in which the eMBB data 210 and the mMTC data 250 have been already allocated and without transmitting the same. Since the URLLC needs to reduce a delay time in the middle of performing the services described above, the URLLC data 220, 230, and 240 may be allocated to a portion of a resource to which the eMBB data 210 is allocated, and thus may be transmitted. Of course, in a case where the URLLC data 220, 230, and 240 are additionally allocated and transmitted in the resource to which the eMBB data 210 is allocated, eMBB data may not be transmitted in an overlapping frequency-time resource, and thus the transmission performance of the eMBB data may be lowered. In the above case, eMBB data transmission failure due to URLLC data allocation may occur.

FIG. 3 illustrates an example in which a service and data are transmitted in each of sub-bands 310, 320, and 330, obtained by dividing the entire system frequency bandwidth 300. Information associated with sub-band configuration may be predetermined, and the information may be transmitted to a terminal by a base station via higher layer signaling. According to another example, the information associated with the sub-band may be arbitrarily divided by a base station or a network node and services may be provided to the terminal without transmitting separate pieces of sub-band configuration information. In FIG. 3, it is assumed that the sub-band 310 is used for transmission of eMBB data 340, the sub-band 320 is used for transmission of URLLC data 350, 360, and 370, and the sub-band 330 is used for transmission of mMTC data 380.

In the illustrated embodiment, the length of a transmission time interval (TTI) used for URLLC data transmission may be shorter than the length of TTI used for eMBB data or mMTC data transmission. In addition, the response of information related to the URLLC data may be transmitted faster than that of eMBB data or mMTC data, and accordingly information transmission or reception with a low delay may be performed. The structures of physical layer channels used for transmission of the above described three types of services or data may be different from each other. For example, at least one of the length of a transmission time interval (TTI), the allocation unit of frequency resources, a structure of a control channel, and a data mapping method may be different.

In order to explain a method and apparatus proposed in the disclosure, the terms "physical channel" and "signal" in the NR system may be used. However, details of the disclosure may be applied to a wireless communication system other than the NR system.

Figure 4:
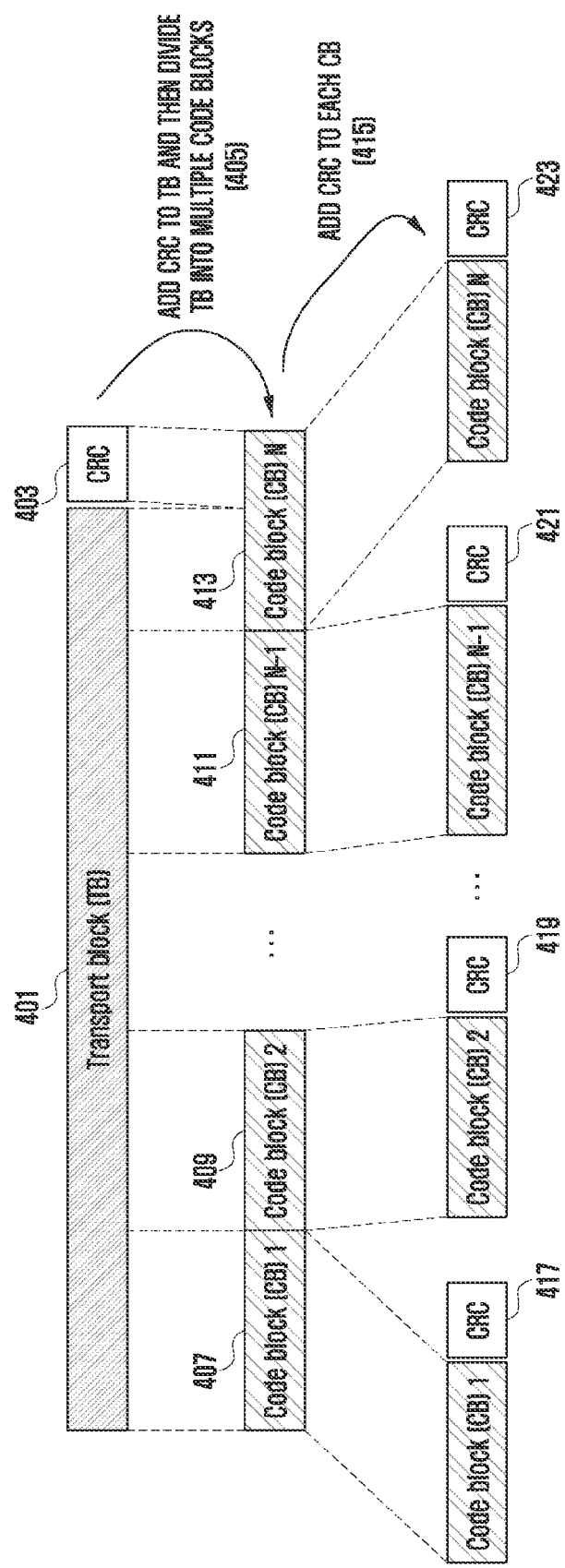
FIG. 4 illustrates a process in which one transport block is divided into a plurality of code blocks and a CRC is added thereto according to an embodiment.

FIG. 4 illustrates an embodiment in which one transport block is divided into a plurality of code blocks and a CRC is added thereto according to an embodiment of the disclosure.

Referring to FIG. 4, a CRC 403 may be added to the last part or the first part of one transport block (TB) 401 to be transmitted in an uplink or a downlink. The CRC 403 may have 16 bits, 24 bits, or a fixed number of bits, or may have a variable number of bits depending on channel conditions, and may be used to determine whether channel coding is successful. The TB 401 and a block to which CRC 403 is added may be divided into a plurality of code blocks (CBs) 407, 409, 411, and 413 (indicated by reference numeral 405). The divided code blocks may have a predetermined maximum size, and in this case, the last code block 413 may be smaller in size than those of other code blocks 407, 409, and 411. This is only given as an example, and according to another example, the last code block 413 may have a length adjusted to be the same as that of the other code blocks 407, 409, and 411 by adding zeros, random values, or ones into the last code block 413. CRCs 417, 419, 421, and 423 may be added to the code blocks 407, 409, 411, and 413, respectively (indicated by reference numeral 415). The CRC may have 16 bits, 24 bits, or a fixed number of bits, and may be used to determine whether channel coding is successful.

The TB 401 and cyclic generator polynomial may be used in order to generate the CRC 403, and the cyclic generator polynomial may be defined in various methods. For example, if it is assumed that cyclic generator polynomial $gCRC24A(D)=D^{24}+D^{23}+D^{18}+D^{17}+D^{14}+D^{11}+D^{10}+D^7+D^6+D^5+D^4+D^3+D+1$ for a 24-bit CRC, and L=24, with respect to TB data $\alpha_0, \alpha_1, \alpha_2, \alpha_3, \ldots \alpha_{A-1}$, CRC $p_0, p_1, p_2, p_3, \ldots, p_{L-1}$, may be a value in which the remainder becomes zero by dividing $\alpha_0 D^{A+23}+\alpha_1 D^{A+22}+ \cdots + \alpha_{A-1}D^{24}+p_0D^{23}+p_1D^{22}+ \ldots +p_{22}D^1+p_{23}$ by gCRC24A (D), and may determine $p_0, p_1, p_2, p_3, \cdots, p_{L-1}$. In the above example, the CRC length "L" is assumed to be 24 as an example, but the CRC length "L" may be determined to have different lengths, such as 12, 16, 24, 32, 40, 48, 64, and the like.

Through this process, the CRC is added to the TB, and the TB having CRC added thereto may be divided into N CBs 407, 409, 411, and 413. CRCs 417, 419, 421, and 423 may be added to each of the divided CBs 407, 409, 411, 413 (indicated by reference numeral 415). The CRC added to the CB may have a different length than the CRC added to the TB or may use a different cyclic generator polynomial. In addition, the CRC 403 added to the TB and the CRCs 417, 419, 421, and 423 added to the code block may be omitted depending on the type of a channel code to be applied to the code block. For example, if LDPC codes other than turbo codes are applied to code blocks, CRCs 417, 419, 421, and 423 to be inserted for each code block may be omitted.

However, even if the LDPC is applied, the CRCs 417, 419, 421, and 423 may be added to the code block as it is. In addition, CRC may be added or omitted even if a polar code is used.

As described above in FIG. 4, the maximum length of one code block is determined according to the type of channel coding applied to a TB to be transmitted, and the TB and CRC, which is added to the TB, are divided into code blocks according to the maximum length of the code block.

Figure 5:
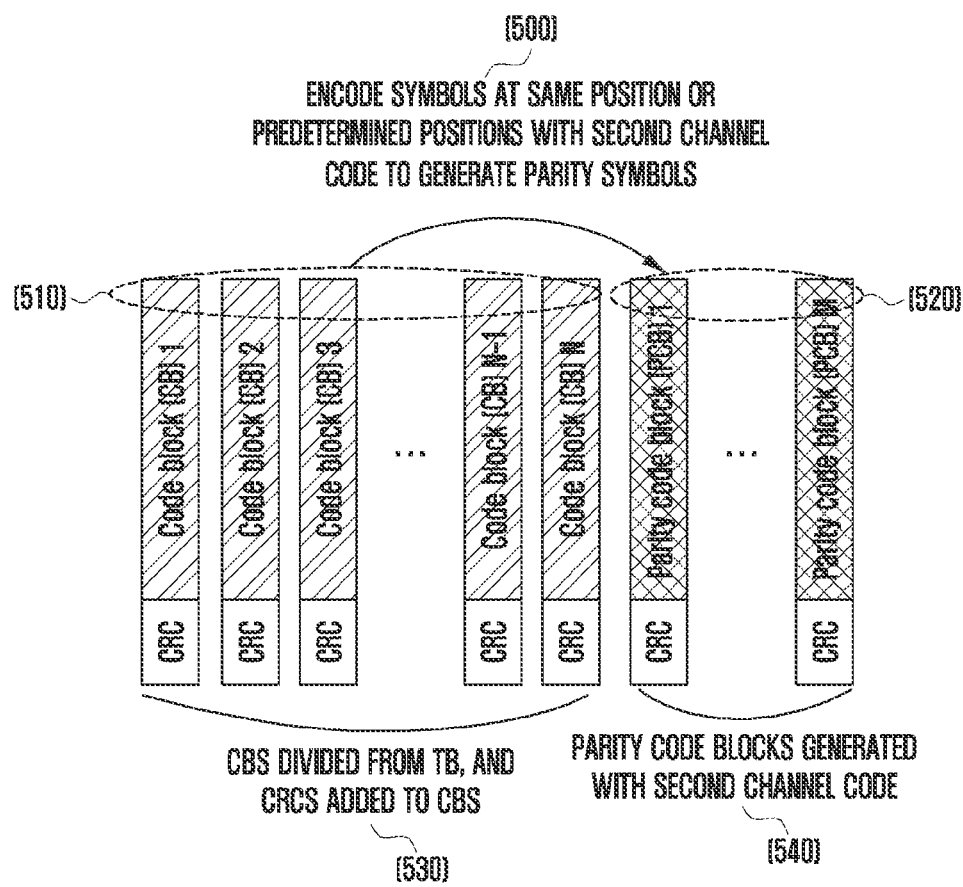
FIG. 5 illustrates a method in which transmission is performed using an outer code according to an embodiment of the disclosure.
Figure 6A:
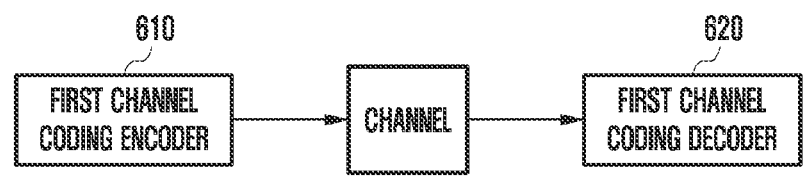
FIG. 6A is a block diagram illustrating a structure of a communication system in which an outer code is not used according to an embodiment of the disclosure.
Figure 6B:
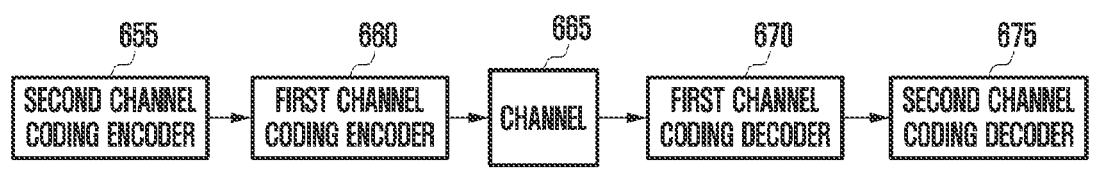
FIG. 6B is a block diagram illustrating a structure of a communication system in which an outer code is used according to an embodiment of the disclosure.

In the conventional LTE system, CRC for CB is added to the divided CB, data bits and the CRC of the CB are encoded with a channel code, and thus coded bits are determined and a number of bits, which perform predetermined rate matching to each of coded bits, may be determined FIG. 5 illustrates a method in which transmission is performed using an outer code according to an embodiment. FIG. 6A is a block diagram illustrating a structure of a communication system in which an outer code is not used according to an embodiment of the disclosure, and FIG. 6B is a block diagram illustrating a structure of a communication system in which an outer code is used according to an embodiment. Referring to FIGS. 5, 6A, and 6B, a method for transmitting a signal using an outer code may be described.

Referring to FIG. 5, one transport block is divided into a plurality of code blocks, and bits or symbols 510 at the same position in each code block are encoded with a second channel code to generate parity bits or symbols 520 (indicated by reference numeral 500). Thereafter, the CRCs may be added to the code blocks and the parity code blocks generated by the second channel code encoding, respectively (indicated by reference numerals 530 and 540).

Whether or not to add the CRC may be determined depending on the type of channel codes. For example, if a turbo code is used as a first channel code, the CRCs 530 and 540 are added. Thereafter, however, the respective code blocks and parity code blocks may be encoded with the first channel code encoding. In the disclosure, a convolutional code, an LDPC code, a turbo code, a polar code, and the like may be used as the first channel code. However, this is merely an example, and various channel codes, as the first channel code, may be applied to the disclosure. In the disclosure, as the channel code used for a second channel code, for example, a Reed-Solomon code, a BCH code, a Raptor code, a parity bit generation code, or the like may be used. However, this is just an example, and various channel codes may be applied to the disclosure as the second channel code.

Referring to reference numeral 600 of FIG. 6A, if the outer code is not used, the first channel coding encoder 610 and the first channel coding decoder 620 are each used in a transceiver, and a second channel coding encoder and a second channel coding decoder may not be used. Even if the outer code is not used, the first channel coding encoder 610 and the first channel coding decoder 620 may be configured in the same manner as the case in which an outer code to be described later is used.

Referring to reference numeral 650 of FIG. 6B, if the outer code is used, data to be transmitted may pass through a second channel coding encoder 655. Bits or symbols passing through the second channel coding encoder 655 may pass through a first channel coding encoder 660. If the channel coded symbols pass through a channel 665 and are received by a receiver, the receiver may sequentially operate a first channel coding decoder 670 and a second channel coding decoder 675 based on the received signal. The first channel coding decoder 670 and the second channel coding decoder 675 may perform operations corresponding to the first channel coding encoder 655 and the second channel coding encoder 660, respectively.

Figure 7A:
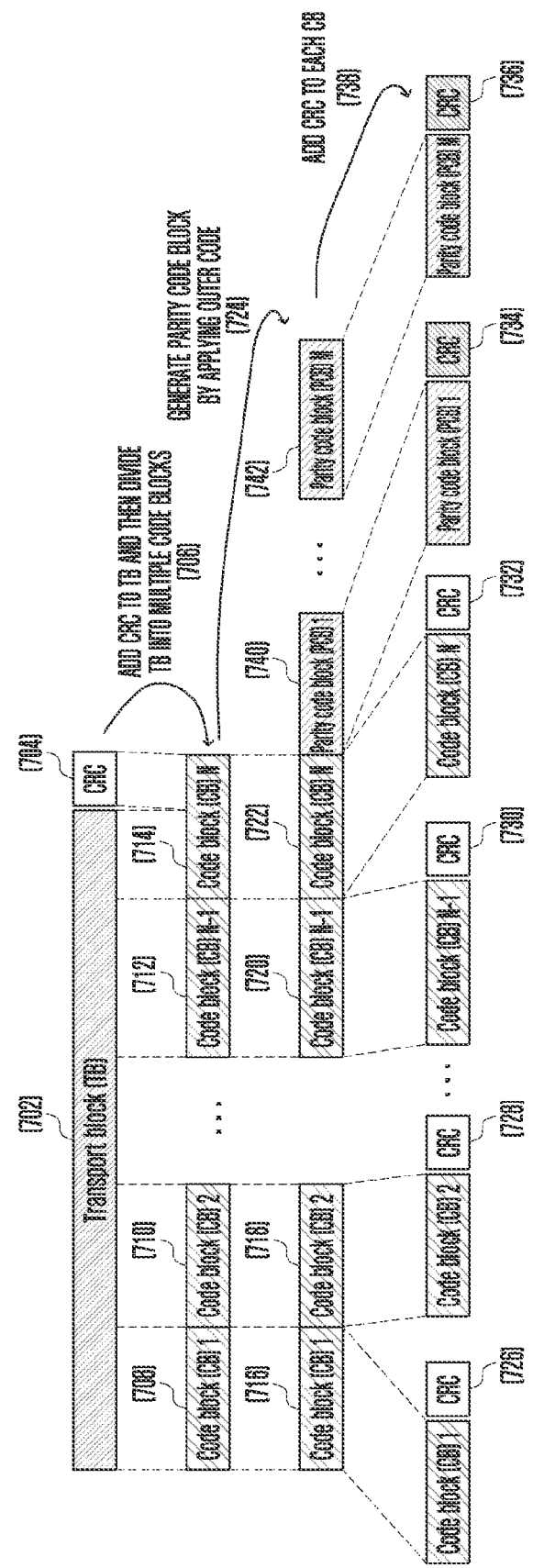
FIG. 7A illustrates a method for generating one or more parity code blocks by applying a second channel code or an outer code to a plurality of code blocks, which are obtained by dividing one transport block, according to an embodiment of the disclosure.

FIG. 7A illustrates an example of generating one or more parity code blocks by applying a second channel code or an outer code to a plurality of code blocks, which are obtained by dividing one transport block, according to an embodiment of the disclosure.

As described above in FIG. 4, one transport block 702 and CRC 704 for a TB may be divided into one or more code blocks 708, 710, 712, and 714 (indicated by reference numeral 706). In this case, if only one code block is generated according to the size of a transport block, a CRC may not be added to the corresponding code block. If an outer code is applied to code blocks 716, 718, 720, and 722 to be transmitted, parity code blocks 740 and 742 may be generated (indicated by reference numeral 724). If the outer code is used, parity code blocks 740 and 742 may be located after the last code block (indicated by reference numeral 724). After the outer code, CRCs 726, 728, 730, 732, 734 and 736 may be added (indicated by reference numeral 738). Thereafter, the respective code blocks and parity code blocks may be encoded with a channel code together with the CRC.

Figure 7B:
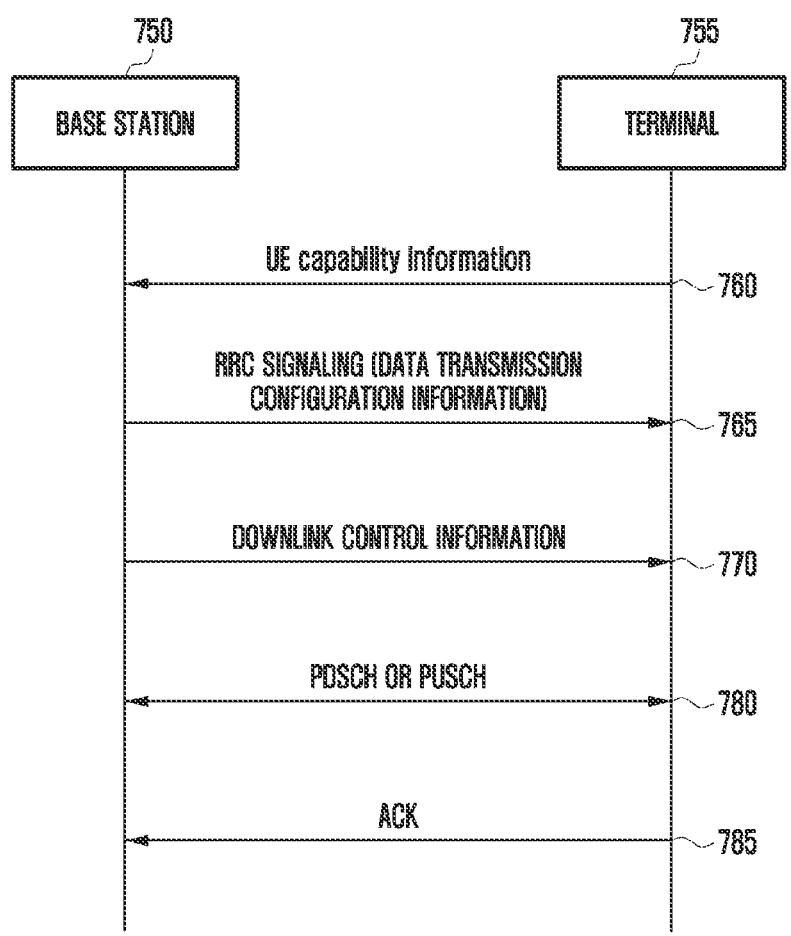
FIG. 7B illustrates an operation of transmitting or receiving data between a base station and a terminal according to an embodiment of the disclosure.

FIG. 7B illustrates an operation of transmitting or receiving data between a base station and a terminal according to an embodiment of the disclosure.

According to FIG. 7B, a base station 750 transmits a UE capability enquiry message to a terminal 755, and the terminal 755 reports UE capability information to the base station 750 via higher layer signaling (or RRC signaling). The UE capability information may include information indicating a function that can be supported by the terminal, and may include, for example, a maximum value of a layer, which can be supported at the time of transmission of a PUSCH and/or a PDSCH. In addition, the base station 750 may identify the UE capability information from an access and mobility management function (AMF).

The base station 750 may transmit configuration information for data transmission to the terminal 755 via higher layer signaling. Such configuration information may be transmitted to the terminal 755 through a plurality of system information blocks (SIBs) and/or RRC messages. The configuration information may include information as follows.

- PDCCH configuration information, such as PDCCH-Config and PDCCH-ConfigCommon: PDCCH configuration information for scheduling transmission of uplink data or downlink data includes information for configuring a control resource set (CORESET) for transmission of downlink control information (DCI) for scheduling data and for configuring a search space.
- PDSCH configuration information, such as PDSCH-Config, PDSCH-ConfigCommon, and PDSCH-TimeDomainResourceAllocationList: Configuration information for a PDSCH through which downlink data is transmitted includes: a PDCSH resource allocation type for a DMRS configuration for transmission of a PDSCH and a PUSCH resource allocation type for frequency domain resource allocation; transmission configuration indication (TCI) configuration indicating beam-related information applied to the PDSCH; PDSCH time domain resource allocation information for time domain resource allocation, which is included in downlink control information for time domain resource allocation; an aggregation factor applied to PDSCH transmission; rate matching information applied to the PDSCH; the maximum number of MIMO layers used; and code block group transfer configuration information.
- PUCCH configuration information, such as PUCCH-Config and PUCCH-ConfigCommon: Configuration information for a PUCCH, through which reception acknowledgment information (HARQ-ACK) for downlink data transmitted through a PDSCH is transmitted, includes a beam-related configuration (PUCCH-SpatialRelationInfo) PUCCH resource set configuration applied to a PUCCH, a PUCCH resource configuration, and a configuration for each PUCCH format.
- PUSCH configuration information, such as PUSCH-Config and PUSCH-ConfigCommon: Configuration information for a PUSCH through which uplink data is transmitted includes: a DMRS configuration for transmission of PUSCH and a PUSCH resource allocation type for frequency domain resource allocation; PDSCH time domain resource allocation information for time domain resource allocation, which is included in downlink control information for time domain resource allocation; frequency hopping information; an aggregation factor applied to PUSCH transmission; MCS table information applied to PUSCH; PUSCH power control information; transform precoder configuration; the maximum number of MIMO layers used; code block group transmission configuration information; and the like.

Operations 760 and 765 may be omitted or the order of operations 760 and 765 may be changed and performed.

The base station 750 transmits downlink control information (DCI) for scheduling uplink data or downlink data to the terminal 755 via a PDCCH (indicated by reference numeral 770). The terminal 755 receives DCI, which is scheduled to the terminal itself through blind decoding, in a search space identified based on the configuration information for data transmission. The terminal 755 identifies whether CRC attached to a DCI payload, received in the search space, is scrambled with a cell-radio network temporary identifier (C-RNTI) corresponding to the identifier of the terminal. As a result of the identification of CRC, if it is identified that the CRC is scrambled with C-RNTI of the terminal itself, it can be seen that the corresponding DCI has been transmitted to the terminal itself. The C-RNTI may be replaced with RNTI for other purposes, for example, random access RNTI (RA-RNTI) scheduling for a random access response message, paging RNTI (P-RNTI) for PDSCH scheduling for a paging message, system information RNTI (SI-RNTI) for scheduling PDSCH for system information, and the like.

The DCI may be one of: 0_0, which is a fallback DCI format for scheduling a PUSCH; 0_1, which is a non-fallback DCI format for scheduling the PUSCH; 1_0, which is a fallback DCI format for scheduling a PDSCH; and 1_1, which is a non-fallback DCI format for scheduling the PDSCH. Information included in DCI format 1_1, as an example of the DCI format, is described as follows.

- Carrier indicator: Carrier indicator indicates a carrier at which data scheduled by DCI is transmitted; 0 or 3 bits
- Identifier for DCI formats: DCI format identifier indicates a DCI format, and is an indicator specifically distinguishing whether the corresponding DCI is for downlink or uplink; [1 bit]
- Bandwidth part indicator: BWP indicator indicates if there is a change in the bandwidth part; 0, 1, or 2 bits
- Frequency domain resource assignment: Resource assignment information indicating frequency domain resource assignment, and an expressed resource differs according to whether the resource assignment type is "0" or "1".
- Time domain resource assignment: Resource assignment information indicating time domain resource assignment may indicate higher layer signaling or one configuration of a predetermined PDSCH time domain resource allocation list; 1, 2, 3, or 4 bits
- VRB-to-PRB mapping: VRB-to-PRB mapping indicates a mapping relationship between a virtual resource block (VRB) and a physical resource block (PRB); 0 or 1 bit
- PRB bundling size indicator: PRB bundling size indicator indicates the bundling size of a physical resource block to which the same precoding is assumed to be applied; 0 or 1 bit Rate matching indicator: Rate matching indicator indicates a rate match group to be applied, among rate match groups configured as a higher layer applied to PDSCH; 0, 1, or 2 bits ZP CSI-RS trigger: ZP CSI-RS trigger triggers a zero power channel state information reference signal; 0, 1, or 2 bits Transport block (TB)-related configuration information: TB-related configuration information indicates a modulation and coding scheme (MCS), a new data indicator (NDI), and a redundancy version (RV) for one or two TBs.

Modulation and coding scheme (MCS): MCS indicates a modulation scheme and a coding rate used for data transmission. That is, MCS indicates a coding rate value capable of notifying of TBS and channel coding information together with information on whether QPSK, 16QAM, 64QAM, or 256QAM.

New data indicator: New data indicator indicates whether HARQ transmission is initial transmission or retransmission.

Redundancy version: Redundancy version indicates the redundancy version of HARQ.

HARQ process number: HARQ process number indicates HARQ process number applied to PDSCH; 4 bits Downlink assignment index: An index for generating a dynamic HARQ-ACK codebook at the time of reporting HARQ-ACK for PDSCH; 0 or 2 or 4 bits TPC command for scheduled PUCCH: power control information applied to PUCCH for HARQ-ACK reporting on PDSCH; 2 bits PUCCH resource indicator: Information indicating a resource of a PUCCH for HARQ-ACK reporting on a PDSCH; 3 bits PDSCH-to-HARQ_feedback timing indicator: Configuration information of a slot through which PUCCH for HARQ-ACK reporting on PDSCH is transmitted; 3 bits Antenna ports: Information indicating an antenna port of PDSCH DMRS and DMRS CDM group in which PDSCH is not transmitted; 4, 5 or 6 bits Transmission configuration indication: Information indicating beam related information of PDSCH; 0 or 3 bits SRS request: Information for requesting SRS transmission; 2 bits CBG transmission information: If code block group-based retransmission is configured, information indicating data, which belongs to a code block group (CBG), is transmitted through PDSCH; 0, 2, 4, 6, or 8 bits CBG flushing out information: Information indicating whether a code block group previously received by a terminal can be used for HARQ combining; 0 or 1 bit DMRS sequence initialization: DMRS sequence initialization indicates DMRS sequence initialization parameters; 1 bit As an example, information included in DCI format 1_1 has been described, but the above-described information may be used in another DCI format for scheduling data.

Thereafter, if the base station 750 transmits DCI for scheduling downlink data to the terminal 755, the base station 750 receives a transport block (TB) from a MAC layer, performs channel coding thereof in a physical layer, and generates downlink data to be transmitted to the terminal. The base station adds a TB CRC to the TB, if necessary, divides the TB added with the TB CRC into code blocks (CBs), adds CB CRCs to the CBs, and applies LDCP coding to the CBs so as to encode data. Thereafter, rate matching and CB concatenation may be applied to the encoded data. The size of TB may be calculated as described in the disclosure. If the base station transmits DCI for scheduling uplink data, the above-described operation of the base station may be performed by the terminal in order to generate uplink data.

The downlink data or the uplink data generated as described above is transmitted through a resource, which is determined according to time-frequency domain resource allocation information included in the DCI on the PDSCH or the PUSCH (indicated by reference numeral 780). In addition, the downlink data or the uplink data is transmitted together with DMRS configured via higher layer signaling and DCI.

If the downlink data is received, the terminal 755 transmits HARQ-ACK information indicating whether the downlink data is successfully transmitted, through the PUCCH or the PUSCH (indicated by reference numeral 785). If the HARQ-ACK information is transmitted through the PUCCH, the HARQ-ACK information may be transmitted to the base station 750 through a PUCCH resource and a slot indicated by the DCI. Alternatively, the HARQ-ACK information may be transmitted through the PUSCH.

The size of TB in the NR system may be calculated through the following operations.

Operation 1: Calculate $$N'_{RE},$$

the number of REs assigned to PDSCH mapping in one PRB in the allocated resource.

$$N'_{RE}$$

may be calculated by $$N'_{RE} = N^{RB}_{sc} \cdot N^{sh}_{symb} - N^{PRB}_{DMRS} - N^{PRB}_{oh}.$$

Here $$N^{RB}_{sc} = 12,$$

and $$N^{sh}_{symb}$$

may represent the number of OFDM symbols allocated to the PDSCH.

$$N^{PRB}_{DMRS}$$

is the number of REs in one PRB occupied by DMRSs of the same code division multiplexing (CDM) group.

$$N^{PRB}_{oh}$$

is the number of REs occupied by the overhead in one PRB, which is configured via higher signaling, and may be configured to 0, 6, 12, or 18. Thereafter, $N_{RE}$, the total number of REs, allocated to the PDSCH may be calculated. $N_{RE}$ is calculated by $$N_{RE} = \min(156, N'_{RE}) \cdot n_{PRB},$$

and $n_{PRB}$ denotes the number of PRBs allocated to the terminal.

Operation 2: The number of temporary information bits, $N_{info}$, may be calculated by $N_{info}=N_{RE} \cdot R \cdot Q_m \cdot v$. Here, R is a code rate, $Q_m$ is a modulation order, and information of this value may be transferred using MCS bitfield and a table pre-defined in the control information. Also, v is the number of assigned layers. If $N_{info} \leq 3824$, TBS may be calculated through operation 3 below. Otherwise, TBS may be calculated through operation 4.

Operation 3:

$$N'_{info}$$

may be calculated by the equation of $$N'_{info} = \max\left(24, 2^n \cdot \left\lfloor \frac{N_{info}}{2^n} \right\rfloor\right)$$

and $n=\max(3, \lfloor \log_2(N_{info}) \rfloor - 6)$ TBS may be determined as a value, which is the closest to $N'_{info}$ among values equal to or larger than $$N'_{info}$$

in <Table 7> below.

TABLE 7

| Index | TBS |
|---|---|
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

Operation 4:

$$N'_{info}$$

may be calculated by the equation of $$N'_{info} = \max\left(3840, 2^n \times \text{round}\left(\frac{N_{info} - 24}{2^n}\right)\right)$$

and n=$\lfloor \log_2(N_{info}-24) \rfloor$–5. TBS can be determined through a value of $$N'_{info}$$

and the following [pseudo-code 1]. Here, 'C' may denote the number of code blocks.
[Start Pseudo-Code 1]
   if R≤¼

$$TBS = 8 \cdot C \cdot \left\lceil \frac{N'_{info} + 24}{8 \cdot C} \right\rceil - 24,$$

where $$C = \left\lceil \frac{N'_{info} + 24}{3816} \right\rceil$$

else
     if $$N'_{info} > 8424$$

$$TBS = 8 \cdot C \cdot \left\lceil \frac{N'_{info} + 24}{8 \cdot C} \right\rceil - 24,$$

where $$C = \left\lceil \frac{N'_{info} + 24}{8424} \right\rceil$$

else $$TBS = 8 \cdot \left\lceil \frac{N'_{info} + 24}{8} \right\rceil - 24$$

end if
   end if
[End Pseudo-Code 1]

In the NR system, if one CB is input to an LDPC encoder, parity bits may be added to the CB and the CB added with the parity bits may be output. The amount of parity bits may differ according to an LDPC base graph. A method of transmitting all parity bits, generated by LDPC coding for a specific input, may be called full buffer rate matching (FBRM), and a method of limiting the number of parity bits that can be transmitted may be called limited buffer rate matching (LBRM).

If resources are allocated for data transmission, the output of the LDPC encoder is made into a circular buffer, and bits of the buffer are repeatedly transmitted as many times as the allocated resources, and the length of the circular buffer may be called $N_{cb}$. If the number of bits of all LDPC codewords, generated by LDPC coding is N, $N_{cb}$ is equal to N in the FBRM method. The LDPC codeword bits may include some of information word bits for applying LDPC coding.

In the LBRM method, $N_{cb}$ denotes $N_{cb}$=min(N, $N_{ref}$), $N_{ref}$ is given by $$N_{ref} = \left\lfloor \frac{TBS_{LBRM}}{C \cdot R_{LBRM}} \right\rfloor,$$

and $R_{LBRM}$ may be determined to be ⅔. In a method for obtaining the TBS described above, $TBS_{LBRM}$ is identified based on the assumption comprising the maximum number of layers supported by a terminal in the corresponding cell, the maximum modulation order configured for the terminal in the cell (if there is no configured maximum modulation order, the maximum modulation order is assumed to be 64QAM), and the code rate is assumed to be 948/1024, which is the maximum code rate. $N_{RE}$ is assumed to be $N_{RE}$=156·$n_{PRB}$, and $n_{PRB}$ may be assumed to be $n_{PRB,LBRM}$, wherein $n_{PRB,LBRM}$ may be given as shown in <Table 8> below.

TABLE 8

| Maximum number of PRBs across all configured BWPs of a carrier | $n_{PRB, LBRM}$ |
|---|---|
| Less than 33 | 32 |
| 33 to 66 | 66 |
| 67 to 107 | 107 |
| 108 to 135 | 135 |
| 136 to 162 | 162 |
| 163 to 217 | 217 |
| Larger than 217 | 273 |

The maximum data rate supported by a terminal in the NR system may be determined through <Equation 1> below.

Equation 1 data rate (in Mbps) =

$$10^{-6} \cdot \sum_{j=1}^{J}\left(v^{(j)}_{Layers} \cdot Q^{(j)}_m \cdot f^{(j)} \cdot R_{max} \cdot \frac{N^{BW(j),\mu}_{PRB} \cdot 12}{T^\mu_s} \cdot (1 - OH^{(j)})\right)$$

In <Equation 1>, J may denote the number of carriers bound by carrier aggregation, $R_{max}$=948/1024, $$v^{(j)}_{Layers}$$

may denote the maximum number of layers, $$Q^{(j)}_m$$

may denote a maximum modulation order, $f^{(j)}$ may denote a scaling index, and μ may denote a subcarrier spacing. The terminal may report one of 1, 0.8, 0.75, and 0.4 values of $f^{(j)}$ and μ may be given as shown in <Table 9> below.

TABLE 9

| μ | Δf = $2^μ$ · 15 [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Further, $T_s^μ$ is the average OFDM symbol length, $T_s^μ$ may be calculated to be $$T_s^μ = \frac{10^{-3}}{14 \cdot 2^μ},$$

and $N_{PRB}^{BW(j),μ}$ is the maximum number of RBs in BW (j). $OH^{(j)}$ is an overhead value, and $OH^{(j)}$ may be given as 0.14 in the downlink and given as 0.18 in the uplink of FR1 (a band equal to or less than 6 GHz), and may be given as 0.08 in the downlink and given as 0.10 in the uplink of FR2 (a band exceeding 6 GHz). Through <Equation 1>, the maximum data rate in the downlink in a cell having a 100 MHz frequency bandwidth at a 30 kHz subcarrier spacing may be calculated by the following <Table 10>.

TABLE 10

| $f^{(j)}$ | $v_{Layers}^{(j)}$ | $Q_m^{(j)}$ | Rmax | $N_{PRB}^{BW(j), μ}$ | $T_s^μ$ | $OH^{(j)}$ | data rate |
|---|---|---|---|---|---|---|---|
| 1 | 4 | 8 | 0.92578125 | 273 | 3.57143E−05 | 0.14 | 2337.0 |
| 0.8 | 4 | 8 | 0.92578125 | 273 | 3.57143E−05 | 0.14 | 1869.6 |
| 0.75 | 4 | 8 | 0.92578125 | 273 | 3.57143E−05 | 0.14 | 1752.8 |
| 0.4 | 4 | 8 | 0.92578125 | 273 | 3.57143E−05 | 0.14 | 934.8 |

On the other hand, an actual data rate that the terminal can measure in the actual data transmission may be a value obtained by dividing the data amount by a data transmission time. This may be a value obtained by dividing TBS by the TTI length in 1 TB transmission or dividing the sum of TBSs by the TTI length in 2 TB transmission. For example, as shown in <Table 10>, the maximum actual data rate in downlink in a cell having a 100 MHz frequency bandwidth at a 30 kHz subcarrier spacing may be determined as shown in <Table 11> below according to the number of allocated PDSCH symbols.

TABLE 11

| $N_{symb}^{sh}$ | $N_{DMRS}^{PRB}$ | $N_{RE}'$ | $N_{RE}$ | $N_{info}$ | n | $N_{info}'$ | C | TBS | TTI length (ms) | data rate (Mbps) |
|---|---|---|---|---|---|---|---|---|---|---|
| 3 | 8 | 28 | 7644 | 226453.5 | 12 | 225,280 | 27 | 225,480 | 0.107143 | 2,104.48 |
| 4 | 8 | 40 | 10920 | 323505.0 | 13 | 319,488 | 38 | 319,784 | 0.142857 | 2,238.49 |
| 5 | 8 | 52 | 14196 | 420556.5 | 13 | 417,792 | 50 | 417,976 | 0.178571 | 2,340.67 |
| 6 | 8 | 64 | 17472 | 517608.0 | 13 | 516,096 | 62 | 516,312 | 0.214286 | 2,409.46 |
| 7 | 8 | 76 | 20748 | 614659.5 | 14 | 622,592 | 74 | 622,760 | 0.250000 | 2,491.04 |
| 8 | 8 | 88 | 24024 | 711711.0 | 14 | 704,512 | 84 | 704,904 | 0.285714 | 2,467.16 |
| 9 | 8 | 100 | 27300 | 808762.5 | 14 | 802,816 | 96 | 803,304 | 0.321429 | 2,499.17 |
| 10 | 8 | 112 | 30576 | 905814.0 | 14 | 901,120 | 107 | 901,344 | 0.357143 | 2,523.76 |
| 11 | 8 | 124 | 33852 | 1002865.5 | 14 | 999,424 | 119 | 999,576 | 0.392857 | 2,544.38 |
| 12 | 8 | 136 | 37128 | 1099917.0 | 15 | 1,114,112 | 133 | 1,115,048 | 0.428571 | 2,601.78 |
| 13 | 8 | 148 | 40404 | 1196968.5 | 15 | 1,212,416 | 144 | 1,213,032 | 0.464286 | 2,612.68 |
| 14 | 8 | 160 | 43680 | 1294020.0 | 15 | 1,277,952 | 152 | 1,277,992 | 0.500000 | 2,555.98 |

The maximum data rate supported by the terminal may be identified through <Table 10>, and the actual data rate according to the allocated TBS may be identified through <Table 11>. At this time, the actual data rate may be larger than the maximum data rate depending on scheduling information.

In a wireless communication system, in particular, a new radio (NR) system, data rates that a terminal can support may be promised between a base station and a terminal. The data rate may be calculated using the maximum frequency band, the maximum modulation order, the maximum number of layers, which are supported by the terminal. However, the calculated data rate may be different from a value calculated according to a transport block size (TBS) and a transmission time interval (TTI) length of a transport block (TB) used for actual data transmission.

Accordingly, a case, in which a terminal is allocated with a TBS larger than a value corresponding to a data rate supported by the terminal itself, may occur. It may be necessary to minimize the case and define an operation of the terminal in the case. In addition, in a communication system defined in the current NR, $TBS_{LBRM}$ is determined based on the rank or the number of layers supported by the UE in a case where LBRM is applied. Since the process of determining $TBS_{LBRM}$ is inefficient or the parameter configuration is ambiguous, it is difficult to stably apply LBRM in a base station or a terminal. The following embodiments provide a method and apparatus for solving the problem.

Hereinafter, embodiments will be described in detail with reference to the accompanying drawings. In the following description of the disclosure, a detailed description of known functions or configurations incorporated herein will be omitted if it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. In addition, hereinafter, an embodiment is described using the NR system as an example, but the embodiment may be applied to other communication systems having a similar technical background or channel form. In addition, embodiments may be applied to other communication systems through some modifications without departing from the scope of the disclosure as determined by those skilled in the art.

In the disclosure, terms of a "physical channel" and a "signal" may be used interchangeably with data or a control signal. For example, the PDSCH is a physical channel through which data is transmitted, but in the disclosure, the PDSCH may be referred to as data.

Hereinafter, in the disclosure, higher signaling is a signal transmission method, which is performed by a base station to transmit a signal to a terminal by using a downlink data channel of a physical layer or performed by the terminal to transmit a signal to the base station by using an uplink data channel of the physical layer, and may be referred to as RRC signaling or a MAC control element (CE).

In the disclosure, a peak data rate, a max data rate, a maximum data rate, and the like may be used interchangeably.

First Embodiment

The first embodiment relates to a method and apparatus for applying an efficient uplink LBRM (UL-SCH LBRM or PUSCH LBRM) in performing data transmission.

In the first embodiment and subsequent embodiments, maxMIMO-Layers, which is a parameter of the PDSCH-ServingCellConfig may be a parameter configured for a terminal by a base station. In the first embodiment and the subsequent embodiments, maxNumberMIMO-LayersPDSCH may be a parameter indicating UE capability, may be a parameter which is transmitted as a report to the base station by the terminal, or may be a capability value of a corresponding terminal having been already stored in a communication system network. Therefore, in the first embodiment and the subsequent embodiments, the meaning that the maxNumberMIMO-LayersPDSCH has been configured may be understood as the maxNumberMIMO-LayersPDSCH having been reported from the terminal to the base station or the base station may identify (or acquire) the maxNumberMIMO-LayersPDSCH parameter of the corresponding terminal, which has been already stored.

In the first embodiment and subsequent embodiments, maxMIMO-Layers, which is the parameter of the PUSCH-ServingCellConfig, and maxRank of the pusch-Config may be parameters configured for the terminal by the base station. In the first embodiment and subsequent embodiments, maxNumberMIMO-LayersCB-PUSCH and maxNumberMIMO-LayersNonCB-PUSCH may be parameters indicating the UE capability, may be a parameter transmitted as a report to the base station by the terminal, or may be a capability value of a corresponding terminal, which has been already stored in a communication system network. Therefore, in the first embodiment and the subsequent embodiments, performance of configuration of maxNumberMIMO-LayersCB-PUSCH or maxNumberMIMO-LayersNonCB-PUSCH may be understood as maxNumberMIMO-LayersCB-PUSCH or maxNumberMIMO-LayersNonCB-PUSCH being reported from the terminal to the base station, or the base station may identify (acquire) the maxNumberMIMO-LayersCB-PUSCH or maxNumberMIMO-LayersNonCB-PUSCH parameter of the corresponding terminal, which has been already stored.

Currently, if it is determined to apply PUSCH-LBRM between the base station and the terminal, $TBS_{LBRM}$ is determined based on the following configuration.

[Configuration for Rate Matching in Consideration of PUSCH-LBRM]

The maximum number of layers for one TB for UL-SCH is given by X, and is determined as follows.

Configuration 1: If the parameter maxMIMO-Layers included in the higher layer signaling PUSCH-ServingCellConfig is configured, X is determined to be a value of the parameter maxMIMO-Layers.

Configuration 2: If the maxMIMO-Layers is not configured and the parameter maxRank included in higher layer signaling pusch-Config is configured, the maximum value among maxRank values defined over all BWPs of the serving cell is determined to be a value of X.

Configuration 3: In a case of not corresponding to configuration 1 and configuration 2, the maximum number of layers for the PUSCH supported by the UE in a serving cell is determined to be X.

The above configuration 1, configuration 2, and configuration 3 may be expressed as follows.

Figure 8A:
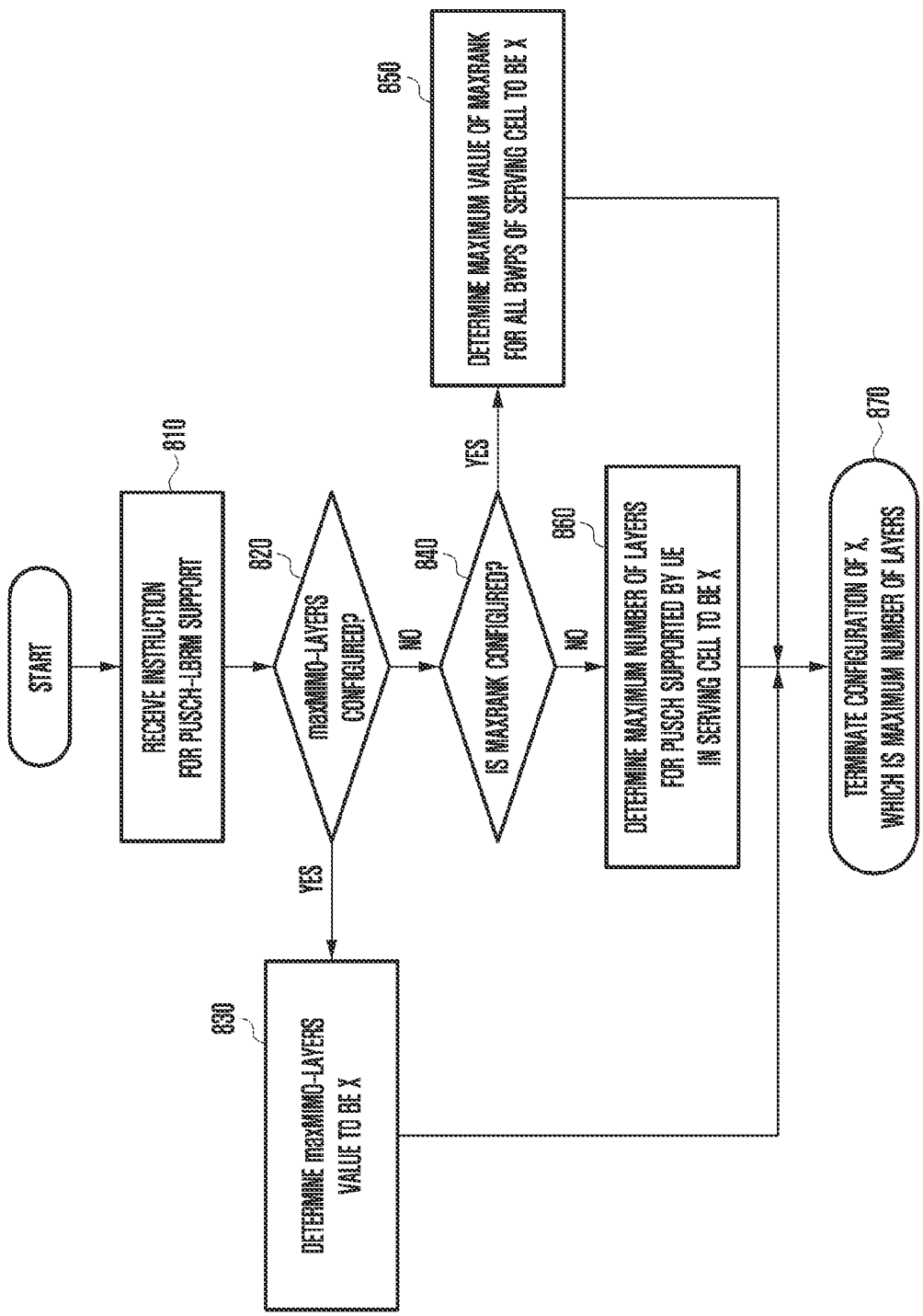
FIG. 8A illustrates an terminal operation for supporting PUSCH-LBRM according to an embodiment of the disclosure.
Figure 8B:
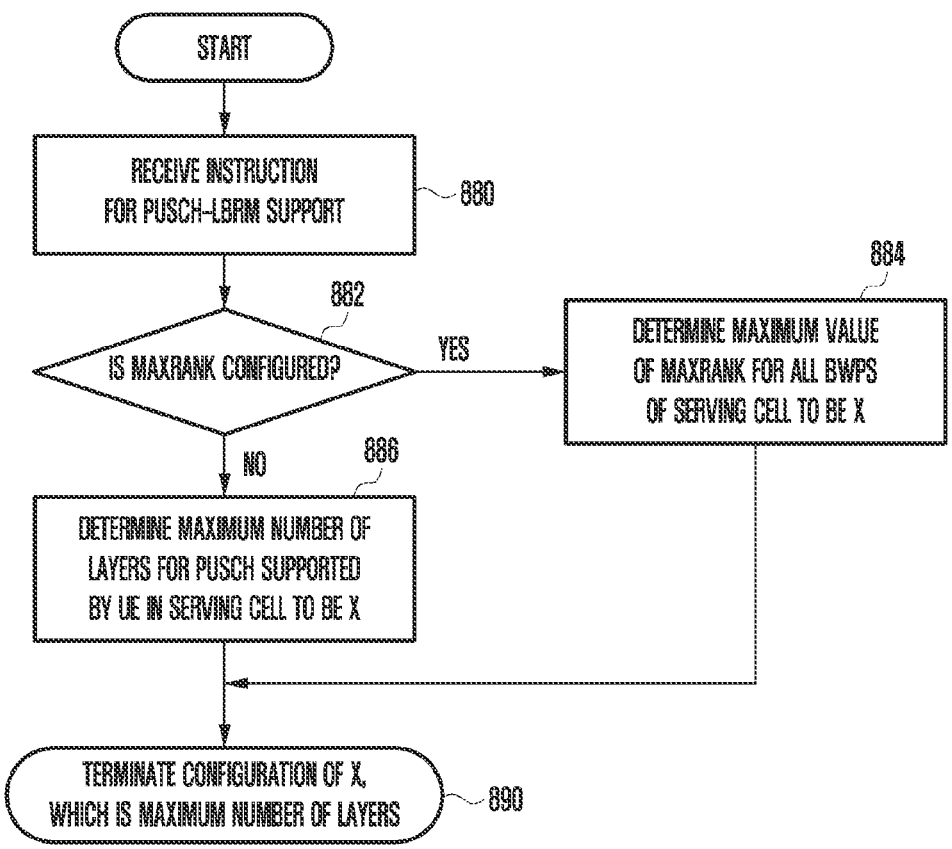
FIG. 8B illustrates a terminal operation for supporting PUSCH-LBRM according to an embodiment of the disclosure.

If the higher layer parameter maxMIMO-Layers of PUSCH-Serving CellConfig of the serving cell is configured, X is given by that parameter Elseif the higher layer parameter maxRank of pusch-Config of the serving cell is configured, X is given by the maximum value of maxRank across all BWPs of the serving cell Otherwise, X is given by the maximum number of layers for PUSCH supported by the UE for the serving cell The operation of a UE for the above configuration for PUSCH-LBRM will be described based on FIGS. 8A and 8B.

FIG. 8A illustrates a UE operation for supporting PUSCH-LBRM according to an embodiment of the disclosure.

Referring to FIG. 8A, if the UE receives an instruction for PUSCH-LBRM (indicated by reference numeral 810), at least one processor identifies whether the parameter maxMIMO-Layer is configured (indicated by reference numeral 820). If the parameter maxMIMO-Layer has been configured, the UE may determine a maxMIMO-Layer value to be X (indicated by reference numeral 830), and may terminate a process of determining the maximum number of layers for PUSCH-LBRM (indicated by reference numeral 870). In operation 820, if it is determined that the parameter maxMIMO-Layers is not configured, then in operation 840, it is identified whether maxRank is configured. If the maxRank is configured, the UE may determine the maximum value of maxRank for all BWPs of a serving cell to be X (indicated by reference numeral 850), and may terminate the process of determining the maximum number of layers for PUSCH-LBRM (indicated by reference numeral 870). In operation 840, if it is determined that the parameter maxRank is not configured, then the UE may determine the maximum number of layers for the PUSCH supported by the UE in the serving cell to be X (indicated by reference numeral 860), and the UE may terminate the process of determining the maximum number of layers for PUSCH-LBRM (indicated by reference numeral 870).

FIG. 8B illustrates an example of an operation method for supporting PUSCH-LBRM of a UE that does not perform operations 820 and 830 of FIG. 8A according to an embodiment of the disclosure.

Referring to FIG. 8A, the illustrated embodiment may be applied to a case where the value for the parameter maxMIMO-Layers included in the PUSCH-ServingCell-Config, configured in the base station is equal to the maxRank value included in the pusch-Config.

In the above condition, if the UE receives the instruction for the PUSCH-LBRM (indicated by reference numeral 880), first, the at least one processor identifies whether the maxRank is configured (indicated by reference numeral 882). If the maxRank is configured, the UE may determine the maximum value of maxRank for all BWPs of a serving cell to be X (indicated by reference numeral 884), and may terminate the process of determining the maximum number of layers for PUSCH-LBRM (indicated by reference numeral 890). In operation 882, if it is determined that the parameter maxRank is not configured, then the UE may determine the maximum number of layers for the PUSCH supported by the UE in the serving cell to be X (indicated by reference numeral 886), and the UE may terminate the process of determining the maximum number of layers for PUSCH-LBRM (indicated by reference numeral 890). As a result, it can be seen that a simpler PUSCH-LBRM operation as shown in FIG. 8B is possible.

To sum up the rate matching processes in consideration of the PUSCH-LBRM described above, a modified configuration may be applied as follows.

[Modified Configuration A-1 for Rate Matching in Consideration of PUSCH-LBRM]

The maximum number of layers for one TB for UL-SCH is given by X, and is determined as follows.

Configuration 1: If the parameter maxRank included in higher layer signaling pusch-Config is configured, the maximum value among the maxRank values defined for all BWPs of the serving cell is determined to be a value of X.

Configuration 2: In a case of not corresponding to configuration 1, the maximum number of layers for the PUSCH supported by the UE in the serving cell is determined to be X.

The above configuration 1 and configuration 2 may be expressed as follows.

If the higher layer parameter maxRank of pusch-Config of the serving cell is configured, X is given by the maximum value of maxRank across all BWPs of the serving cell Otherwise, X is given by the maximum number of layers for PUSCH supported by the UE for the serving cell In the rate matching methods considering LBRM proposed in the disclosure, decoding is possible if both a base station and a terminal or both a transmitter and a receiver maintain the same configuration or the promised configuration, and various combinations of the configurations mentioned in the disclosure are possible.

Second Embodiment

A second embodiment relates to a method and apparatus for applying an efficient uplink LBRM (UL-SCH LBRM or PUSCH LBRM) in performing data transmission.

In [Configuration for rate matching in consideration of PUSCH-LBRM] of the first embodiment, operation 860 or operation 886 of FIGS. 8A and 8B corresponding to configuration 3 includes a process of determining the maximum number of layers for a PUSCH supported by a UE in a serving cell to be X. However, definition of the maximum number of layers is somewhat ambiguous, so that a clearer definition therefor is needed.

For example, in determining the maximum number of layers, if a parameter maxNumberMIMO-LayersCB-PUSCH or a parameter maxNumberMIMO-LayersNonCB-PUSCH is configured via higher layer signaling, the maximum number of layers may be determined based on at least one of the parameters. As an embodiment, if only maxNumberMIMO-LayersCB-PUSCH is configured, the maxNumberMIMO-LayersCB-PUSCH value is determined to be the maximum number of layers, and if only maxNumberMIMO-LayersNonCB-PUSCH is configured, the maxNumberMIMO-LayersNonCB-PUSCH value is determined to be the maximum number of layers. If both are configured, the maximum value or the minimum value of the two parameters may be determined to be X, which is the maximum number of layers.

In summary, an embodiment of a modified configuration for rate matching in consideration of PUSCH-LBRM may be described as follows.

[Modified Configuration A-2 for Rate Matching in Consideration of PUSCH-LBRM]

The maximum number of layers for one TB for UL-SCH is given by X, and is determined as follows:

Configuration 1: If the parameter maxMIMO-Layers included in the higher layer signaling PUSCH-ServingCell-Config is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured and parameter maxNumberMIMO-LayersCB-PUSCH or maxNumberMIMO-LayersNonCB-PUSCH is given (or configured), the maximum value among the parameters maxNumberMIMO-LayersCB-PUSCH or maxNumberMIMO-LayersNonCB-PUSCH is determined to be a value of X.

In the second embodiment and subsequent embodiments, the higher layer parameters corresponding to the UE capability may be given, may be provided, may be configured, or may be reported and may be used interchangeably in the second embodiment and subsequent embodiments.

The above configuration 1, configuration 2, and configuration 3 may be expressed as follows.

If the higher layer parameter maxMIMO-Layers of PUSCH-Serving CellConfig of the serving cell is configured, X is given by that parameter Elseif the higher layer parameter maxRank of puschConfig of the serving cell is configured, X is given by the maximum value of maxRank across all BWPs of the serving cell Otherwise, X is given by the maximum of higher layer parameters maxNumberMIMO-LayersCB-PUSCH and maxNumberMIMO-LayersNonCB-PUSCH (=max (maxNumberMIMO-LayersCB-PUSCH, maxNumberMIMO-LayersNonCB-PUSCH)).

In the configuration 3, if there is a possibility that maxNumberMIMO-LayersCB-PUSCH and maxNumberMIMO-LayersNonCB-PUSCH are not always given at the same time, the configuration 3 may be more specifically expressed by [A-2: configuration 3'], as follows.

[A-2: Configuration 3']

If the maxMIMO-Layers and the maxRank are not configured, and parameters maxNumberMIMO-LayersCB-PUSCH and maxNumberMIMO-LayersNonCB-PUSCH are both given (or configured), then the maximum value among the parameters maxNumberMIMO-LayersCB-PUSCH and maxNumberMIMO-LayersNonCB-PUSCH is determined to be a value of X. Otherwise, X is configured to a given value (a configured value) among the parameters maxNumberMIMO-LayersCB-PUSCH and maxNumberMIMO-LayersNonCB-PUSCH.

Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH Otherwise, X is given by the provided higher layer parameter between maxNumberMIMO-LayersCB-PUSCH and maxNumberMIMO-LayersNonCB-PUSCH The last part of the conditional statement may be modified as follows, so as to apply the entire conditional statement.

Otherwise, X is given by the configured higher layer parameter between maxNumberMIMO-LayersCB-PUSCH and maxNumberMIMO-LayersNonCB-PUSCH That is, the conditional statement is expressed as follows.

The maximum number of layers for one TB for UL-SCH is given by X, and is determined as follows.

If the higher layer parameter maxMIMO-Layers of PUSCH-Serving CellConfig of the serving cell is configured, X is given by that parameter Else if the higher layer parameter maxRank of puschConfig of the serving cell is configured, X is given by the maximum value of maxRank across all BWPs of the serving cell Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH Otherwise, X is given by the provided higher layer parameter between maxNumberMIMO-LayersCB-PUSCH and maxNumberMIMO-LayersNonCB-PUSCH The modified configuration A-2 for rate matching in consideration of the PUSCH-LBRM may be simplified as follows, similar to FIG. 8B.

[Modified Configuration A-3 for Rate Matching in Consideration of PUSCH-LBRM]

The maximum number of layers for one TB for UL-SCH is given by X, and is determined as follows.

Configuration 1: If the parameter maxRank included in higher layer signaling pusch-Config is configured, the maximum value among the maxRank values defined for all BWPs of the serving cell is determined to be a value of X.

Configuration 2: If the maxRank is not configured and a parameter maxNumberMIMO-LayersCB-PUSCH or maxNumberMIMO-LayersNonCB-PUSCH is configured, the maximum value among the parameter maxNumberMIMO-LayersCB-PUSCH or maxNumberMIMO-LayersNonCB-PUSCH is determined to be a value of X.

The above configuration 1 and configuration 2 may be expressed as follows.

If the higher layer parameter maxRank of pusch-Config of the serving cell is configured, X is given by the maximum value of maxRank across all BWPs of the serving cell Otherwise, X is given by the maximum number of higher layer parameters maxNumberMIMO-LayersCB-PUSCH and maxNumberMIMO-LayersNonCB-PUSCH.

The maximum number of higher layer parameters maxNumberMIMO-LayersCB-PUSCH and maxNumberMIMO-LayersNonCB-PUSCH may be expressed as max (maxNumberMIMO-LayersCB-PUSCH, maxNumberMIMO-LayersNonCB-PUSCH), and max (a, b) may denote a larger value among "a" and "b". It should be noted that configuration 2 in the [Modified configuration A-3 for rate matching in consideration of PUSCH-LBRM] may employ [A-2: configuration 3'] in the same manner as the [Modified configuration A-2 for rate matching in consideration of PUSCH-LBRM].

FIG. 9 shows an example of the operation diagram of a UE according to the modified configuration A-2 for rate matching in consideration of PUSCH-LBRM and the modified configuration A-3 for rate matching in consideration of PUSCH-LBRM according to an embodiment of the disclosure.

Referring to FIG. 9, most of the operations are similar to those of FIGS. 8A and 8B, but the operation 860 of FIG. 8A is more detailed to an operation 950.

FIG. 9 illustrates a UE operation for supporting PUSCH-LBRM according to the modified configurations A-2 and A-3. If the UE receives the instruction for PUSCH-LBRM (indicated by reference numeral 900), first, at least one processor identifies whether maxMIMO-Layer is configured (indicated by reference numeral 910). If the maxMIMO-Layer is configured, the UE may determine a value of the maxMIMO-Layer to a value of X in operation 920, and may terminate a process of determining the maximum number of layers for PUSCH-LBRM (indicated by reference numeral 960). In operation 910, if the UE determines that the parameter maxMIMO-Layers is not configured, then the UE identifies whether the maxRank is configured (indicated by reference numeral 930). If the maxRank is configured, the UE may determine the maximum value of maxRank for all BWPs of a serving cell to be X (indicated by reference numeral 940), and terminate the process of determining the maximum number of layers for PUSCH-LBRM (indicated by reference numeral 960). In operation 930, if it is determined that the parameter maxRank is not configured, then: if only maxNumberMIMO-LayersCB-PUSCH is configured, the UE may determine the maxNumberMIMO-LayersCB-PUSCH value to be the maximum number of layers "X"; and if only maxNumberMIMO-LayersNonCB-PUSCH is configured, the UE may determine the maxNumberMIMO-LayersNonCB-PUSCH value to be the maximum number of layers "X"; and if both the maxNumberMIMO-LayersCB-PUSCH and the maxNumberMIMO-LayersNonCB-PUSCH are configured, the maximum number of layers "X" may be determined based on two parameters (indicated by reference numeral 950). For example, if both parameters are configured, the maximum value or the minimum value of both parameters may be configured to be the maximum number of layers "X". Then, the UE may terminate a process of determining the maximum number of layers for the PUSCH-LBRM (indicated by reference numeral 960).

In addition, as in FIG. 8B, if the value of parameter maxMIMO-Layers included in the PUSCH-ServingCell-Config, configured in the base station, is the same as the maxRank value included in the pusch-Config, operations 910 and 920 in FIG. 9 may be omitted.

It should be noted that, in the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Third Embodiment

The third embodiment relates to a method and apparatus for applying an efficient uplink LBRM (UL-SCH LBRM or PUSCH LBRM) in performing data transmission.

In the current NR system, $TBS_{LBRM}$ is determined based on the maximum number of layers of a PUSCH or a PDSCH, configured via higher layer signaling (e.g., RRC). However, since these values are not determined until UE capabilities are reported from a UE to a base station, as shown in FIG. 10, a problem may occur in applying LBRM.

Figure 10:
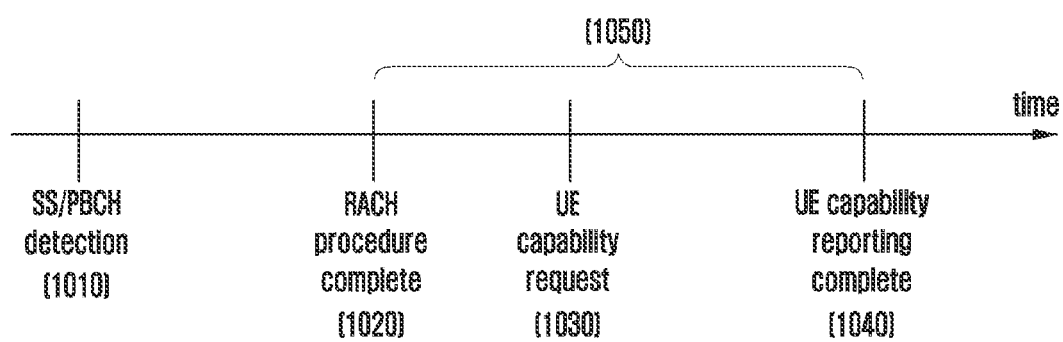
FIG. 10 illustrates ambiguity of parameter configuration for applying LBRM between a time point at which an RACH process is completed and a time point at which a UE capability reporting process is completed according to an embodiment of the disclosure.

FIG. 10 illustrates ambiguity of parameter configuration for applying LBRM between a time point at which an RACH process is completed and a time point at which a UE capability reporting process is completed according to an embodiment of the disclosure.

Referring to FIG. 10, there is a likelihood that configuration of the maximum number of layers of the PUSCH or PDSCH may be different between a gNB and a UE during a period of time 1050 between an operation 1020 in which the RACH procedure is completed and an operation 1040 in which the UE capability reporting is completed. In this case, there is a likelihood that the PUSCH decoding is not properly performed in the base station, and the PDSCH decoding may not be properly performed in the UE. Since the UE may not immediately decode the PDSCH after the RACH procedure, the UE may not receive any RRC configuration message.

Therefore, before the UE capability is reported to the base station, rules between the base station and the UE for the maximum number of layers of the PUSCH or PDSCH must be determined. In the above, the UE capability may be reported to the base station from a terminal or one element of a network system.

One of the solutions to the problem is to fix the value of the maximum number of layers "X" to a predetermined value or integer during a period of time 1050 of FIG. 10. For example, the value of the maximum number of layers "X" may be configured to be a certain integer, such as X=1, or may be promised to be configured to have a certain value mandated to the UE as the maximum number of layers in the band. Hereinafter, description will be made in the third embodiment or subsequent embodiments with regard to X=1, but the value of X is not limited thereto (e.g., an integer value, such as X may be configured to be 2, 3, or 4 may be configured). In addition, even if not specifically mentioned in the following embodiment, a process of configuring X to be a predetermined value may be omitted.

[Configuration B-1 for Rate Matching in Consideration of PUSCH-LBRM]

The maximum number of layers for one TB for UL-SCH is given by X, and is determined as follows.

Configuration 1: If the parameter maxMIMO-Layers included in the higher layer signaling PUSCH-ServingCell-Config is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured, the maximum number of layers for the PUSCH supported by the UE in the serving cell is determined to be X.

Configuration 4: In a case of not corresponding to configuration 1, configuration 2, and configuration 3, X is configured to be one.

The above configuration 1, configuration 2, configuration 3, and configuration 4 may be expressed as follows.

If the higher layer parameter maxMIMO-Layers of PUSCH-Serving CellConfig of the serving cell is configured, X is given by that parameter Else if the higher layer parameter maxRank of pusch-Config of the serving cell is configured, X is given by the maximum value of maxRank across all BWPs of the serving cell Else if the higher layer parameter for the maximum number of layers for PUSCH supported by the UE for the serving cell is configured, X is given by that parameter.

Otherwise, X=1.

The configuration 3 may be more clearly expressed as follows, as shown in the second embodiment, using maxNumberMIMO-LayersCB-PUSCH or maxNumberMIMO-LayersNonCB-PUSCH.

[Configuration B-2 for Rate Matching in Consideration of PUSCH-LBRM]

The maximum number of layers for one TB for UL-SCH is given by X, and determined as follows.

Configuration 1: If the parameter maxMIMO-Layers included in the higher layer signaling PUSCH-ServingCell-Config is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured, and the parameters maxNumberMIMO-LayersCB-PUSCH and maxNumberMIMO-LayersNonCB-PUSCH are configured, the maximum value among the parameters maxNumberMIMO-LayersCB-PUSCH or maxNumberMIMO-LayersNonCB-PUSCH is determined to be a value of X.

Configuration 4: If the maxMIMO-Layers and the maxRank are not configured, and only one of the parameters maxNumberMIMO-LayersCB-PUSCH and maxNumberMIMO-LayersNonCB-PUSCH is configured, the configured parameter is determined to be a value of X.

Configuration 5: In a case of not corresponding to configuration 1, configuration 2, configuration 3, and configuration 4, X is configured to be one.

The above configuration 1, configuration 2, configuration 3, and configuration 4 may be expressed as follows.

If the higher layer parameter maxMIMO-Layers of PUSCH-Serving CellConfig of the serving cell is configured, X is given by that parameter Elseif the higher layer parameter maxRank of pusch-Config of the serving cell is configured, X is given by the maximum value of maxRank across all BWPs of the serving cell Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH Else if only one of the higher layer parameters maxNumberMIMO-LayersCB-PUSCH and maxNumberMIMO-LayersNonCB-PUSCH is provided, X is given by that parameter Otherwise, X=1.

In the conditional statement, "provided" may be modified to "given" or "configured" and applied thereto. Further, in the conditional statement, the maximum of maxNumberMIMO-LayersCB-PUSCH and maxNumberMIMO-LayersNonCB-PUSCH may be replaced with max (maxNumberMIMO-LayersCB-PUSCH, maxNumberMIMO-LayersNonCB-PUSCH) and applied to the conditional statement. In addition, in the conditional statement, only one of the higher layer parameters maxNumberMIMO-LayersCB-PUSCH and maxNumberMIMO-LayersNonCB-PUSCH may be replaced with either maxNumberMIMO-LayersCB-PUSCH or maxNumberMIMO-LayersNonCB-PUSCH and applied to the conditional statement. As described above, conditions for the two parameters of maxNumberMIMO-LayersCB-PUSCH and maxNumberMIMO-LayersNonCB-PUSCH are required to be specified because the two parameters, which are parameters for the maximum number of layers indicating UE capability, may be reported to the base station and thus a clear definition of using one of the two parameters may be necessary for common understanding between the UE and the base station. As described above, the [Configuration B-2 for rate matching in consideration of PUSCH-LBRM]includes a process of configuring X to be a predetermined value in configuration 5, but this process may be omitted. In this case, configuration 4 may also be expressed as follows:

Otherwise, X is given by that parameter the provided (or configured) higher parameter between maxNumberMIMO-LayersCB-PUSCH and maxNumberMIMO-LayersNonCB-PUSCH In addition, if maxNumberMIMO-LayersCB-PUSCH and maxNumberMIMO-LayersNonCB-PUSCH are always configured together in [Configuration B-2 for rate matching in consideration of PUSCH-LBRM], configuration 4 of the [Configuration B-2 for rate matching in consideration of PUSCH-LBRM 2] may be omitted. If a system is configured to always have one of maxNumberMIMO-LayersCB-PUSCH and maxNumberMIMO-LayersNonCB-PUSCH in the [Configuration B-2 for rate matching in consideration of PUSCH-LBRM], it would be obvious that configuration 3 may be omitted.

If the value of parameter maxMIMO-Layers included in the PUSCH-ServingCellConfig configured at the base station is the same as the maxRank value included in the pusch-Config, [Configuration B-1 for rate matching in consideration of PUSCH-LBRM] and [Configuration B-2 for rate matching in consideration of PUSCH-LBRM] may also be more simply shown as follows.

[Configuration B-3 for Rate Matching in Consideration of PUSCH-LBRM]

The maximum number of layers for one TB for UL-SCH is given by X, and is determined as follows:

Configuration 1: If the parameter maxRank included in higher layer signaling pusch-Config is configured, the maximum value among the maxRank values defined for all BWPs of the serving cell is determined to be a value of X.

Configuration 2: If the maxRank is not configured, the maximum number of layers for the PUSCH supported by the UE in the serving cell is determined to be X.

Configuration 3: In a case of not corresponding to configuration 1 and configuration 2, X is configured to be one.

The above configuration 1, configuration 2, and configuration 3 may be expressed as follows.

if the higher layer parameter maxRank of pusch-Config of the serving cell is configured, X is given by the maximum value of maxRank across all BWPs of the serving cell Elseif X is given by the maximum number of layers for PUSCH supported by the UE for the serving cell Otherwise, X=1.

[Configuration B-4 for Rate Matching in Consideration of PUSCH-LBRM]

The maximum number of layers for one TB for UL-SCH is given by X, and is determined as follows.

Configuration 1: If the parameter maxRank included in higher layer signaling pusch-Config is configured, the maximum value among the maxRank values defined for all BWPs of the serving cell is determined to be a value of X.

Configuration 2: If the maxRank is not configured and parameters maxNumberMIMO-LayersCB-PUSCH and maxNumberMIMO-LayersNonCB-PUSCH are configured, the maximum value among the parameters maxNumberMIMO-LayersCB-PUSCH or maxNumberMIMO-LayersNonCB-PUSCH is determined to be a value of X.

Configuration 3: If the maxRank is not configured and only one of the parameters maxNumberMIMO-LayersCB-PUSCH and maxNumberMIMO-LayersNonCB-PUSCH is configured, the configured parameter is determined to be a value of X.

Configuration 4: In a case of not corresponding to configuration 1, configuration 2, and configuration 3, X is configured to be one.

The above configuration 1, configuration 2, configuration 3, and configuration 4 may be expressed as follows.

If the higher layer parameter maxRank of pusch-Config of the serving cell is configured, X is given by the maximum value of maxRank across all BWPs of the serving cell Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH)

Else if only one of the higher layer parameters maxNumberMIMO-LayersCB-PUSCH and maxNumberMIMO-LayersNonCB-PUSCH is provided, X is given by that parameter Otherwise, X=1.

In the conditional statement, "provided" may be modified to "given" or "configured" and applied thereto. In the conditional statement, the maximum of maxNumberMIMO-LayersCB-PUSCH and maxNumberMIMO-LayersNonCB-PUSCH may be replaced with max (maxNumberMIMO-LayersCB-PUSCH, maxNumberMIMO-LayersNonCB-PUSCH) and applied to the conditional statement. Further, in the conditional statement, only one of the higher layer parameters maxNumberMIMO-LayersCB-PUSCH and maxNumberMIMO-LayersNonCB-PUSCH may be replaced with either maxNumberMIMO-LayersCB-PUSCH or maxNumberMIMO-LayersNonCB-PUSCH and applied to the conditional statement. As described above, the conditions for the two parameters of maxNumberMIMO-LayersCB-PUSCH and maxNumberMIMO-LayersNonCB-PUSCH are required to be specified because the two parameters may be reported to the base station, which are parameters for the maximum number of layers indicating UE capability, and thus a clear definition of using one of the two parameters may be necessary for common understanding between the UE and the base station.

Figure 11:
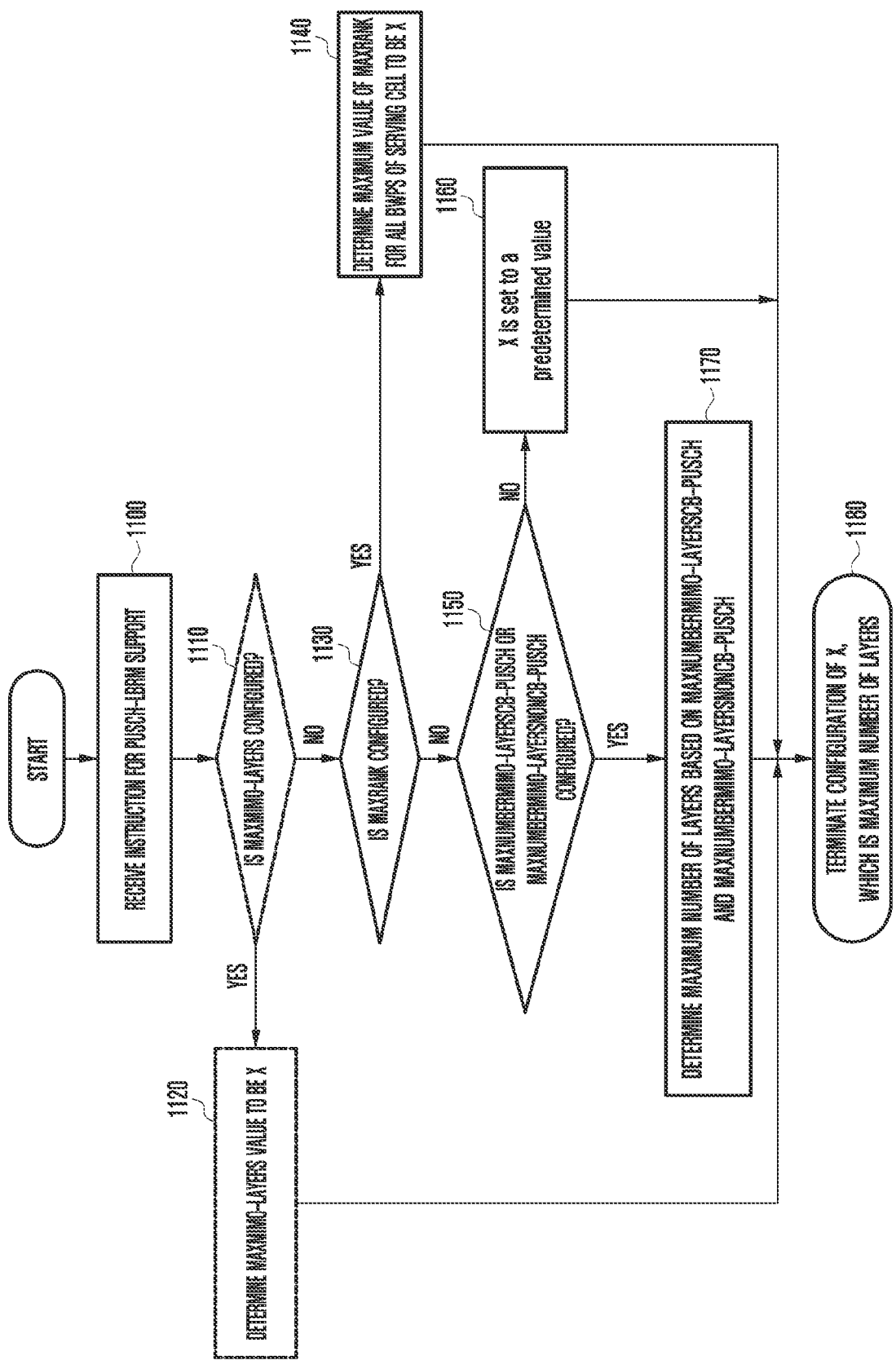
FIG. 11 illustrates a terminal operation for supporting PUSCH-LBRM according to an embodiment of the disclosure.

An example of the operation diagram of modified configurations B-1, B-2, B-3, and B-4 for rate matching in consideration of the PUSCH-LBRM is shown in FIG. 11.

FIG. 11 illustrates an example of an operation of a UE for supporting PUSCH-LBRM according to configuration B according to an embodiment of the disclosure.

Referring to FIG. 11, operations 1100, 1110, 1120, 1130, and 1140 of FIG. 11 are the same as those of operations 900, 910, 920, 930, and 940 of FIG. 9. In FIG. 11, as in operation 1150, operation is distinguished in consideration of a case in which maxNumberMIMO-LayersCB-PUSCH or maxNumberMIMO-LayersNonCB-PUSCH is configured via higher layer signaling and a case in which maxNumberMIMO-LayersCB-PUSCH or maxNumberMIMO-LayersNonCB-PUSCH is not configured via higher layer signaling. For example, in operation 1150, if at least one of the two parameters is configured, then the maximum number of layers "X" may be determined based on the value or the values based on the described method (indicated by reference numeral 1170), and if both parameters are not configured, X may be configured to be a predetermined value in operation 1160.

Operations 1150 and 1170 may be expressed in various ways. For example, if only one of maxNumberMIMO-LayersCB-PUSCH and maxNumberMIMO-LayersNonCB-PUSCH is configured, the parameter is determined to be the maximum layer number "X", and if both the maxNumberMIMO-LayersCB-PUSCH and the maxNumberMIMO-LayersNonCB-PUSCH are configured, the maximum number of layers "X" is determined based on the two parameters (not shown). The process of determining the maximum number of layers "X" based on the two parameters may be represented by using a method, such as max (maxNumberMIMO-LayersCB-PUSCH, maxNumberMIMO-LayersNonCB-PUSCH) or min (maxNumberMIMO-LayersCB-PUSCH, maxNumberMIMO-LayersNonCB-PUSCH).

If the value of parameter maxMIMO-Layers included in the PUSCH-ServingCellConfig, configured at the base station, is the same as the maxRank value included in the pusch-Config, operations 1110 and 1120 may be omitted.

In the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Fourth Embodiment

The fourth embodiment relates to a method and apparatus for applying an efficient uplink LBRM (UL-SCH LBRM or PUSCH LBRM) in performing data transmission.

As another method for solving the problem described in the third embodiment, if a value for the maximum number of layers of a PUSCH or PDSCH cannot be determined from an RRC message, a method of not applying LBRM is proposed as follows.

[Configuration C-1 for Rate Matching in Consideration of PUSCH-LBRM]

The maximum number of layers for one TB for UL-SCH is given by X, and is determined as follows.

Configuration 1: If the parameter maxMIMO-Layers included in the higher layer signaling PUSCH-ServingCellConfig is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured, the maximum number of layers for the PUSCH supported by the UE in the serving cell is determined to be X.

Configuration 4: In a case of not corresponding to configurations 1, 2 and 3, no LBRM is applied (i.e., no LBRM is applied if the maximum number of layers cannot be determined irrespective of the instruction for LBRM).

The above configuration 1, configuration 2, configuration 3, and configuration 4 may be expressed as follows.

If the higher layer parameter maxMIMO-Layers of PUSCH-Serving CellConfig of the serving cell is configured, X is given by that parameter Elseif the higher layer parameter maxRank of pusch-Config of the serving cell is configured, X is given by the maximum value of maxRank across all BWPs of the serving cell Elseif the higher layer parameter for the maximum number of layers for PUSCH supported by the UE for the serving cell is configured, X is given by that parameter.

Otherwise, no LBRM is applied.

The last part of the conditional statement may be expressed as "otherwise, no LBRM is applied". The configuration 3 may be more clearly indicated using maxNumberMIMO-LayersCB-PUSCH or maxNumberMIMO-LayersNonCB-PUSCH, as follows.

[Configuration C-2 for Rate Matching in Consideration of PUSCH-LBRM]

The maximum number of layers for one TB for UL-SCH is given by X, and is determined as follows.

Configuration 1: If the parameter maxMIMO-Layers included in the higher layer signaling PUSCH-ServingCell-Config is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured, and the parameters maxNumberMIMO-LayersCB-PUSCH and maxNumberMIMO-LayersNonCB-PUSCH are configured, the maximum value among the parameters maxNumberMIMO-LayersCB-PUSCH or maxNumberMIMO-LayersNonCB-PUSCH is determined to be a value of X.

Configuration 4: If the maxMIMO-Layers and the maxRank are not configured, and only one of the parameters maxNumberMIMO-LayersCB-PUSCH and maxNumberMIMO-LayersNonCB-PUSCH is configured, the configured parameter is determined to be a value of X.

Configuration 5: In a case of not corresponding to configurations 1, 2, 3, and 4, LBRM is not applied.

The above configuration 1, configuration 2, configuration 3, and configuration 4, and configuration 5 may be expressed as follows.

If the higher layer parameter maxMIMO-Layers of PUSCH-Serving CellConfig of the serving cell is configured, X is given by that parameter Else if the higher layer parameter maxRank of pusch-Config of the serving cell is configured, X is given by the maximum value of maxRank across all BWPs of the serving cell Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH)

Elseif only one of the higher layer parameters maxNumberMIMO-LayersCB-PUSCH and maxNumberMIMO-LayersNonCB-PUSCH is provided, X is given by that parameter Otherwise, no LBRM is applied.

As seen above, the part specified and applied as "provided" may be used interchangeably with "given" or "configured" or may have the same meaning with each other. That is, "provided" in the conditional statement may be modified to "given" or "configured" and applied thereto. In the conditional statement, the maximum of maxNumberMIMO-LayersCB-PUSCH and maxNumberMIMO-LayersNonCB-PUSCH may be replaced with max (maxNumberMIMO-LayersCB-PUSCH, maxNumberMIMO-LayersNonCB-PUSCH) and applied to the conditional statement. Also, in the conditional statement, only one of the higher layer parameters maxNumberMIMO-LayersCB-PUSCH and maxNumberMIMO-LayersNonCB-PUSCH may be replaced with either maxNumberMIMO-LayersCB-PUSCH or maxNumberMIMO-LayersNonCB-PUSCH and applied to the conditional statement. As described above, conditions for the two parameters of maxNumberMIMO-LayersCB-PUSCH and maxNumberMIMO-LayersNonCB-PUSCH are required to be specified because the two parameters, which are parameters for the maximum number of layers indicating UE capability, may be reported to the base station, and thus a clear definition of using one of the two parameters may be necessary for common understanding between the UE and the base station.

If maxNumberMIMO-LayersCB-PUSCH and maxNumberMIMO-LayersNonCB-PUSCH are always configured together in the [Configuration C-2 for rate matching in consideration of PUSCH-LBRM], configuration 4 of the [Configuration C-2 for rate matching in consideration of PUSCH-LBRM] may be omitted, and in a case where a system in which only one of maxNumberMIMO-LayersCB-PUSCH and maxNumberMIMO-LayersNonCB-PUSCH is always configured in the [Configuration C-2 for rate matching in consideration of PUSCH-LBRM], it would be obvious that configuration 3 thereof is omissible.

If the value of parameter maxMIMO-Layers included in the PUSCH-ServingCellConfig configured at the base station is the same as the maxRank value included in the pusch-Config, [Configuration C-1 for rate matching in consideration of PUSCH-LBRM] and [Configuration C-2 for rate matching in consideration of PUSCH-LBRM] may also be described more simply as follows.

[Configuration C-3 for Rate Matching in Consideration of PUSCH-LBRM]

The maximum number of layers for one TB for UL-SCH is given by X, and is determined as follows.

Configuration 1: If the parameter maxRank included in higher layer signaling pusch-Config is configured, the maximum value among the maxRank values defined for all BWPs of the serving cell is determined to be a value of X.

Configuration 2: If the maxRank is not configured, the maximum number of layers for the PUSCH supported by the UE in the serving cell is determined to be X.

Configuration 3: In a case of not corresponding to configuration 1 and configuration 2, LBRM is not applied.

The above configuration 1, configuration 2, and configuration 3 may be expressed as follows.

if the higher layer parameter maxRank of pusch-Config of the serving cell is configured, X is given by the maximum value of maxRank across all BWPs of the serving cell Else if X is given by the maximum number of layers for PUSCH supported by the UE for the serving cell Otherwise, no LBRM is applied.

[Configuration C-4 for Rate Matching in Consideration of PUSCH-LBRM]

The maximum number of layers for one TB for UL-SCH is given by X, and is determined as follows:

Configuration 1: If the parameter maxRank included in higher layer signaling pusch-Config is configured, the maximum value among the maxRank values defined for all BWPs of the serving cell is determined to be a value of X.

Configuration 2: If the maxRank is not configured and parameters maxNumberMIMO-LayersCB-PUSCH and maxNumberMIMO-LayersNonCB-PUSCH are configured, the maximum value among the parameters maxNumberMIMO-LayersCB-PUSCH and maxNumberMIMO-LayersNonCB-PUSCH is determined to be a value of X.

Configuration 3: If the maxRank is not configured and only one of the parameters maxNumberMIMO-LayersCB-PUSCH and maxNumberMIMO-LayersNonCB-PUSCH is configured, the configured parameter is determined to be a value of X.

Configuration 4: In a case of not corresponding to configurations 1, 2, and 3, LBRM is not applied.

The above configuration 1, configuration 2, configuration 3, and configuration 4 may be expressed as follows.

If the higher layer parameter maxRank of pusch-Config of the serving cell is configured, X is given by the maximum value of maxRank across all BWPs of the serving cell Else if both the higher layer parameters maxNumberMIMO-LayersCB-PUSCH and maxNumberMIMO-LayersNonCB-PUSCH are provided, X is given by the maximum of maxNumberMIMO-LayersCB-PUSCH and maxNumberMIMO-LayersNonCB-PUSCH)

Else if only one of the higher layer parameters maxNumberMIMO-LayersCB-PUSCH and maxNumberMIMO-LayersNonCB-PUSCH is provided, X is given by that parameter Otherwise, no LBRM is applied.

In the conditional statement, "provided" may be modified to "given" or "configured" and applied thereto. In the conditional statement, the maximum of maxNumberMIMO-LayersCB-PUSCH and maxNumberMIMO-LayersNonCB-PUSCH may be replaced with max (maxNumberMIMO-LayersCB-PUSCH, maxNumberMIMO-LayersNonCB-PUSCH) and applied to the conditional statement. Also, in the conditional statement, only one of the higher layer parameters maxNumberMIMO-LayersCB-PUSCH and maxNumberMIMO-LayersNonCB-PUSCH may be replaced with either maxNumberMIMO-LayersCB-PUSCH or maxNumberMIMO-LayersNonCB-PUSCH and applied to the conditional statement. As described above, conditions for the two parameters of maxNumberMIMO-LayersCB-PUSCH and maxNumberMIMO-LayersNonCB-PUSCH are required to be specified because the two parameters, which are parameters for the maximum number of layers indicating UE capability, may be reported to the base station and thus a clear definition of using one of the two parameters may be necessary for common understanding between the UE and the base station.

Figure 12:
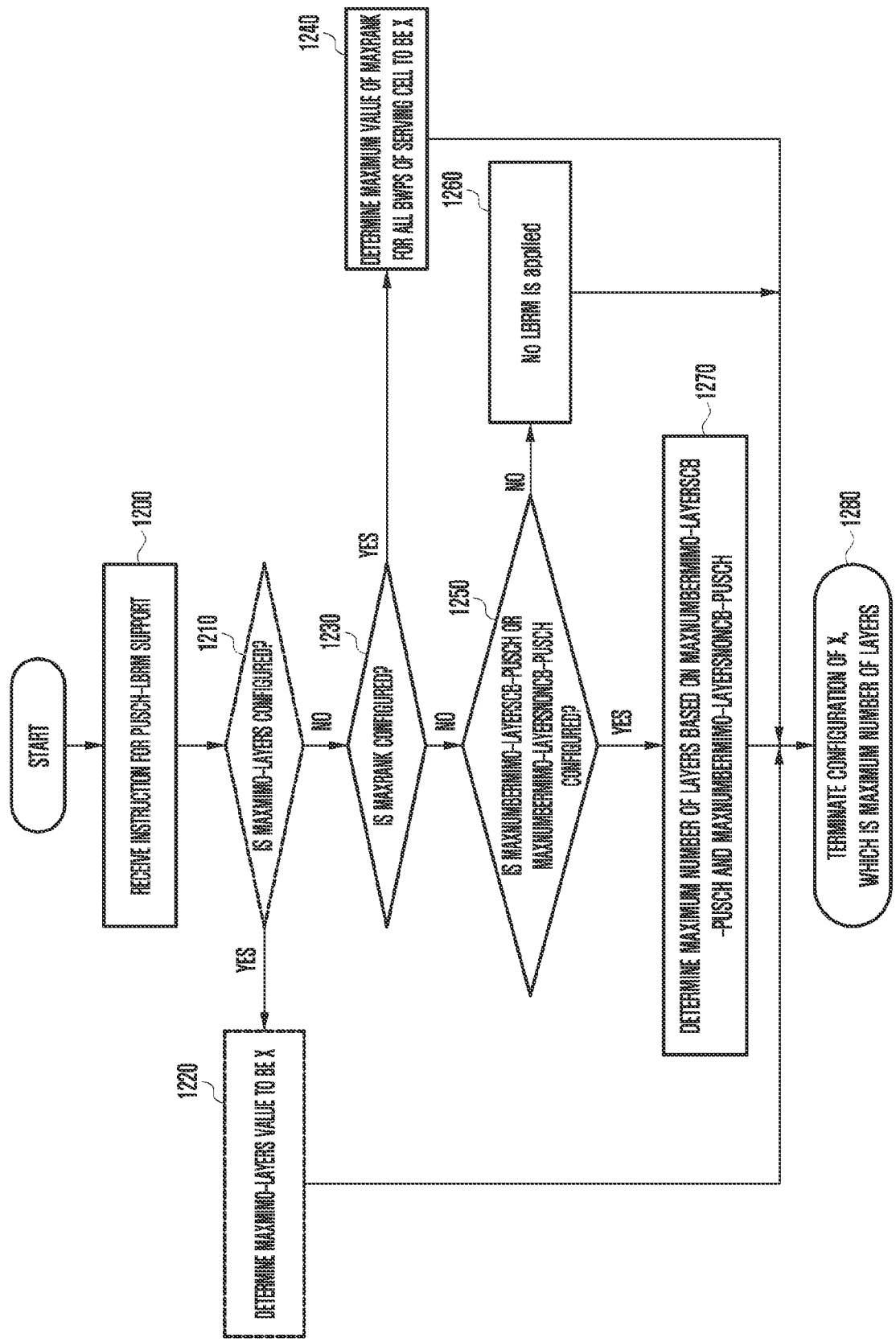
FIG. 12 illustrates a terminal operation for supporting PUSCH-LBRM according to an embodiment of the disclosure.

FIG. 12 illustrates an example of an operation diagram of modified configurations C-1, C2, C-3, and C-4 for rate matching in consideration of the PUSCH-LBRM according to an embodiment of the disclosure. FIG. 12 illustrates an example of an operation of a UE for supporting PUSCH-LBRM according to configuration C.

Referring to FIG. 12, operations 1200, 1210, 1220, 1230, 1240, 1250, and 1270 of FIG. 12 are similar to operations 1100, 1110, 1120, 1130, 1140, 1150, and 1170 of FIG. 11, but if maxNumberMIMO-LayersCB-PUSCH or maxNumberMIMO-LayersNonCB-PUSCH is not configured via higher layer signaling, the UE may not configure the maximum number of layers "X" and then apply a process of postponing applying of LBRM until at least one value of maxMIMO-Layers, maxRank, maxNumberMIMO-LayersCB-PUSCH, or maxNumberMIMO-LayersNonCB-PUSCH is configured via higher layer signaling (indicated by reference numeral 1260). If the value of parameter maxMIMO-Layers included in the PUSCH-ServingCellConfig configured at the base station is the same as the maxRank value included in the pusch-Config, operations 1210 and 1220 may be omitted.

It should be noted that, in the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Fifth Embodiment

A fifth embodiment relates to a method and apparatus for applying an efficient uplink LBRM (UL-SCH LBRM or PUSCH LBRM) in performing data transmission.

In the current NR system, $TBS_{LBRM}$ is determined based on the maximum number of layers of a PUSCH or a PDSCH configured via higher layer signaling (e.g., RRC). Thus, as shown in FIG. 10, rules between a base station and a UE for the maximum number of layers of PUSCH or PDSCH should be determined before UE capability is reported to the base station.

A method for solving the problem has been proposed in the third embodiment and the fourth embodiment, and the proposed method may be more simply expressed as follows. [Configuration D-1 for Rate Matching in Consideration of PUSCH-LBRM]

The maximum number of layers for one TB for UL-SCH is given by X, and is determined as follows.

Configuration 1: If the parameter maxMIMO-Layers included in the higher layer signaling PUSCH-ServingCellConfig is configured, X is determined to be a value of the parameter maxMIMO-Layers.

Configuration 2: If the maxMIMO-Layers is not configured and the parameter maxRank included in higher layer signaling pusch-Config is configured, the maximum value among the maxRank values defined for all BWPs of the serving cell is determined to be a value of X.

Configuration 3: If the maxMIMO-Layers and the maxRank are not configured and the UE capability is reported, X is determined to be the maximum number of layers supported by the UE.

Configuration 4: In a case of not corresponding to configuration 1, configuration 2, and configuration 3, X is configured to be one.

The above configuration 1, configuration 2, configuration 3, and configuration 4 may be expressed as follows.

If the higher layer parameter maxMIMO-Layers of PUSCH-Serving CellConfig of the serving cell is configured, X is given by that parameter Else if the higher layer parameter maxRank of pusch-Config of the serving cell is configured, X is given by the maximum value of maxRank across all BWPs of the serving cell Else if UE capability is reported, X is given by the maximum number of layers for PUSCH supported by the UE.

Otherwise, X=1.

If the value of parameter maxMIMO-Layers included in the PUSCH-ServingCellConfig, configured at the base station, is the same as the maxRank value included in the pusch-Config, configuration 1 may be omitted in the above [Configuration D-1 for rate matching in consideration of the PUSCH-LBRM]. It should be noted that various modifications are possible in a case of configuration 4 in the [Configuration D-1 for rate matching in consideration of PUSCH-LBRM]. For example, "X" may be configured to be a predetermined another certain integer, or configured to be a certain value, such as a value mandated as the maximum number of layers determined to be supported by the UE in the band.

The maximum number of layers determined to be supported by the UE in the band may differ for each frequency range. For example, in FR1 of the NR system, the UE may have to unconditionally support four layers, and in FR2, the UE may have to support two layers. Therefore, in this case, X may be configured to be 4 for a carrier belonging to FR1 and X may be configured to be 2 for a carrier belonging to FR2. As such, a value of X may be differently defined in FR1 and FR2. In the disclosure, for the sake of convenience, an embodiment will be described with regard to X=1, but it is not necessarily limited thereto. Further, the disclosure may consider the case of not applying or postponing LBRM.

Figure 13:
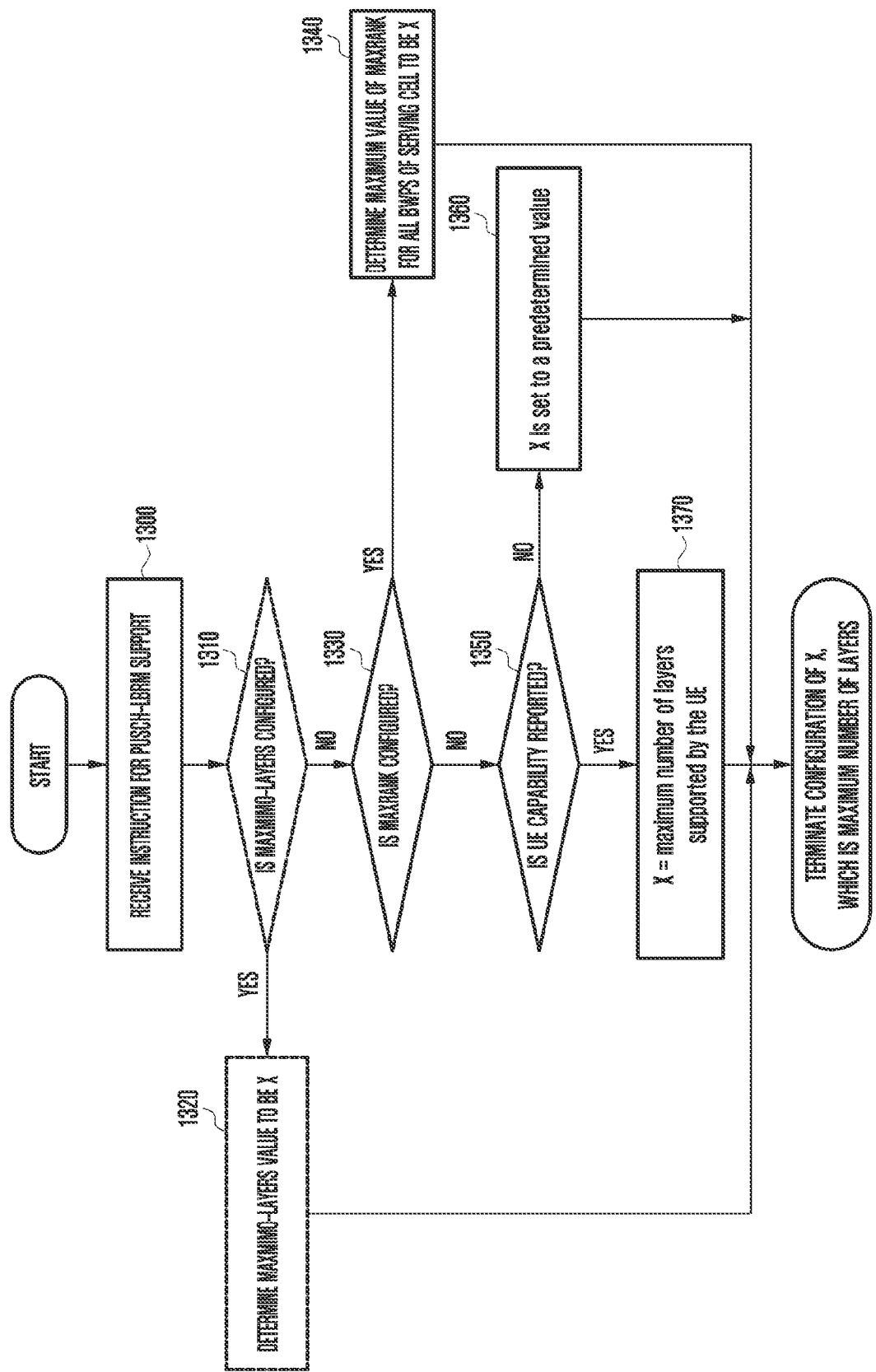
FIG. 13 illustrates a terminal operation for supporting PUSCH-LBRM according to an embodiment of the disclosure.

FIG. 13 illustrates an example of the operation diagram of the modified configuration D-1 for rate matching in consideration of PUSCH-LBRM according to an embodiment of the disclosure. FIG. 13 illustrates an example of an operation of a UE of supporting PUSCH-LBRM according to configuration D.

Referring to FIG. 13, operations 1300, 1310, 1320, 1330, and 1340 of FIG. 11 are similar to operations 1100, 1110, 1120, 1130, and 1140 of FIG. 11, but if the maxRank is not configured in operation 1330, the UE may determine whether UE capability is reported in operation 1350. In operation 1350, if the UE determines that the UE capability has been reported, X is configured to be the maximum number of layers supported by the UE, in operation 1370. If the UE capability has not been reported, X may be configured to be a predetermined certain integer, such as X=1, or may be configured to be a certain value, such as a value mandated to the UE as the maximum number of layers in the band, in operation 1360. If the parameter maxMIMO-Layers value included in the PUSCH-ServingCellConfig configured at the base station is the same as the maxRank value included in the pusch-Config, operations 1310 and 1320 may be omitted.

Sixth Embodiment

The sixth embodiment relates to a method and apparatus for applying an efficient downlink LBRM (PDSCH-LBRM, DL-SCH LBRM, or PCH LBRM) in performing data transmission. For the sake of convenience, this is hereinafter referred to as PDSCH-LBRM.

Currently, if it is determined to apply the PDSCH-LBRM between a base station and a terminal, $TBS_{LBRM}$ is determined based on the following configuration.

[Configuration for Rate Matching in Consideration of PDSCH-LBRM]

The maximum number of layers for one TB for DL-SCH/PCH is given by the minimum value among X and 4 and is determined as follows.

Configuration 1: If the parameter maxMIMO-Layers included in the higher layer signaling PDSCH-ServingCell-Config is configured, X is determined to be the number of the maxMIMO-Layers.

Configuration 2: In a case of not corresponding to configuration 1, X is determined to be the maximum number of layers for the PDSCH supported by the UE in the serving cell.

The above configuration 1 and configuration 2 may be expressed as follows.

Figure 14:
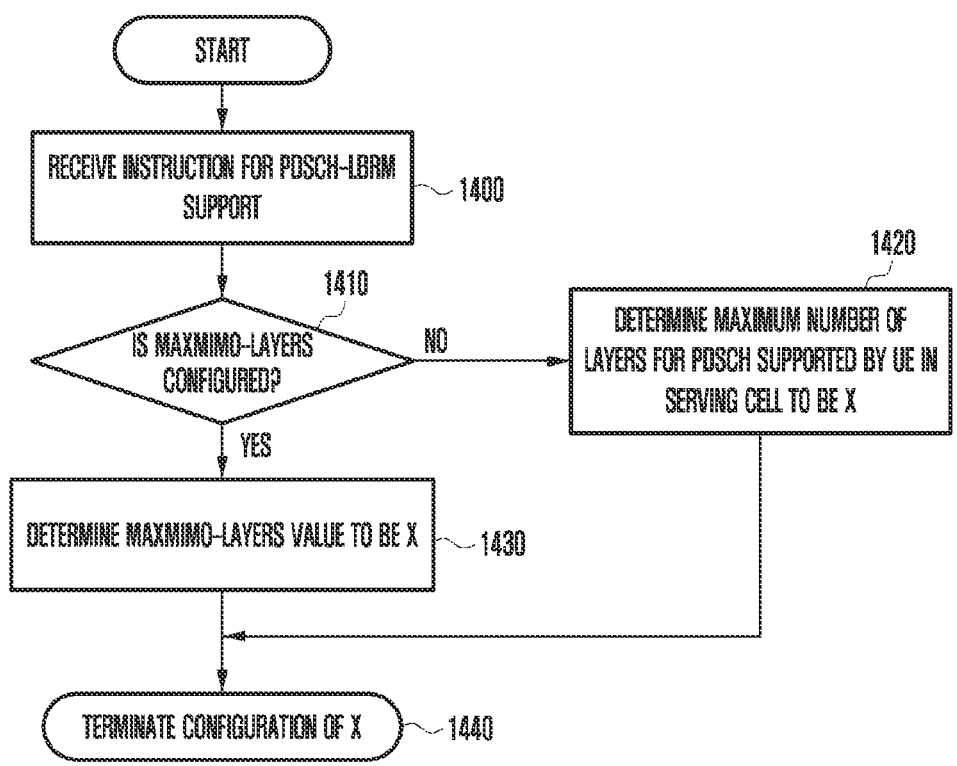
FIG. 14 illustrates a terminal operation for supporting PDSCH-LBRM according to an embodiment of the disclosure.

If the higher layer parameter maxMIMO-Layers of PDSCH-ServingCellConfig of the serving cell is configured, X is given by that parameter Otherwise, X is given by the maximum number of layers for PDSCH supported by the UE for the serving cell FIG. 14 illustrates an example of terminal operation for the configuration of [Configuration for rate matching in consideration of PDSCH-LBRM] for PDSCH-LBRM according to an embodiment of the disclosure. FIG. 14 illustrates an embodiment of a terminal operation for PDSCH-LBRM support.

Referring to FIG. 14, if the terminal receives an instruction for PDSCH-LBRM (indicated by reference numeral 1400), first, at least one processor identifies whether the parameter maxMIMO-Layer is configured (indicated by reference numeral 1410). If the parameter maxMIMO-Layer is configured, the terminal determines a value of parameter maxMIMO-Layer to be a value of X (indicated by reference numeral 1420), and may terminate a process of determining the value of X for the PDSCH-LBRM (indicated by reference numeral 1440). If it is determined that the parameter maxMIMO-Layers is not configured, the terminal determines the maximum number of layers for the PDSCH supported by a UE in a serving cell to be X (indicated by reference numeral 1430), and may terminate a process of determining the value of X for the PDSCH-LBRM (indicated by reference numeral 1440).

Operation 1420 of FIG. 14, which corresponds to configuration 2 in the [Configuration for rate matching in consideration of PDSCH-LBRM], includes a process of determining X to be the maximum number of layers for the PDSCH supported by the UE in the serving cell. However, the definition of the maximum number of layers is somewhat ambiguous, so a clearer definition is needed.

For example, in determining the maximum number of layers, if a parameter maxNumberMIMO-LayersPDSCH is configured via higher layer signaling, a value of X may be determined based on the parameter. As an embodiment, if maxNumberMIMO-Layers-PDSCH is configured (or given), a value of the maxNumberMIMO-Layers-PDSCH may be determined to be X.

In summary, an embodiment of a modified configuration for rate matching in consideration of PDSCH-LBRM may be described as follows.

[Modified Configuration E-1 for Rate Matching in Consideration of PDSCH-LBRM]

The maximum number of layers for one TB for DL-SCH/PCH is given by the minimum value among X and 4, and is determined as follows.

Configuration 1: If the parameter maxMIMO-Layers included in the higher layer signaling PDSCH-ServingCell-Config is configured, X is determined to be the parameter maxMIMO-Layers.

Configuration 2: In a case of not corresponding to configuration 1, X is determined to be the parameter maxNumberMIMO-Layers-PDSCH of higher layer signaling.

The above configuration 1 and configuration 2 may be expressed as follows.

If the higher layer parameter maxMIMO-Layers of PDSCH-ServingCellConfig of the serving cell is configured, X is given by that parameter Otherwise, X is given by the higher layer parameter maxNumberMIMO-LayersPDSCH.

Figure 15:
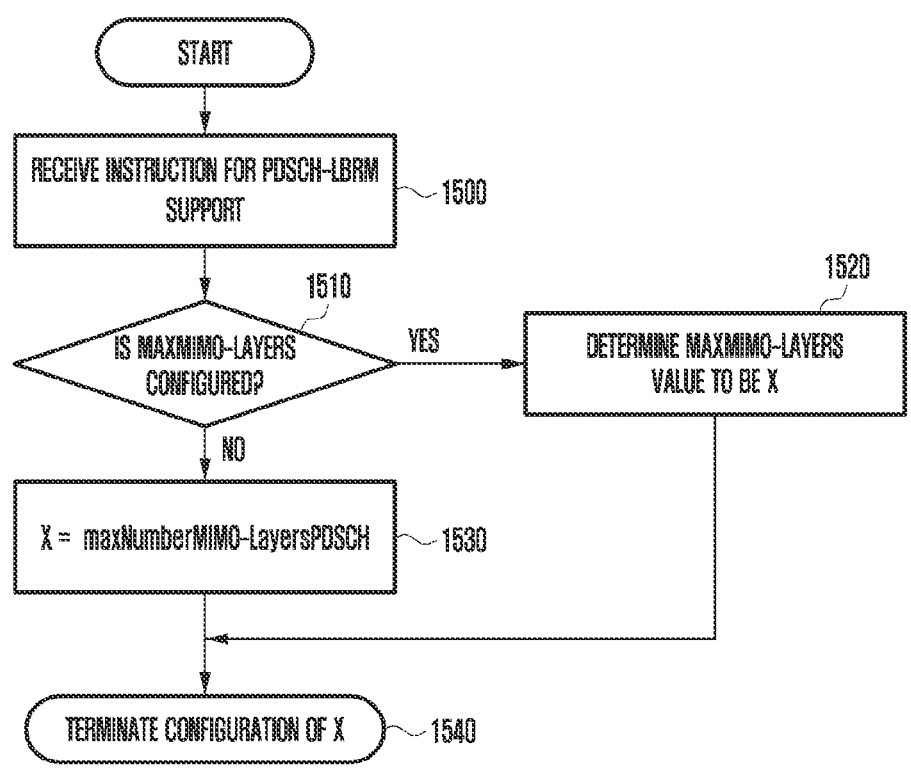
FIG. 15 illustrates a terminal operation for supporting PDSCH-LBRM according to an embodiment of the disclosure.

FIG. 15 illustrates an example of a terminal operation for the configuration of [Modified configuration E-1 for rate matching in consideration of PDSCH-LBRM] for PDSCH-LBRM according to an embodiment of the disclosure. FIG. 15 illustrates an embodiment of an operation of a terminal for supporting PDSCH-LBRM according to configuration E.

Referring to FIG. 15, if the UE receives an instruction for PDSCH-LBRM (indicated by reference numeral 1500), first, at least one processor identifies whether the parameter maxMIMO-Layer is configured (indicated by reference numeral 1510). If the parameter maxMIMO-Layer is configured, the UE may determine a value of the parameter maxMIMO-Layer to be a value of X, and terminate a process of determining the value of X for the PDSCH-LBRM (indicated by reference numeral 1540). If it is determined that the parameter maxMIMO-Layers is not configured in operation 1510, the UE may determine the maxNumberMIMO-LayersPDSCH to be X (indicated by reference numeral 1530), and may terminate a process of determining the value of X for the PDSCH-LBRM (indicated by reference numeral 1540).

It should be noted that, in the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Seventh Embodiment

The seventh embodiment relates to a method and apparatus for applying an efficient downlink LBRM (PDSCH LBRM, DL-SCH LBRM, or PCH LBRM) in performing data transmission. For the sake of convenience, this is hereinafter referred to as "PDSCH-LBRM".

In the current NR system, $TBS_{LBRM}$ is determined based on the maximum number of layers of a PUSCH or a PDSCH, configured via higher layer signaling (e.g., RRC). However, since these values are not determined until UE capabilities are reported from a UE to a base station, as shown in FIG. 10, a problem may occur in a case of applying of LBRM. That is, there is a likelihood that the configuration of the maximum number of layers of the PUSCH or PDSCH may be different between a gNB and a UE during a period of time 1050 between an operation 1020 in which the RACH procedure is completed and an operation 1040 in which the UE capability reporting is completed, in FIG. 10. In this case, there is a likelihood that the PUSCH decoding is not properly performed in the base station, and the PDSCH decoding may not be properly performed in the UE. In other words, since the UE may not immediately decode the PDSCH after the RACH procedure, the UE may not receive any RRC configuration message.

Therefore, before the UE capability is reported to the base station, rules between the base station and the UE for the maximum number of layers of the PUSCH or PDSCH must be determined.

One solution to the problem is to fix a value of the maximum number of layers "X" to a predetermined value or integer during a period of time 1050 of FIG. 10. For example, the value of the maximum number of layers "X" may be configured to be a certain integer, such as X=1, or may be promised to be configured to have a certain value mandated to the UE as the maximum number of layers in the band. Hereinafter, description will be made in the seventh embodiment or subsequent embodiments, with regard to X=1, but the value of X is not limited thereto.

[Configuration F-1 for Rate Matching in Consideration of PDSCH-LBRM]

The maximum number of layers for one TB for DL-SCH/PCH is given by the minimum value among X and 4, and is determined as follows.

Configuration 1: If the parameter maxMIMO-Layers included in the higher layer signaling PDSCH-ServingCell-Config is configured, X is determined to be the parameter maxMIMO-Layers.

Configuration 2: If the maxMIMO-Layers is not configured and the parameter maxNumberMIMO-Layers-PDSCH of higher layer signaling is configured, X is determined to be the parameter maxNumberMIMO-Layers-PDSCH.

Configuration 3: In a case of not corresponding to configuration 1 and configuration 2, X is configured to be one.

The above configuration 1, configuration 2, and configuration 3 may be expressed as follows.

If the higher layer parameter maxMIMO-Layers of PDSCH-ServingCellConfig of the serving cell is configured, X is given by that parameter Else if the higher layer parameter maxNumberMIMO-LayersPDSCH is configured, X is given by that parameter Otherwise, X=1.

In the above, "configured" may be expressed as "given". Configuration 2 in the [Configuration F-1 for rate matching in consideration of PDSCH-LBRM] may be expressed in another form as follows.

[F-2: Configuration 2']

Else if the higher layer parameter maxNumberMIMO-LayersPDSCH is configured, X is given by the maximum number of layers for PDSCH supported by the UE for the serving cell In the above, "configured" may be expressed as "given". In addition, in the configuration 3, X may be configured to be an integer different from 1 or to a different parameter.

Figure 16:
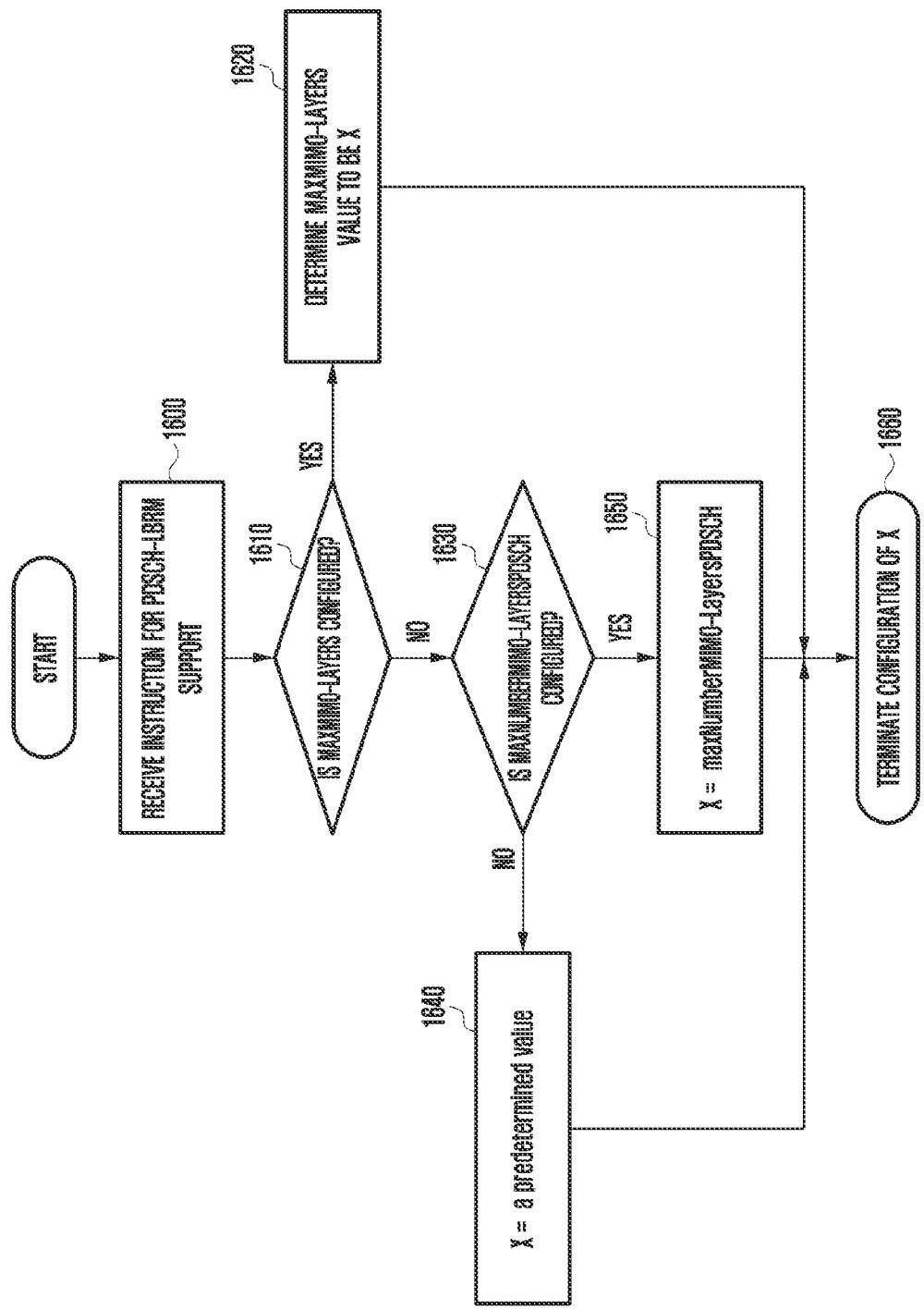
FIG. 16 illustrates a terminal operation for supporting PDSCH-LBRM according to an embodiment of the disclosure.

FIG. 16 illustrates an example of a terminal operation for the configuration of [Modified configuration F-1 for rate matching in consideration of PDSCH-LBRM] for PDSCH-LBRM according to an embodiment of the disclosure. FIG. 16 illustrates an embodiment of a terminal operation for PDSCH-LBRM support.

Referring to FIG. 16, if a terminal receives an instruction for PDSCH-LBRM (indicated by reference numeral 1600), first, at least one processor identifies whether the parameter maxMIMO-Layer is configured (indicated by reference numeral 1610). If the parameter maxMIMO-Layer is configured, the UE may determine a value of the parameter maxMIMO-Layer may be determined to be a value of X (indicated by reference numeral 1620), and may terminate a process of determining the value of X for the PDSCH-LBRM (indicated by reference numeral 1660). In operation 1610, if it is determined that the parameter maxMIMO-Layers is not configured, the terminal may determine whether maxNumberMIMO-LayersPDSCH is configured (indicated by reference numeral 1630). In operation 1630, if it is determined that the maxNumberMIMO-LayersPDSCH value is configured, the terminal may determine the maxNumberMIMO-LayersPDSCH to be X (indicated by reference numeral 1650), and may terminate a process of determining the value of X for the PDSCH-LBRM (indicated by reference numeral 1660). However, in operation 1630, if it is determined that the maxNumberMIMO-LayersPDSCH value is not configured, the terminal may determine X to be a predetermined value, such as X=1 (indicated by reference numeral 1640), and may terminate a process of configuring X and then apply PDSCH-LBRM thereto (indicated by reference numeral 1660).

In the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Eighth Embodiment

The eighth embodiment relates to a method and apparatus for applying an efficient downlink LBRM (PDSCH LBRM, DL-SCH LBRM, or PCH LBRM) in performing data transmission. For the sake of convenience, this is hereinafter referred to as "PDSCH-LBRM".

As another method for solving the problem described in the seventh embodiment, if a value for the maximum number of layers of a PUSCH or PDSCH cannot be determined from an RRC message, a method of not applying LBRM is proposed as follows.

[Configuration G-1 For Rate Matching in Consideration of PDSCH-LBRM]

The maximum number of layers for one TB for DL-SCH/PCH is given by the minimum value among X and 4, and is determined as follows.

Configuration 1: If the parameter maxMIMO-Layers included in the higher layer signaling PDSCH-ServingCell-Config is configured, X is determined to be the parameter maxMIMO-Layers.

Configuration 2: If the maxMIMO-Layers is not configured and the parameter maxNumberMIMO-Layers-PDSCH of higher layer signaling is configured, X is determined to be the parameter maxNumberMIMO-Layers-PDSCH.

Configuration 3: In a case of not corresponding to configuration 1 and configuration 2, no LBRM is applied.

The above configuration 1, configuration 2, and configuration 3 may be expressed as follows.

If the higher layer parameter maxMIMO-Layers of PDSCH-ServingCellConfig of the serving cell is configured, X is given by that parameter Else if the higher layer parameter maxNumberMIMO-LayersPDSCH is configured, X is given by that parameter Otherwise, no LBRM is applied.

Alternatively, the above conditional statement may be applied as follows.

If the higher layer parameter maxMIMO-Layers of PDSCH-ServingCellConfig of the serving cell is given, X is given by that parameter Else if the higher layer parameter maxNumberMIMO-LayersPDSCH is given, X is given by that parameter Otherwise, no LBRM is applied.

Configuration 2 in the [Configuration G-1 for rate matching in consideration of PDSCH-LBRM] may be expressed in another form, such as [F-2: Configuration 2'].

Figure 17:
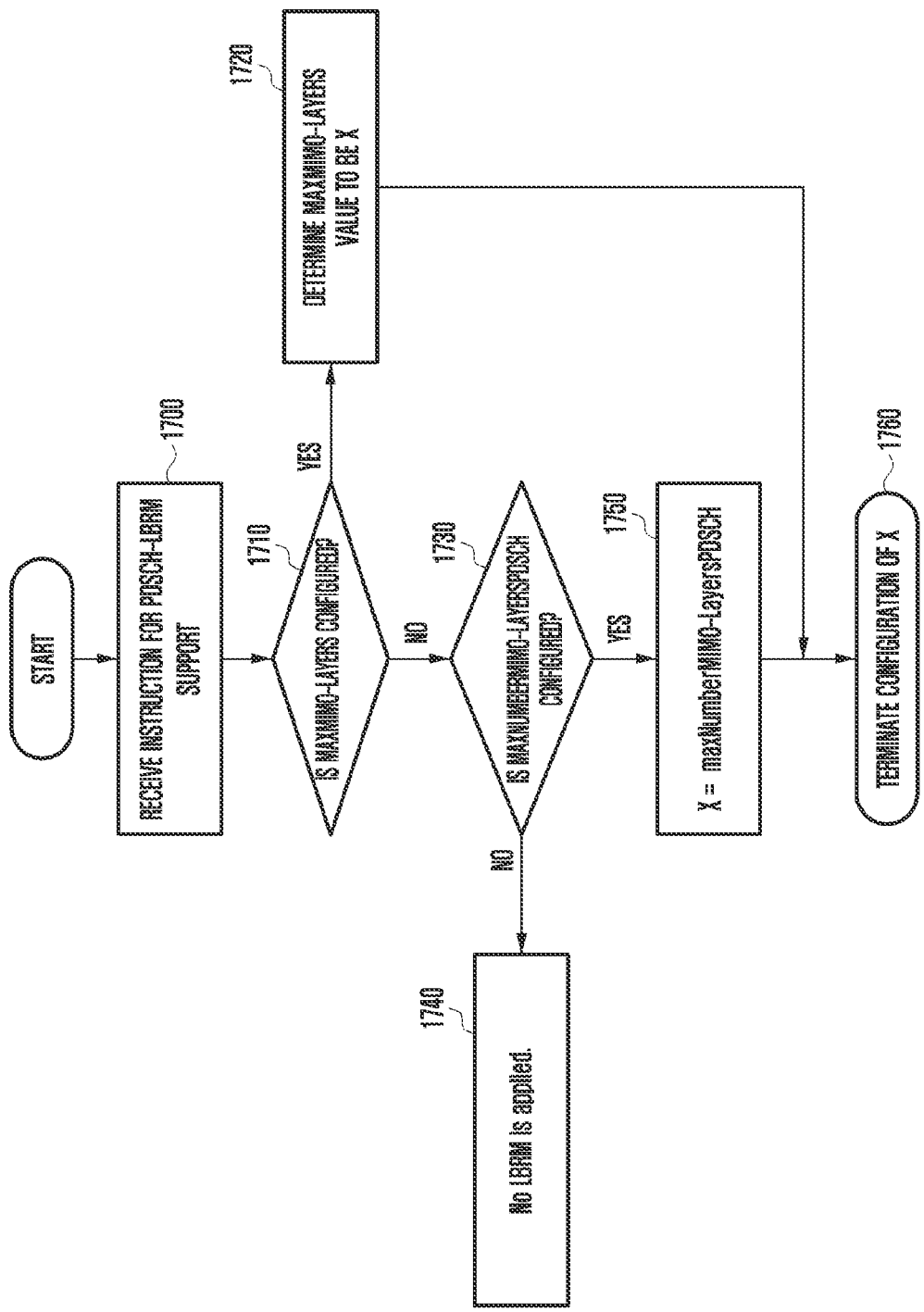
FIG. 17 illustrates of a terminal operation for supporting PDSCH-LBRM according to an embodiment of the disclosure.

FIG. 17 illustrates an example of a terminal operation for the configuration of [Modified configuration G-1 for rate matching in consideration of PDSCH-LBRM] for PDSCH-LBRM according to an embodiment of the disclosure. FIG. 17 illustrates an embodiment of a terminal operation for supporting PDSCH-LBRM.

Referring to FIG. 17, if a terminal receives an instruction for PDSCH-LBRM (indicated by reference numeral 1700), first, at least one processor identifies whether the parameter maxMIMO-Layer is configured (indicated by reference numeral 1710). If the parameter maxMIMO-Layer is configured, the terminal may configure a value of the parameter maxMIMO-Layer to be a value of X (indicated by reference numeral 1720), and may terminate a process of determining the value of X for the PDSCH-LBRM (indicated by reference numeral 1760). In operation 1710, if it is determined that the parameter maxMIMO-Layers is not configured, the terminal may determine whether maxNumberMIMO-LayersPDSCH is configured (indicated by reference numeral 1730). In operation 1730, if it is determined that the maxNumberMIMO-LayersPDSCH value is configured, the terminal may determine the maxNumberMIMO-LayersPDSCH to be X (indicated by reference numeral 1750), and may terminate a process of determining the value of X for the PDSCH-LBRM (indicated by reference numeral 1760). However, in operation 1730, if it is determined that the maxNumberMIMO-LayersPDSCH value is not configured, the terminal may apply a process of postponing LBRM application until a value of at least one of maxMIMO-Layers and maxNumberMIMO-LayersPDSCH is configured via higher layer signaling (indicated by reference numeral 1740).

It should be noted that, in the rate matching methods considering LBRM proposed in the disclosure, decoding is possible if both a base station and a terminal, or both a transmitter and a receiver maintain the same configuration or the promised configuration, and various combinations of the configurations mentioned in the disclosure are possible.

Ninth Embodiment

The ninth embodiment relates to a method and apparatus for applying an efficient downlink LBRM (PDSCH LBRM, DL-SCH LBRM, or PCH LBRM) in performing data transmission. For the sake of convenience, this is hereinafter referred to as "PDSCH-LBRM".

In the current NR system, $TBS_{LBRM}$ is determined based on the maximum number of layers of a PUSCH or a PDSCH configured via higher layer signaling (e.g., RRC). Thus, as shown in FIG. 10, rules between a base station and a UE for the maximum number of layers of PUSCH or PDSCH should be determined before UE capability is reported to a base station.

A method for solving the problem has been proposed in the seventh embodiment and the eighth embodiment, and the proposed method may be more simply expressed as follows.

[Configuration H-1 for Rate Matching in Consideration of PDSCH-LBRM]

The maximum number of layers for one TB for DL-SCH/PCH is given by the minimum among X and 4, and is determined as follows.

Configuration 1: If the parameter maxMIMO-Layers included in the higher layer signaling PDSCH-ServingCell-Config is configured, X is determined to be the number of the parameter maxMIMO-Layers.

Configuration 2: If the maxMIMO-Layers is not configured and UE capability is reported, X is determined to be the maximum number of layers supported by the UE.

Configuration 3: In a case of not corresponding to configuration 1 and configuration 2, X is configured to be one.

The above configuration 1, configuration 2, and configuration 3 may be expressed as follows.

If the higher layer parameter maxMIMO-Layers of PDSCH-ServingCellConfig of the serving cell is configured, X is given by that parameter Else if UE capability is reported, X is given by the maximum number of layers for PDSCH supported by the UE.

Otherwise, X=1.

Alternatively, the above conditional statement may be applied as follows.

If the higher layer parameter maxMIMO-Layers of PDSCH-ServingCellConfig of the serving cell is configured, X is given by that parameter Else if the higher layer parameter maxNumberMIMO-LayersPDSCH is provided, X is given by that parameter Otherwise, X is 1.

It should be noted that various modifications are possible in a case of configuration 3 in the [Configuration H-1 for rate matching in consideration of PDSCH-LBRM]. For example, "X" may be configured to be a predetermined another certain integer, or may be promised to be configured to have a certain value, such as a value mandated as the maximum number of layers determined to be supported by the UE in the band. The maximum number of layers determined to be supported by the UE in the band may differ for each frequency range. For example, in FR1 of the NR system, the UE may have to unconditionally support four layers, and in FR2, the UE may have to support two layers. In this case, therefore, X may be configured to be 4 for a carrier belonging to FR1 and X may be configured to be 2 for a carrier belonging to FR2. As such, a value of X may be differently defined in FR1 and FR2. In the disclosure, for the sake of convenience, an embodiment will be described with regard to X=1, but it is not necessarily limited thereto. Further, the disclosure may consider the case of not applying or postponing LBRM.

Figure 18:
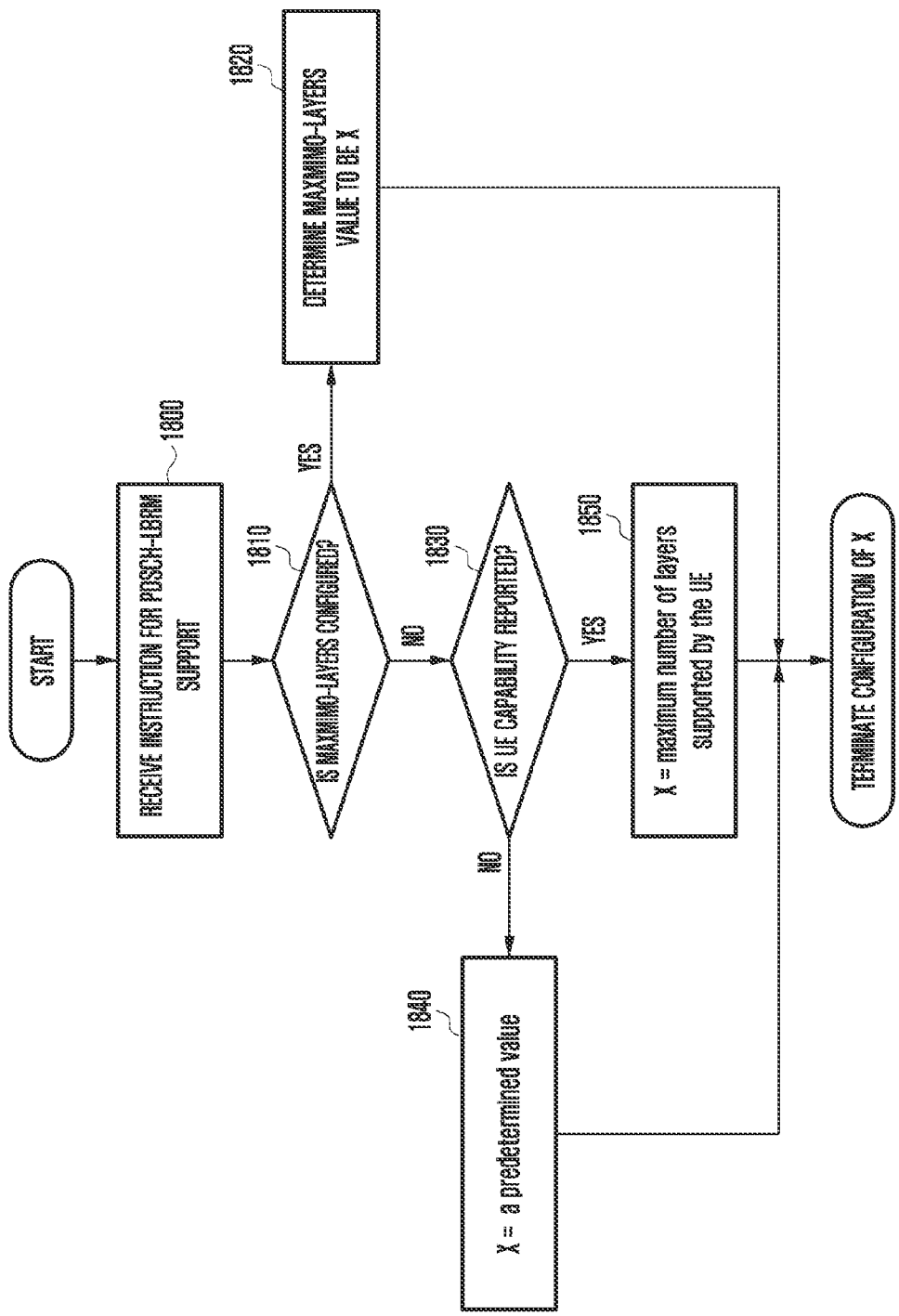
FIG. 18 illustrates a terminal operation for supporting PDSCH-LBRM according to an embodiment of the disclosure.

FIG. 18 illustrates an example of the operation diagram of the modified configuration H-1 for rate matching in consideration of the PDSCH-LBRM according to an embodiment of the disclosure. FIG. 18 illustrates an embodiment of a terminal operation for supporting PDSCH-LBRM.

Referring to FIG. 18, operations 1800, 1810, and 1820 of FIG. 18 are similar to operations 1600, 1610, and 1620 of FIG. 16, but if it is determined that the maxMIMO-Layers is not configured in operation 1810, the terminal may determine that UE capability is reported (indicated by reference numeral 1830). If the terminal determines that the UE capability has been reported in operation 1830, X is configured to be the maximum number of layers supported by the UE (indicated by reference numeral 1850). If the UE capability has not been reported, X may be configured to be a predetermined certain integer, such as X=1, or may be configured to be a certain value, such as a value mandated to the UE as the maximum number of layers in the band (indicated by reference numeral 1840).

In the embodiments described above, the configuration of the maximum number of layers in determining a parameter for applying LBRM has been described. With regard to configuration of the maximum modulation order, a method similar to the above-described embodiments may be applied.

Currently, if it is determined to apply LBRM between a base station and a terminal, the $TBS_{LBRM}$ is determined based on the following configuration for the maximum modulation order.

[Configuration of Maximum Modulation Order for Rate Matching in Consideration of LBRM]

Configuration: If a maximum modulation order for a serving cell in a higher layer is configured for DL-SCH, the maximum modulation order is assumed to have the configured value. Otherwise, the maximum modulation order is assumed to be $Q_m=6$.

The above configuration may also be expressed as:
Maximum modulation order configured for the serving cell, if configured by higher layers; otherwise a maximum modulation order $Q_m=6$ is assumed for DL-SCH.

[Configuration of maximum modulation order for rate matching in consideration of LBRM] has a problem in that it is not clear whether $Q_m$ is determined according to a higher layer parameter configuration and a configuration method for defining $Q_m$ for UL-SCH is not clear and ambiguous.

Accordingly, the configuration for UL-SCH may be described in more detail as shown in the following tenth embodiment.

Configuration 1: If parameter mcs-Table given in the higher layer signaling PDSCH-Config is determined to be 'qam256', a maximum modulation order for DL-SCH is assumed to be $Q_m=8$ otherwise the maximum modulation order for DL-SCH is assumed to be $Q_m=6$.

Configuration 2: If a higher layer parameter value transformPrecoder is configured to be disabled for PUSCH transmission, that is, if DFT-S-OFDM is not applied to uplink transmission, and parameter mcs-Table included in higher layer signaling pusch-Config or configuredGrant-Config is determined to be 'qam256', the maximum modulation order for the UL-SCH is assumed to be $Q_m=8$, otherwise, the maximum modulation order for the UL-SCH is assumed to be $Q_m=6$.

Configuration 3: If the higher layer parameter value transformPrecoder is configured to be enabled for PUSCH transmission, that is, if DFT-S-OFDM is applied to uplink transmission, and a parameter mcs-TableTransformPrecoder included in higher layer signaling pusch-Config or configuredGrantConfig is determined to be 'qam256', the maximum modulation order for the UL-SCH is assumed to be $Q_m=8$ otherwise the maximum modulation order for the UL-SCH is assumed to be $Q_m=6$.

The above configuration may also be expressed as: maximum modulation order configured for the serving cell, where:

If higher layer parameter mcs-Table given by pdsch-Config is set to $Q_m=8$. 'qam256', maximum modulation order $Q_m=8$ is assumed for DL-SCH; otherwise a maximum modulation order $Q_m=6$ is assumed for DL-SCH;

If transform precoding is disabled for PUSCH transmission and higher layer parameter mcs-Table given by pusch-Config or configuredGrantConfig is set to 'qam256', maximum modulation order $Q_m=8$ is assumed for UL-SCH; otherwise a maximum modulation order $Q_m=6$ is assumed for UL-SCH;

If transform precoding is enabled for PUSCH transmission and higher layer parameter mcs-TableTransformPrecoder given by pusch-Config or configuredGrantConfig is set to 'qam256', maximum modulation order $Q_m=8$ is assumed for UL-SCH; otherwise a maximum modulation order $Q_m=6$ is assumed for UL-SCH.

According to the tenth embodiment, it can be seen that the maximum modulation order for the UL-SCH can be configured in a case of applying of LBRM. However, in general, since a value of mcs-Table may be configured differently for each BWP, the value of mcs-Table, required to configure the maximum modulation order, is not clear in the tenth embodiment. Therefore, a specific plan is required to clearly define the value of mcs-Table in consideration of BWP.

Accordingly, as shown in the following eleventh embodiment to 23rd embodiment, a method for configuring the maximum modulation order for LBRM may be described in more detail. For the convenience of explanation, the eleventh embodiment to thirteenth embodiment show a maximum modulation order configuration method for DL-SCH, and a fourteenth embodiment to 23rd embodiment show a maximum modulation order configuration method for UL-SCH.

Tenth Embodiment

[Maximum Modulation Order Configuration a for Rate Matching in Consideration of LBRM]

A maximum modulation order configured for a serving cell is configured as follows.

Eleventh Embodiment

[Maximum Modulation Order Configuration B-1 for Rate Matching in Consideration of LBRM]

A maximum modulation order configured for a serving cell is configured as follows.

Configuration: If parameter mcs-Table included in higher layer signaling pdsch-Config for any BWP of a serving cell is configured to be 'qam256', a maximum modulation order for the DL-SCH is assumed to be $Q_m=8$, otherwise the maximum modulation order for the DL-SCH is assumed to be $Q_m=6$.

The above configuration may also be expressed as:
If higher layer parameter mcs-Table given by pdsch-Config for some BWP (or a BWP) of the serving cell is set to 'qam256', maximum modulation order $Q_m=8$ is assumed for DL-SCH; otherwise a maximum modulation order $Q_m=6$ is assumed for DL-SCH.

12th Embodiment

[Maximum Modulation Order Configuration B-2 for Rate Matching in Consideration of LBRM]

A maximum modulation order configured for a serving cell is configured as follows.

Configuration 1: If parameter mcs-Table included in higher layer signaling pdsch-Config for one or more BWPs of the serving cell is configured to be 'qam256', the maximum modulation order for the DL-SCH is assumed to be $Q_m=8$ otherwise the maximum modulation order for the DL-SCH is assumed to be $Q_m=6$.

The above configuration may also be expressed as:
if higher layer parameter mcs-Table given by pdsch-Config at least for a BWP of the serving cell is set to 'qam256', maximum modulation order $Q_m=8$ is assumed for DL-SCH; otherwise a maximum modulation order $Q_m=6$ is assumed for DL-SCH.

In the eleventh embodiment and the twelfth embodiment, if at least one BWP, among BWPs configured in one serving cell, is configured to use 256QAM in the downlink, 256QAM is considered in a case of calculating $TBS_{LBRM}$, that is, $Q_m=8$, otherwise 64QAM is considered, that is, $Q_m=6$. If all BWPs of the serving cell are configured to use 64QAM or less for downlink, $TBS_{LBRM}$ may be determined under the assumption that $Q_m=6$. The determination is performed in order to calculate the largest $TBS_{LBRM}$ by considering BWP configuration in one serving cell.

13th Embodiment

[Maximum Modulation Order Configuration B-3 for Rate Matching in Consideration of LBRM]

A maximum modulation order configured for a serving cell is configured as follows:

Configuration: If parameter mcs-Table included in the higher layer signaling pdsch-Config for all BWPs of a serving cell is configured to 'qam256', a maximum modulation order for DL-SCH is assumed to be $Q_m=8$, otherwise the maximum modulation order for the DL-SCH is assumed to be $Q_m=6$.

The above configuration may also be expressed as:
if higher layer parameter mcs-Table given by pdsch-Config for all BWPs of the serving cell is configured to 'qam256', maximum modulation order $Q_m=8$ is assumed for DL-SCH; otherwise a maximum modulation order $Q_m=6$ is assumed for DL-SCH.

In the thirteenth embodiment, if 256QAM is configured to be used in downlink in all BWPs configured in one serving cell, 256QAM is considered in calculation of $TBS_{LBRM}$, that is, $Q_m=8$, otherwise, 64QAM is considered, that is, $Q_m=6$. That is, if any one of BWPs configured in the corresponding serving cell is configured to use 64QAM or less for downlink, $TBS_{LBRM}$ may be determined under the assumption that $Q_m=6$. In a case of determining the configured $Q_m$ (i.e., mcs-Table), a BWP (i.e., initial BWP) defined for initial access may be excluded.

14th Embodiment

[Maximum Modulation Order Configuration C-1 for Rate Matching in Consideration of LBRM]

A maximum modulation order configured for a serving cell is configured as follows:

Configuration: If parameter mcs-Table included in higher layer signaling pusch-Config or configuredGrantConfig for a BWP of a serving cell is configured to be 'qam256', a maximum modulation order for UL-SCH is assumed to be $Q_m=8$, otherwise the maximum modulation order for the UL-SCH is assumed to be $Q_m=6$.

The above configuration may also be expressed as:
If higher layer parameter mcs-Table given by pusch-Config or configured GrantConfig for some BWP (or a BWP) of the serving cell is set to 'qam256', a maximum modulation order $Q_m=8$ is assumed for UL-SCH; otherwise a maximum modulation order $Q_m=6$ is assumed for UL-SCH.

15th Embodiment

[Maximum Modulation Order Configuration C-2 for Rate Matching in Consideration of LBRM]

A maximum modulation order configured for a serving cell is configured as follows:

Configuration: If parameter mcs-TableTransformPrecoder included in higher layer signaling pusch-Config or configuredGrantConfig for any BWP of the serving cell is configured to 'qam256', a maximum modulation order for the UL-SCH is assumed to be $Q_m=8$, otherwise the maximum modulation order for the UL-SCH is assumed to be $Q_m=6$.

The above configuration may also be expressed as:
If higher layer parameter mcs-TableTransformPrecoder given by pusch-Config or configuredGrantConfig for some BWP (or a BWP) of the serving cell is set to 'qam256', maximum modulation order $Q_m=8$ is assumed for UL-SCH; otherwise a maximum modulation order $Q_m=6$ is assumed for UL-SCH.

16th Embodiment

[Maximum Modulation Order Configuration D-1 for Rate Matching in Consideration of LBRM]

A maximum modulation order configured for a serving cell is configured as follows.

Configuration: If parameter mcs-Table included in higher layer signaling pusch-Config or configuredGrantConfig for one or more BWPs of the serving cell is configured to 'qam256', a maximum modulation order for UL-SCH is assumed to be $Q_m=8$, otherwise the maximum modulation order for UL-SCH is assumed to be $Q_m=6$.

The above configuration may also be expressed as:
if higher layer parameter mcs-Table given by pusch-Config or configuredGrantConfig at least for a BWP of the serving cell is set to 'qam256', maximum modulation order $Q_m=8$ is assumed for UL-SCH; otherwise a maximum modulation order $Q_m=6$ is assumed for UL-SCH.

17th Embodiment

[Maximum Modulation Order Configuration D-2 for Rate Matching in Consideration of LBRM]

A maximum modulation order configured for a serving cell is configured as follows.

Configuration: If parameter mcs-TableTransformPrecoder included in higher layer signaling pusch-Config or configuredGrantConfig for one or more BWPs of the serving cell is configured to 'qam256', a maximum modulation order for the UL-SCH is assumed to be $Q_m=8$, otherwise the maximum modulation order for the UL-SCH is assumed to be $Q_m=6$.

The above configuration may also be expressed as:
if higher layer parameter mcs-TableTransformPrecoder given by pusch-Config or configuredGrantConfig at least for a BWP of the serving cell is set to 'qam256', maximum modulation order $Q_m=8$ is assumed for UL-SCH; otherwise a maximum modulation order $Q_m=6$ is assumed for UL-SCH.

18th Embodiment

[Maximum Modulation Order Configuration E-1 for Rate Matching in Consideration of LBRM]

A maximum modulation order configured for a serving cell is configured as follows.

Configuration: If parameter mcs-Table included in higher layer signaling pusch-Config or configuredGrantConfig for all BWPs in a serving cell is configured to 'qam256', a maximum modulation order for UL-SCH is assumed to be $Q_m=8$, otherwise the maximum modulation order for UL-SCH is assumed to be $Q_m=6$.

The above configuration may also be expressed as:
If higher layer parameter mcs-Table given by pusch-Config or configuredGrantConfig for all BWPs of the serving cell is set to 'qam256', a maximum modulation order $Q_m=8$ is assumed for UL-SCH; otherwise a maximum modulation order $Q_m=6$ is assumed for UL-SCH.

19th Embodiment

[Maximum Modulation Order Configuration E-2 for Rate Matching in Consideration of LBRM]

A maximum modulation order configured for a serving cell is configured as follows.

Configuration: If parameter mcs-TableTransformPrecoder included in higher layer signaling pusch-Config or configuredGrantConfig for all BWPs of the serving cell is configured to 'qam256', a maximum modulation order for UL-SCH is assumed to be $Q_m=8$, otherwise the maximum modulation order for UL-SCH is assumed to be $Q_m=6$.

The above configuration may also be expressed as:
If higher layer parameter mcs-TableTransformPrecoder given by pusch-Config or configuredGrantConfig for all BWPs of the serving cell is set to 'qam256', maximum modulation order $Q_m=8$ is assumed for UL-SCH; otherwise a maximum modulation order $Q_m=6$ is assumed for UL-SCH.

20th Embodiment

[Maximum Modulation Order Configuration F-1 for Rate Matching in Consideration of LBRM]

A maximum modulation order configured for a serving cell is configured as follows.

Configuration: If the parameter mcs-Table or mcs-TableTransformPrecoder included in higher layer signaling pusch-Config or configuredGrantConfig for any BWP of a serving cell is configured to 'qam256', a maximum modulation order for the UL-SCH is assumed to be $Q_m=8$, otherwise, the maximum modulation order for the UL-SCH is assumed to be $Q_m=6$.

The above configuration may also be expressed as:
If higher layer parameter mcs-Table or mcs-TableTransformPrecoder given by pusch-Config or configuredGrantConfig for some BWP of the serving cell is set to 'qam256', maximum modulation order $Q_m=8$ is assumed for UL-SCH; otherwise a maximum modulation order $Q_m=6$ is assumed for UL-SCH.

21st Embodiment

[Maximum Modulation Order Configuration F-2 for Rate Matching in Consideration of LBRM]

A maximum modulation order configured for a serving cell is configured as follows.

Configuration: If the parameter mcs-Table or mcs-TableTransformPrecoder included in higher layer signaling pusch-Config or configuredGrantConfig for one or more BWPs of a serving cell is set to 'qam256', a maximum modulation order for the UL-SCH is assumed to be $Q_m=8$, otherwise the maximum modulation order for the UL-SCH is assumed to be $Q_m=6$.

The above configuration may also be expressed as:
If higher layer parameter mcs-Table or mcs-TableTransformPrecoder given by pusch-Config or configuredGrantConfig at least for a BWP of the serving cell is set to 'qam256', maximum modulation order $Q_m=8$ is assumed for UL-SCH; otherwise a maximum modulation order $Q_m=6$ is assumed for UL-SCH.

22nd Embodiment

[Maximum Modulation Order Configuration F-3 for Rate Matching in Consideration of LBRM]

A maximum modulation order configured for a serving cell is configured as follows.

Configuration: If the parameter mcs-Table or mcs-TableTransformPrecoder included in higher layer signaling pusch-Config or configuredGrantConfig for all BWPs in a serving cell is configured to 'qam256', a maximum modulation order for UL-SCH is assumed to be $Q_m=8$, otherwise, the maximum modulation order for UL-SCH is assumed to be $Q_m=6$.

The above configuration may also be expressed as:
If higher layer parameter mcs-Table or mcs-TableTransformPrecoder given by pusch-Config or configuredGrantConfig for all BWPs of the serving cell is set to 'qam256', maximum modulation order $Q_m=8$ is assumed for UL-SCH; otherwise a maximum modulation order $Q_m=6$ is assumed for UL-SCH.

23rd Embodiment

For reference, the 21st embodiment may be expressed in more detail as follows.

[Maximum Modulation Order Configuration F-4 for Rate Matching in Consideration of LBRM]

A maximum modulation order configured for a serving cell is configured as follows.

Configuration: Parameter mcs-Table included in higher layer signaling pusch-Config; parameter mcs-TableTransformPrecoder included in pusch-Config; parameter mcs-Table included in configuredGrantConfig; parameter mcs-TableTransformPrecoder included in configuredGrantConfig, for one or more BWPs in a serving cell, are configured to 'qam256', a maximum modulation order for UL-SCH is assumed to be $Q_m$=8, otherwise the maximum modulation order for UL-SCH is assumed to be $Q_m$=6. That is, if one of parameter mcs-Table included in higher layer signaling pusch-Config; parameter mcs-TableTransformPrecoder included in pusch-Config; parameter mcs-Table included in configuredGrantConfig; parameter mcs-TableTransformPrecoder included in configuredGrantConfig, for one or more BWPs in the serving cell, is configured to 'qam256', a maximum modulation order for UL-SCH is assumed to be $Q_m$=8, otherwise the maximum modulation order for UL-SCH is assumed to be $Q_m$=6.

The above configuration may also be expressed as:
If higher layer parameter mcs-Table given by pusch-Config, or mcs-TableTransformPrecoder given by pusch-Config, or mcs-Table given by configuredGrantConfig, or mcs-TableTransformPrecoder given by configuredGrantConfig at least for a BWP of the serving cell is set to 'qam256', maximum modulation order $Q_m$=8 is assumed for UL-SCH; otherwise a maximum modulation order $Q_m$=6 is assumed for UL-SCH.

The above eleventh embodiment to 23rd embodiment may configure the maximum modulation order of the serving cell for the DL-SCH and the UL-SCH through various combinations. For example, a combination of the twelfth embodiment and the 21st embodiment is as follows.

Configuration 1: If the parameter mcs-Table included in the higher layer signaling pdsch-Config for one or more BWPs of the serving cell is configured to qam256', the maximum modulation order for the DL-SCH is assumed to be $Q_m$=8, otherwise the maximum modulation order for the DL-SCH is assumed to be $Q_m$=6.

Configuration 2: If the parameter mcs-Table or mcs-TableTransformPrecoder included in higher layer signaling pusch-Config or configuredGrantConfig for one or more BWPs of the serving cell is configured to 'qam256', the maximum modulation order for the UL-SCH is assumed to be $Q_m$=8 otherwise the maximum modulation order for the UL-SCH is assumed to be $Q_m$=6.

The above configuration may also be expressed as:
If higher layer parameter mcs-Table given by pdsch-Config at least for a BWP of the serving cell is set to 'qam256', maximum modulation order $Q_m$=8 is assumed for DL-SCH; otherwise a maximum modulation order $Q_m$=6 is assumed for DL-SCH; and
If higher layer parameter mcs-Table or mcs-TableTransformPrecoder given by pusch-Config or configuredGrantConfig at least for a BWP of the serving cell is set to 'qam256', maximum modulation order $Q_m$=8 is assumed for UL-SCH; otherwise a maximum modulation order $Q_m$=6 is assumed for UL-SCH.

For reference, the 20th embodiment is an example of an embodiment obtained by combining the 14th embodiment and the 15th embodiment, the 21st embodiment is an example of an embodiment obtained by combining the 16th embodiment and the 17th embodiment, and the 22nd embodiment is an example of an embodiment obtained by combining the 18th embodiment and the 19th embodiment.

An embodiment, which is obtained by combining various embodiments of parameter configuration for applying LBRM of the disclosure, can be briefly described as a 24th embodiment below.

24th Embodiment

[Example of Combining Parameter Configuration Methods for Rate Matching in Consideration of PDSCH-LBRM]

Configuration 1: The maximum number of layers (v) for one TB is configured to be a smaller value (or smaller or equal) among maxNumberMIMO-LayersPDSCH and 4 if maxNumberMIMO-LayersPDSCH is configured in higher layer signaling. If the maxNumberMIMO-LayersPDSCH is not configured, the maximum number of layers for one TB is configured to be one.

Configuration 2: If mes-Table is configured to 'qam256' in higher layer signaling, the maximum modulation order is assumed to be $Q_m$=8. Otherwise, the maximum modulation order is assumed to be $Q_m$=6.

Configuration 3: The maximum code rate is configured to be R=948/1024.

Configuration 4: $N_{RE}$ is configured to be $156 \cdot N_{PRB,LBRM}$. However, the value of $N_{PRB,LBRM}$ denotes the maximum number of PRBs across all configured BWPs of a carrier.

The above configurations may also be simplified as:
if maxNumberMIMO-LayersPDSCH provided,
v=min (max Number MIMO-LayersPDSCH, 4);
else
v=1;
if mcs-Table=qam256,
$Q_m$=8;
else
$Q_m$=6;
R=948/1024;
$N_{RE}$=156*$N_{PRB,LBRM}$ As in the 24th embodiment, if parameters required to determine the maximum number of layers for one TB are configured via higher layer signaling, the maximum number of layers is determined based on the value of the parameters. However, if the parameters are not configured via higher layer signaling, it may aware that the maximum number of layers is configured to be a predetermined value (e.g., v=1 or 2 or 3 or . . . ) or a value determined according to a predetermined rule. Similarly, if parameters required to determine the maximum modulation order is configured via higher layer signaling, the maximum modulation order is determined based on the value of the parameters. However, if the parameters are not configured via higher layer signaling, it may aware that the maximum modulation order is configured to be a predetermined value or a value determined according to a predetermined rule.

In addition, a condition for the mcs-Table may be modified in various forms. For example, the maximum modulation order may be configured according to whether mcs-Table is configured to be 'qam256' depending on the BWP of the serving cell. For example, if 'qam256' is configured for mcs-Table for one or more BWPs, $Q_m$ is configured to be 8, and if 'qam256' is configured for mcs-Table for all BWPs, $Q_m$ is configured to be 8. In addition, the maximum modulation order may be configured, in a similar manner, based on the value of, such as mcs-TableTransformPrecoder instead of mcs-Table.

In the above embodiments, operations of a terminal have been described mainly, but in order to perform encoding or decoding applied with LBRM by a base station, the encoding or decoding may be performed after performing the same parameter configuration process as that of a terminal, and thus detailed descriptions thereof will be omitted. In addition, various combinations of the PUSCH-LBRM method and the PDSCH-LBRM operation proposed in the disclosure can be applied to the LBRM method of the base station and the terminal.

In general, LBRM may affect performance because some of parities may not be transmitted due to buffer limitations. For this reason, the base station or the terminal may configure MCS so that LBRM is rarely applied or is minimized.

For example, if TBS is calculated for each MCS and then scheduling for each MCS is performed, determination is made as to whether to apply the LBRM and then MCS, to which LBRM is determined to be actually applied, may not be used. In other words, MCS is configured by determining one of MCSs to which LBRM is not actually applied. In some cases, even if the LBRM is applied, in order to minimize the effect thereof, a relatively higher (or the highest) MCS among MCSs to which the LBRM is applied may be configured as the final MCS.

For reference, the determination as to whether to apply LBRM may be made by comparing a value of N and $N_{ref}$ value for each MCS. For example, if $N>N_{ref}$, LBRM is determined to be applied, otherwise LBRM is determined not to be applied.

As described above, a method of controlling applying of LBRM through MCS configuration may be differently applied depending on stand-alone (SA) operation or non-standalone (NSA) operation in a system beyond 5G. In a communication system or a network to which the SA operation method is applied, the applying of LBRM is controlled through MCS configuration, but in a communication system or network to which the NSA operation method is applied, may not be true or the opposite may be true. In addition, although the applying of LBRM is controlled through MCS configuration for both SA and NSA operation methods, specific rules may be configured differently to each other.

The SA operation denotes that a first cellular network (e.g., a legacy network) and a second cellular network (e.g., a 5G network) operate independently, and the NSA operation denotes that the first cellular network and the second cellular network are connected to each other and operated. The method in which two networks are connected and operated denotes that at least one network controls an operation of another network.

As described above, the maximum data rate supported by a terminal in the NR system may be determined through <Equation 1>, <Table 9>, and <Table 10> below. On the other hand, the actual data rate, which is measurable by the terminal in the actual data transmission, may be a value obtained by dividing an amount of data by a data transmission time and the value may correspond to a value obtained by dividing a TBS by a TTI length in the 1 TB transmission or a value obtained by dividing a sum of TBSs by the TTI length in the 2 TB transmission. For example, as shown in <Table 10>, the maximum actual data rate in downlink in a cell having a 100 MHz frequency bandwidth at a 30 kHz subcarrier spacing may be determined, as shown in <Table 11>, according to the number of allocated PDSCH symbols. In this case, the actual data rate may be larger than the maximum data rate depending on the scheduling information.

In many communication systems including the NR system, data rates that the terminal can support may be promised between the base station and the terminal. The data rate may be calculated using the maximum frequency band, the maximum modulation order, or the maximum number of layers, which are supported by the terminal. However, the calculated data rate may differ from a value calculated based on a transport block size (TBS) of a transport block (TB) and a transmission time interval (TTI) length, which are used for actual data transmission. Accordingly, a case may occur in which the terminal may be allocated a TBS larger than a value corresponding to a data rate supported by the terminal itself. It may be necessary to minimize occurrence of the case and define an operation of the terminal corresponding to the case.

However, as shown in FIG. 10, since higher layer signaling maxNumberMIMO-LayersPDSCH (for downlink) or maxNumberMIMO-LayersCB-PUSCH or maxNumber-MIMO-LayersNonCB-PUSCH (for uplink) is not configured until UE capabilities are reported, there is a possibility that $$v_{Layers}^{(j)}$$

corresponding to the maximum number of layers may not be determined or $$Q_m^{(j)}$$

denoting the maximum modulation order may not be determined. In this case, the base station or the terminal may not accurately calculate the maximum supported data rate.

One method for solving the problem is to fix a value of the maximum number of layers $$v_{Layers}^{(j)}$$

or a value of the maximum modulation order $$Q_m^{(j)}$$

as a predetermined value or integer or to apply a specific rule thereto during a period of time 1050 of FIG. 10. For example, if the maximum number of layers is not configured via (j (j) higher layer signaling, $$v_{Layers}^{(j)}$$

may be configured to be one, or a value of $$v_{Layers}^{(j)}$$

may be configured to a specific value that a UE should support (or may support) in the (j) band. For example, the $$v_{Layers}^{(j)}$$

may be configured to be a specific value, such as a value mandated to the UE as the maximum number of layers in the band.

In the above, the maximum number of layers determined to be supported by the UE in the band may differ for each frequency range. For example, in FR1 of the NR system, the UE may unconditionally support four layers, and in FR2, the UE may have to support two layers. Therefore, in this case, $$v_{Layers}^{(j)}$$

may be configured to be 4 for a carrier belonging to FR1 and $$v_{Layers}^{(j)}$$

may be configured to be 2 for a carrier belonging to FR2. As such, $$v_{Layers}^{(j)}$$

may have a value differently defined in FR1 and FR2.

In addition, the maximum modulation order $$Q_m^{(j)}$$

may be configured to be 1 or 2, i.e., modulation of BPSK or QPSK, or to be 6, i.e., modulation of 64QAM, depending on the requirements by a system.

Specific methods for necessary configuration in a case of calculating the maximum supported data rate in the base station or the terminal are described in the following 25th embodiment and 26th embodiment.

25th Embodiment

[Parameter Configuration a for Calculation of the Maximum Supported Data Rate]

In order to calculate the supported max data rate, values of $$v_{Layers}^{(j)}$$

and $$Q_m^{(j)}$$

among parameters for <Equation 1> are configured as follows:

Configuration 1-1: If higher layer signaling FeatureSet is configured (or UE capability is configured or reported), $$v_{Layers}^{(j)}$$

is configured to be the maximum value of a support layer given by the higher layer parameter maxNumberMIMO-LayersPDSCH for downlink, and configured to be the maximum value of higher layer parameters maxNumberMIMO-LayersCB-PUSCH and maxNumberMIMO-LayersNonCB-PUSCH for uplink.

Configuration 1-2: In a case of not corresponding to configuration 1-1, $$v_{Layers}^{(j)}$$

is configured to be a predetermined value (for example, $$v_{Layers}^{(j)} = 1).$$

Configuration 2-1: If a higher layer signaling FeatureSet is given (or reported), $$Q_m^{(j)}$$

is configured to be the maximum supported modulation order value given by the higher layer parameter supportedModulationOrderDL for downlink, and configured to be the maximum supported modulation given by higher layer parameter supportedModulationOrderUL for uplink.

Configuration 2-2: In a case of not corresponding to configuration 2-1, $$Q_m^{(j)}$$

is configured to be a predetermined value (for example, $$Q_m^{(j)} = 6).$$

The configuration 1-1, the configuration 1-2, the configuration 2-1, the configuration 2-2, and other parameters of <Equation 1> may be summarized as follows.

J is the number of aggregated component carriers in a band or band combination, $R_{max}=948/1024$ For the j-th cc, If FeatureSets is provided (or reported), $$v_{Layers}^{(j)}$$

is the maximum number of supported layers given by higher layer parameter maxNumberMIMO-LayersPDSCH for downlink and the maximum of higher layer parameters maxNumberMIMO-LayersCB-PUSCH and maxNumberMIMO-LayersNonCB-PUSCH for uplink, otherwise $$v_{Layers}^{(j)} = 1.$$

If FeatureSets is provided, $$Q_m^{(j)}$$

is the maximum supported modulation order given by higher layer parameter supportedModulationOrderDL for downlink and higher layer parameter supportedModulationOrderUL for uplink.

Otherwise, $$Q_m^{(j)} = 6.$$

For reference, preceding conditions in the configurations 1-1 and 2-1 may be represented by other similar expressions as follows: "if FeatureSets is configured" or "if UE capability is (or was) provided".

In addition, in the above embodiments and subsequent embodiments, for convenience, in configuration 1-2, $$v_{Layers}^{(j)}$$

is configured to 1, in configuration 2-2, $$Q_m^{(j)}$$

is configured to be 6, but is not necessarily limited thereto.

In all the embodiments including the embodiment, the part specified and applied as "provided" may be used interchangeably or have the same meaning as "given" or "configured" or "reported". That is, "provided" in the conditional statement may be modified to "given", "configured", or "reported" and applied.

26th Embodiment

In the 25th embodiment, in a process of configuration of $$v_{Layers}^{(j)},$$

in a case of uplink, a more clear definition of configuration of maxNumberMIMO-LayersCB-PUSCH and maxNumber-MIMO-LayersNonCB-PUSCH may be required, and thus a specific configuration method may be proposed as follows.

[Parameter Configuration B for Calculation of Maximum Supported Data Rate]

In order to calculate a maximum supported max data rate, values of $$v_{Layers}^{(j)} \text{ and } Q_m^{(j)}$$

among the parameters for <Equation 1> are defined as follows:

Configuration 1-1: In a case of downlink, if higher layer signaling maxNumberMIMO-LayersPDSCH is given (or configured), the maximum value of a support layer given by the higher layer parameter maxNumberMIMO-LayersPDSCH is configured to be downlink $$v_{Layers}^{(j)}.$$

Configuration 1-2: In a case of downlink, if not corresponding to configuration 1-1, the downlink $$v_{Layers}^{(j)}$$

is configured to be a predetermined value (for example, $$v_{Layers}^{(j)} = 1).$$

Configuration 2-1: In a case of uplink, if higher layer parameters maxNumberMIMO-LayersCB-PUSCH and maxNumberMIMO-LayersNonCB-PUSCH are given together (or configured), the maximum number of supported layers given by the maximum value of the two parameters is configured to be $$v_{Layers}^{(j)}.$$

Configuration 2-2: In a case of uplink, if only one of the higher layer parameters maxNumberMIMO-LayersCB-PUSCH and maxNumberMIMO-LayersNonCB-PUSCH is given (or configured), the maximum number of supported layers given by the parameter is configured to be $$v_{Layers}^{(j)}.$$

Configuration 2-3: In a case of uplink, if not corresponding to configuration 2-1 and configuration 2-2, uplink $v_{Layers}^{(j)}$ is configured to be a predetermined value (for example, $$v_{Layers}^{(j)} = 1).$$

Configuration 3-1: In a case of downlink, if the higher layer parameter supportedModulationOrderDL is given (or configured), the maximum supported modulation order value given by the parameter is configured to be downlink $$Q_m^{(j)}.$$

Configuration 3-2: In a case of downlink, if not corresponding to configuration 3-1, the downlink $$Q_m^{(j)}$$

is configured to a predetermined value (for example, $$Q_m^{(j)} = 6).$$

Configuration 4-1: In a case of uplink, if the higher layer parameter supportedModulationOrderUL is given (or configured), the maximum supported modulation order value given by the parameter is configured to be uplink $Q_m^{(j)}$.

Configuration 4-2: In a case of uplink, if not corresponding to configuration 4-1, the uplink $Q_m^{(j)}$ is configured to a predetermined value (for example, $Q_m^{(j)} = 6$).

Other parameters of the above-described configurations 1-1 to 4-2 and <Equation 1> may be summarized as follows.

J is the number of aggregated component carriers in a band or band combination, $R_{max}$=948/1024

For the j-th cc, $v_{Layers}^{(j)}$ for downlink is the maximum number of supported layers given by higher layer parameter maxNumberMIMO-LayersPDSCH if that parameter is provided; otherwise, $v_{Layers}^{(j)} = 1$.

$v_{Layers}^{(j)}$ for uplink is the maximum number of supported layers given by
- the maximum of higher layer parameters maxNumberMIMO-LayersCB-PUSCH and maxNumberMIMO-LayersNonCB-PUSCH if both of those parameters are provided;
- the provided parameter between maxNumberMIMO-LayersCB-PUSCH and maxNumberMIMO-LayersNonCB-PUSCH if only one of those parameters (or either of those parameters) is provided;
- Otherwise $v_{Layers}^{(j)} = 1$.

$Q_m^{(j)}$ for downlink is the maximum supported modulation order given by higher layer parameter supportedModulationOrderDL if that parameter is provided; otherwise $Q_m^{(j)} = 6$.

$Q_m^{(j)}$ for uplink is the maximum supported modulation order given by higher layer parameter supportedModulationOrderUL if that parameter is provided; otherwise $Q_m^{(j)} = 6$.

In the above, the part specified and applied as "provided" may be used interchangeably with "given" or "configured" or "reported" or have the same meaning with each other. In other words, "provided" in the conditional statement may be modified to "given", "configured", or "reported" and applied. In the above embodiment, for convenience, in configuration 1-2, $v_{Layers}^{(j)}$ is configured to be one, the downlink $Q_m^{(j)}$ of configuration 3-2 and the uplink $Q_m^{(j)}$ of configuration 4-2 are configured to be 6, but the configuration is not necessarily limited thereto. In addition, the downlink $Q_m^{(j)}$ and the uplink $Q_m^{(j)}$ may have the same value or may have different values.

Figure 19A:
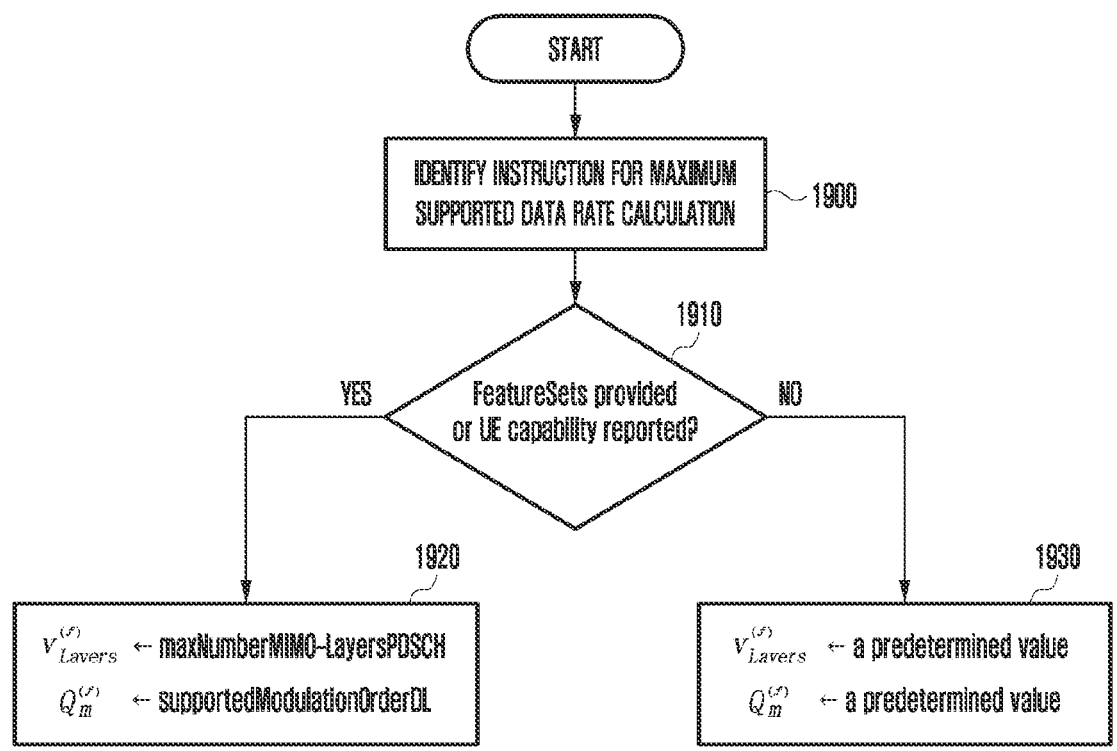
FIG. 19A illustrates a process of configuring a parameter for calculating a downlink maximum supported data rate according to an embodiment of the disclosure.
Figure 19B:
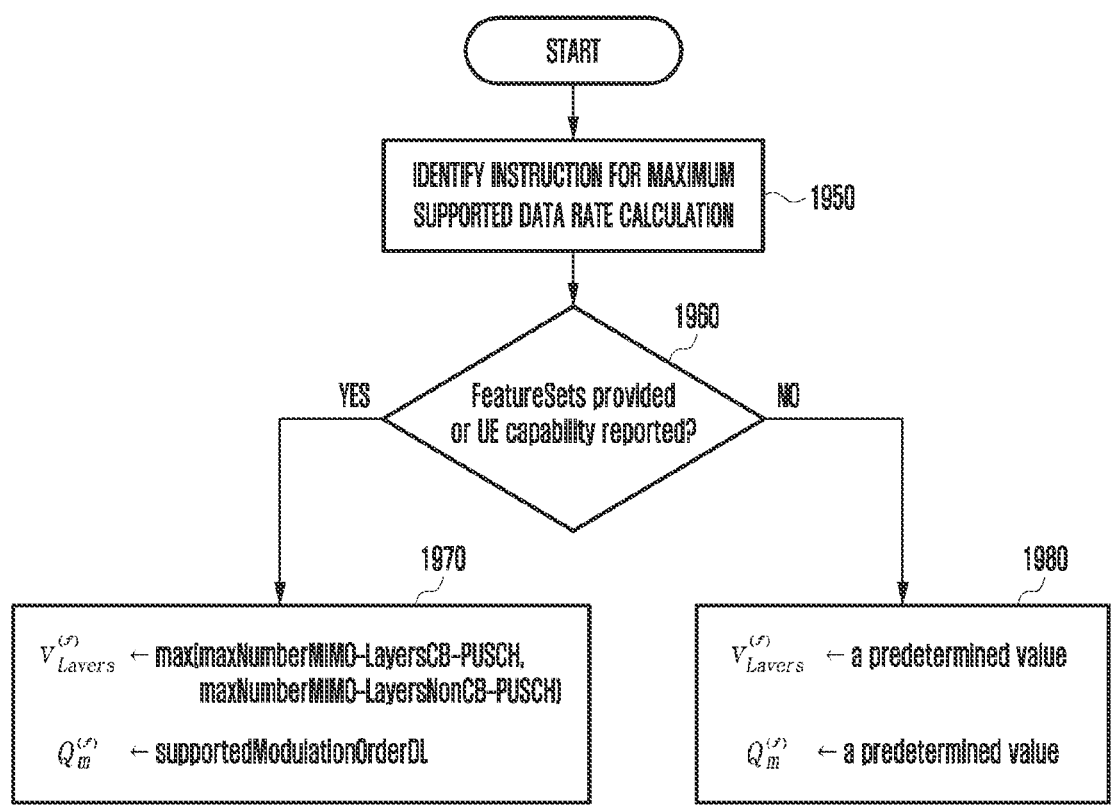
FIG. 19B illustrates a process of configuring a uplink maximum supported data rate according to an embodiment of the disclosure.

FIG. 19A shows an example of an operation diagram of [Parameter configuration A for calculation of the maximum supported data rate] according to an embodiment of the disclosure, and FIG. 19B shows an example of an operation diagram of [Parameter configuration A for calculation of the maximum supported data rate] according to an embodiment of the disclosure.

Referring to FIGS. 19A and 19B, in order to calculate the maximum supported data rate, all parameters related to <Equation 1> may be obtained. However, in FIGS. 19A and 19B, for convenience, only $$v_{Layers}^{(j)} \text{ and } Q_m^{(j)}$$

among parameters are shown, and configuration of other parameters is omitted.

FIG. 19A illustrates a process of determining values of downlink $$v_{Layers}^{(j)} \text{ and } Q_m^{(j)}$$

of a base station or a terminal. Referring to FIG. 19A, if an instruction for calculating the maximum supported data rate is transferred (indicated by reference numeral 1900), depending on whether FeatureSets are given (or whether UE capability is reported), values of downlink $$v_{Layers}^{(j)} \text{ and } Q_m^{(j)}$$

are determined (indicated by reference numeral 1910). If FeatureSets (or UE capabilities) are given in operation 1910, $$v_{Layers}^{(j)}$$

is configured by the parameter maxNumberMIMO-LayersPDSCH and $$Q_m^{(j)}$$

is configured by the parameter supportedModulationOrderDL (indicated by reference numeral 1920). In operation 1910, if FeatureSets (or UE capability) is not U) (J) given (or not configured), then in operation 1930, $$v_{Layers}^{(j)} \text{ and } Q_m^{(j)}$$

are configured to be predetermined values, respectively (for example, $$v_{Layers}^{(j)} = 1, Q_m^{(j)} = 6)$$

(indicated by reference numeral 1930).

FIG. 19B illustrates a process of determining values of uplink $$v_{Layers}^{(j)} \text{ and } Q_m^{(j)}$$

of a base station or a terminal. Referring to 19B, if an instruction for calculating the maximum supported data rate is transferred (indicated by reference numeral 1950), it is determined whether FeatureSets are given (indicated by reference numeral 1960). Operation 1960 may be replaced with an operation of determining whether UE capability is reported. If FeatureSets (or UE capability) is determined to be given in operation 1960, $$v_{Layers}^{(j)}$$

is configured to be the maximum value of the parameters maxNumberMIMO-LayersCB-PUSCH and maxNumberMIMO-LayersNonCB-PUSCH and $$Q_m^{(j)}$$

is configured to be the parameter supportedModulationOrderUL (indicated by reference numeral 1970). If FeatureSets (or UE capability) is not given (or not configured) in operation 1960, $$v_{Layers}^{(j)} \text{ and } Q_m^{(j)}$$

are configured to be predetermined values, respectively (for example, $$v_{Layers}^{(j)} = 1, Q_m^{(j)} = 6)$$

(indicated by reference numeral 1980).

Figure 20A:
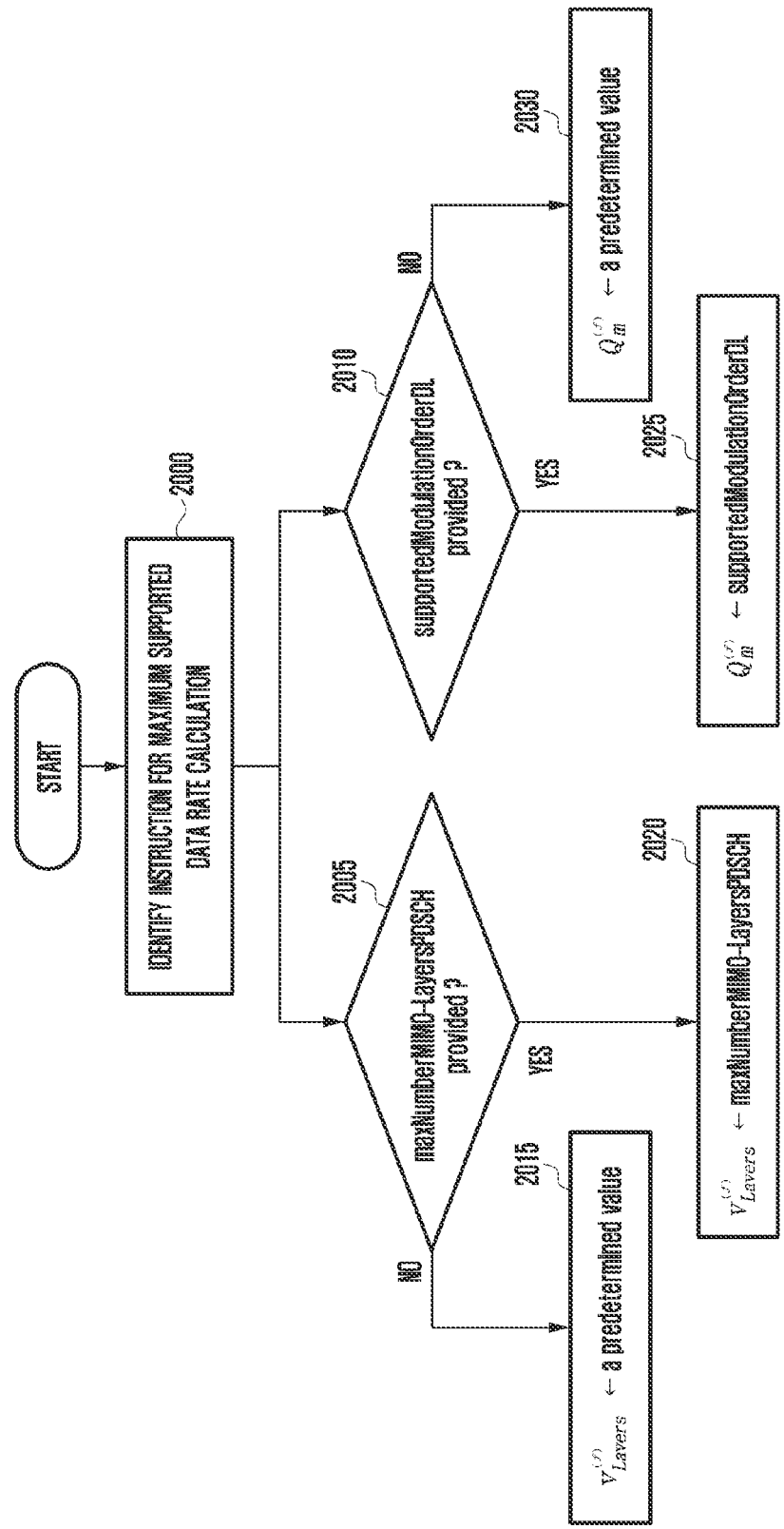
FIG. 20A illustrates a process of configuring a parameter for calculating a downlink maximum supported data rate according to an embodiment of the disclosure.
Figure 20B:
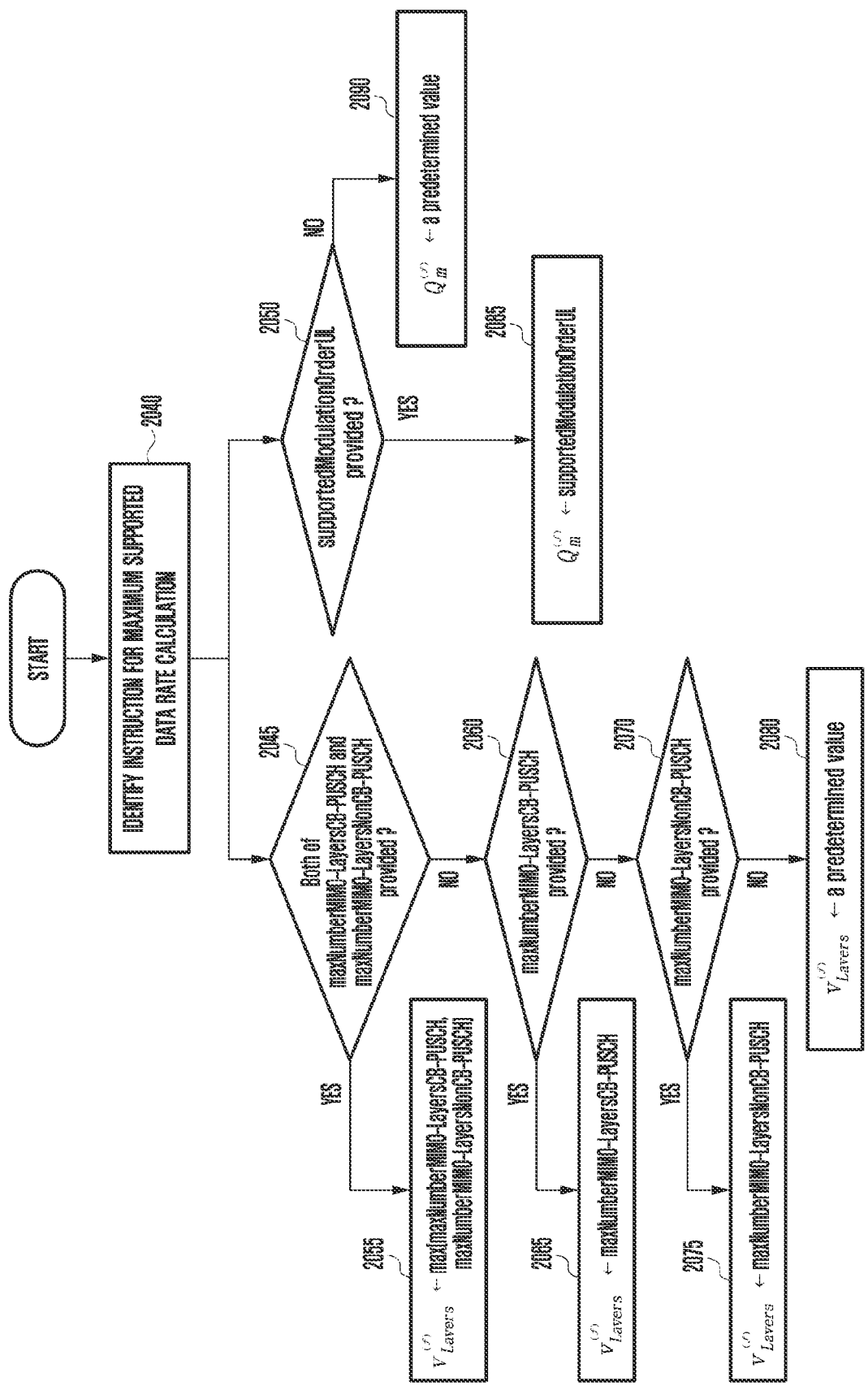
FIG. 20B illustrates a process of configuring a parameter for calculating a uplink maximum supported data rate according to an embodiment of the disclosure.

FIG. 20A shows an example of an operation diagram of [Parameter configuration B for calculation of the maximum supported data rate] according to an embodiment of the disclosure. FIG. 20B shows an example of an operation diagram of [Parameter configuration B for calculation of the maximum supported data rate] according to an embodiment of the disclosure.

Referring to FIGS. 20A and 20B, in order to calculate the maximum supported data rate, all parameters related to <Equation 1> may be obtained. However, in FIGS. 20A and 20B, for convenience, only $$v_{Layers}^{(j)} \text{ and } Q_m^{(j)}$$

among parameters are shown and configurations of other parameters are omitted.

FIG. 20A illustrates a process of determining values of downlink $$v_{Layers}^{(j)} \text{ and } Q_m^{(j)}$$

of a base station and a terminal. If an instruction for calculating a maximum supported data rate is transferred (indicated by reference numeral 2000), the base station or the terminal determines whether or not maxNumberMIMO-LayersPDSCH is given (indicated by reference numeral 2005). If it is determined that maxNumberMIMO-LayersPDSCH is given (or configured) in operation 2005, $$v_{Layers}^{(j)}$$

is configured to be the parameter maxNumberMIMO-LayersPDSCH (indicated by reference numeral 2020), and otherwise, $$v_{Layers}^{(j)}$$

is configured to be a predetermined value (for example, $$v_{Layers}^{(j)} = 1)$$

(indicated by reference numeral 2015). Similarly, the base station or the terminal determines whether supportedModulationOrderDL is given (or configured) (indicated by reference numeral 2010). If upportedModulationOrderDL is given in operation 2010, $$Q_m^{(j)}$$

is configured to be the parameter supportedModulationOrderDL (indicated by reference numeral 2025), otherwise $$Q_m^{(j)}$$

is configured to be a predetermined value (for example $$Q_m^{(j)} = 6)$$

(indicated by reference numeral 2030).

FIG. 20B illustrates a process of determining the values of uplink $$v_{Layers}^{(j)} \text{ and } Q_m^{(j)}$$

of a base station or a terminal. If an instruction for calculating the maximum supported data rate is transferred (indicated by reference numeral 2040), the base station and the terminal first determines whether the parameters maxNumberMIMO-LayersCB-PUSCH and maxNumberMIMO-LayersNonCB-PUSCH are both given (or configured) (indicated by reference numeral 2045). If two parameters are configured, the maximum value of the parameters maxNumberMIMO-LayersCB-PUSCH and maxNumberMIMO-LayersNonCB-PUSCH is determined to be $$v_{Layers}^{(j)}$$

(indicated by reference numeral 2055). If both parameters are not configured, a determination is made as to whether maxNumberMIMO-LayersCB-PUSCH is configured (indicated by reference numeral 2060). If maxNumberMIMO-LayersCB-PUSCH is configured, the maxNumberMIMO-LayersCB-PUSCH is configured to be $$v_{Layers}^{(j)}$$

(indicated by reference numeral 2065). If maxNumberMIMO-LayersCB-PUSCH is not configured, a determination is made as to whether maxNumberMIMO-LayersNonCB-PUSCH is configured (indicated by reference numeral 2070), and if maxNumberMIMO-LayersNonCB-PUSCH is configured, the maxNumberMIMO-LayersNonCB-PUSCH is configured to be $$v_{Layers}^{(j)}$$

(indicated by reference numeral 2075). If it is determined that maxNumberMIMO-LayersNonCB-PUSCH is not configured, then $$v_{Layers}^{(j)}$$

is configured to be a predetermined value (for example, $$v_{Layers}^{(j)} = 1)$$

(indicated by reference numeral 2080).

Similarly, the base station or the terminal first determines whether supportedModulationOrderUL is given (or configured) (indicated by reference numeral 2050). If the supportedModulationOrderUL is given (or configured), $$Q_m^{(j)}$$

is configured to be the parameter supportedModulationOrderUL (indicated by reference numeral 2085), otherwise $$Q_m^{(j)}$$

is configured to be a predetermined value (for example, $$Q_m^{(j)} = 6)$$

(indicated by reference numeral 2090).

In FIG. 20B, the order of operations 2060 and 2070 may be exchanged with each other, and accordingly, the order of operations 2065 and 2075 may be exchanged with each other.

Operations of FIGS. 19A, 19B, 20A, and 20B may be performed by the base station and the terminal, respectively.

Accordingly, the maximum data rate of the terminal according to the conditional statements can be calculated as follows. In the disclosure, the maximum data rate may also be expressed by an approximate data rate.

For NR, the approximate data rate for a given number of aggregated carriers in a band or band combination is computed as follows.

data rate (in *Mbps*) =

$$10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^\mu} \cdot (1 - OH^{(j)}) \right)$$

Wherein J is the number of aggregated component carriers in a band or band combination
$R_{max}$=948/1024
For the j-th cc, $$v_{Layers}^{(j)}$$

for downlink is the maximum number of supported layers given by higher layer parameter maxNumberMIMO-LayersPDSCH if that parameter is provided; otherwise, $$v_{Layers}^{(j)} = 1.$$

$$v_{Layers}^{(j)}$$

for uplink is the maximum number of supported layers given by
  maximum of higher layer parameters maxNumberMIMO-LayersCB-PUSCH and maxNumberMIMO-Layers-NonCB-PUSCH if both of those parameters are provided;
  the provided higher layer parameter between maxNumberMIMO-LayersCB-PUSCH and maxNumber-MIMO-LayersNonCB-PUSCH if only one of those parameters is provided;
  Otherwise $$v_{Layers}^{(j)} = 1.$$

$$Q_m^{(j)}$$

for downlink is the maximum supported modulation order given by higher layer parameter supportedModulationOrderDL if that parameter is provided; otherwise $$Q_m^{(j)} = 6.$$

$$Q_m^{(j)}$$

for uplink is the maximum supported modulation order given by higher layer parameter supportedModulationOrderUL if that parameter is provided; otherwise $$Q_m^{(j)} = 6.$$

$f^{(j)}$ is the scaling factor given by higher layer parameter scalingFactor and can take the values 1, 0.8, 0.75, and 0.4.

μ is the numerology (as defined in TS 38.211 [6])

$$T_s^\mu$$

is the average OFDM symbol duration in a subframe for numerology μ, i.e.

$$T_s^\mu = \frac{10^{-3}}{14 \cdot 2^\mu}.$$

Note that normal cyclic prefix is assumed.

$$N_{PRB}^{BW(j),\mu}$$

is the maximum RB allocation in bandwidth $BW^{(j)}$ with numerology, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
  0.14, for frequency range FR1 for DL
  0.18, for frequency range FR2 for DL
  0.08, for frequency range FR1 for UL
  0.10, for frequency range FR2 for UL NOTE: Only one of the UL or SUL carriers (the one with the higher data rate) is counted for a cell operating SUL.

The approximate maximum data rate can be computed as the maximum of the approximate data rates computed using the above formula for each of the supported band or band combinations.

In all the embodiments, if the higher layer parameters or signaling are not clearly defined, a method of configuring values thereof based on a predetermined method has been proposed, and the method can be realized through various methods. For example, in the twenty-fifth and twenty-sixth embodiments, if values of supportedModulationOrderDL or supportedModulationOrderUL are unclear or undefined, a method of configuring the values based on a predetermined value or rule is proposed, but it would be obvious that a similar or identical effect can be achieved by modifying the definition of the higher layer parameter or signaling.

For example, in the following, a parameter configuration method for calculating the maximum supported data rate is the same as before, and by modifying the definition of supportedModulationOrderDL or supportedModulationOrderUL, which is the higher layer parameter or signaling, a similar or identical effect to be supported by the disclosure can be achieved.

[Parameter Configuration to Calculate Maximum Supported Data Rate]

For NR, the approximate data rate for a given number of aggregated carriers in a band or band combination is computed as follows.

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot (1 - OH^{(j)}) \right)$$

Wherein J is the number of aggregated component carriers in a band or band combination $R_{max}$=948/1024

For the j-th cc, $$v_{Layers}^{(j)}$$

is the maximum number of supported layers given by higher layer parameter maxNumberMIMO-LayersPDSCH for downlink and maximum of higher layer parameters maxNumberMIMO-LayersCB-PUSCH and maxNumberMIMO-LayersNonCB-PUSCH for uplink.

$$Q_m^{(j)}$$

is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

μ is the numerology (as defined in TS 38.211 [6])

$$T_s^{\mu}$$

is the average OFDM symbol duration in a subframe for numerology μ, i.e.

$$T_s^{\mu} = \frac{10^{-3}}{14 \cdot 2^{\mu}}.$$

Note that normal cyclic prefix is assumed.

$$N_{PRB}^{BW(j),\mu}$$

is the maximum RB allocation in bandwidth with numerology μ, as defined in 5.3 TS 38.101-1 [2] and 5.3 TS 38.101-2 [3], where $BW^{(j)}$ is the UE supported maximum bandwidth in the given band or band combination.

$OH^{(j)}$ is the overhead and takes the following values
0.14, for frequency range FR1 for DL
0.18, for frequency range FR2 for DL
0.08, for frequency range FR1 for UL
0.10, for frequency range FR2 for UL NOTE: Only one of the UL or SUL carriers (the one with the higher data rate) is counted for a cell operating SUL.

The approximate maximum data rate can be computed as the maximum of the approximate data rates computed using the above formula for each of the supported band or band combinations.

Here, supportedModulationOrderDL and supportedModulationOrderUL applied to the calculation may be redefined as follows.

supportedModulationOrderDL

Indicates the maximum supported modulation order to be applied for downlink in the carrier in the max data rate calculation. The network may use a modulation order on this serving cell which is higher than the value indicated in this field as long as UE supports the modulation of higher value for downlink.

If this field is absent, the maximum supported modulation order to be applied for downlink in the carrier in the max data rate calculation is given by the maximum modulation order that UE supports for downlink.

In the supportedModulationOrderDL, if the value of supportedModulationOrderDL is not configured, the maximum supported modulation order applied for calculating the maximum data rate is defined as the maximum modulation order supported by a UE, but is not limited thereto and may be defined through another rule. For example, another predetermined specific integer may be configured or different values or different rules may be applied depending on a band, FR1, or FR2.

supportedModulationOrderUL

Indicates the maximum supported modulation order to be applied for uplink in the carrier in the max data rate calculation. The network may use a modulation order on this serving cell which is higher than the value indicated in this field as long as UE supports the modulation of higher value for uplink.

If this field is absent, the maximum supported modulation order to be applied for uplink in the carrier in the max data rate calculation is given by the maximum modulation order that UE supports for uplink.

In the supportedModulationOrderUL, if the value of the supportedModulationOrderUL is not configured, the maximum supported modulation order applied for calculation of the maximum data rate is defined as the maximum modulation order supported by a UE, but it is not limited thereto and it is obvious that it may be defined through other rules. For example, it is obvious that another predetermined specific integer may be configured or different values or different rules may be applied depending on a band, FR1, or FR2.

For example, supportedModulationOrderDL and supportedModulationOrderUL may be redefined, as follows.

supportedModulationOrderDL

Indicates the maximum supported modulation order to be applied for downlink in the carrier in the max data rate calculation. The network may use a modulation order on this serving cell which is higher than the value indicated in this field as long as UE supports the modulation of higher value for downlink.

If this field is absent, supportedModulationOrderDL=8 is applied if pdsch-256QAM-FR1 is set to supported in FR1 or pdsch-256QAM-FR2 is set to supported in FR2 and, otherwise, supportedModulationOrderDL=8 is applied.

supportedModulationOrderUL

Indicates the maximum supported modulation order to be applied for uplink in the carrier in the max data rate calculation. The network may use a modulation order on this serving cell which is higher than the value indicated in this field as long as UE supports the modulation of higher value for uplink.

If this field is absent, supportedModulationOrderUL=8 is applied if pusch-256QAM is set to supported and, otherwise, supportedModulationOrderUL=8 is applied.

As another example, supportedModulationOrderDL and supportedModulationOrderUL may be redefined, as follows.
supportedModulationOrderDL Indicates the maximum supported modulation order to be applied for downlink in the carrier in the max data rate calculation. The network may use a modulation order on this serving cell which is higher than the value indicated in this field as long as UE supports the modulation of higher value for downlink.

If this field is absent, supportedModulationOrderDL=8 is applied if the UE supports 256 QAM and, otherwise, supportedModulationOrderDL=8 is applied.
supportedModulationOrderUL Indicates the maximum supported modulation order to be applied for uplink in the carrier in the max data rate calculation. The network may use a modulation order on this serving cell which is higher than the value indicated in this field as long as UE supports the modulation of higher value for uplink.

If this field is absent, supportedModulationOrderUL=8 is applied if the UE supports 256 QAM and, otherwise, supportedModulationOrderUL=8 is applied.

In addition, in some embodiments related to LBRM, if the higher layer signaling (or parameter) maxNumberMIMO-LayersCB-PUSCH and maxNumberMIMO-LayersNonCB-PUSCH are configured at the same time, provided is an example of determining the value of X, based on the maximum value among the two values, but it is not necessarily limited thereto, and more diverse rules may be applied thereto. For example, even if higher layer signaling (or parameter) maxNumberMIMO-LayersCB-PUSCH and maxNumberMIMO-LayersNonCB-PUSCH are configured at the same time, the value of X is differently configured based on txConfig information included in the PUSCH-Config among system information. The PUSCH-Config information includes txConfig information as follows, and definition thereof is as follows:
PUSCH-Config::=SEQUENCE {
. . .
txConfig=ENUMERATED {codebook, nonCodebook}
. . .
[txConfig definition]

Whether UE uses codebook based or non-codebook based transmission. If the field is absent, the UE transmits PUSCH on one antenna port.

In the TBS_LBRM calculation, the value of X may be determined according to configuration of the txConfig. As an example, if a value of txConfig is codebook, X may be configured to be maxNumberMIMO-LayersCB-PUSCH, or if the value of txConfig value is nonCodebook, X may be configured to be maxNumberMIMO-LayersNonCB-PUSCH. It goes without saying that various embodiments may be applied without being limited thereto.

Figure 21:
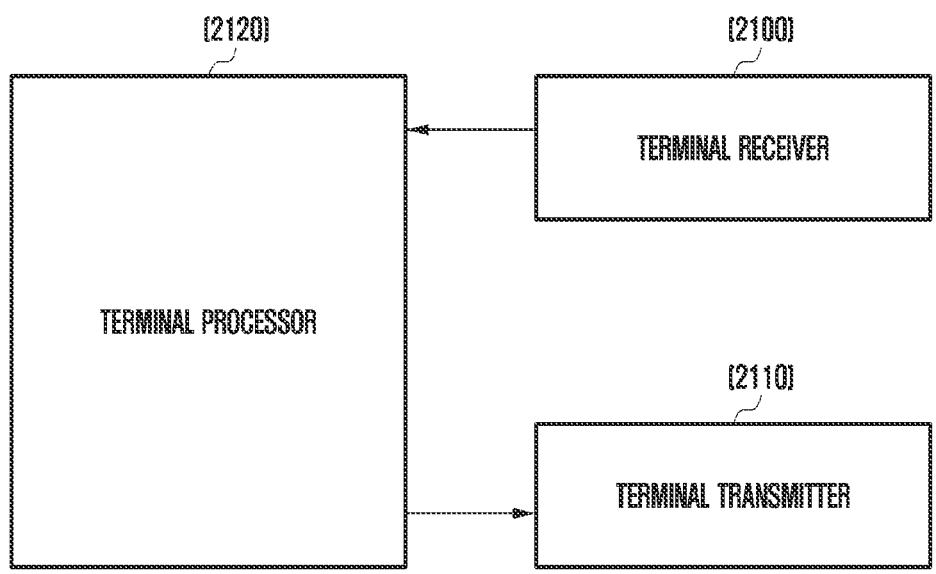
FIG. 21 is a block diagram of a terminal according to an embodiment of the disclosure.
Figure 22:
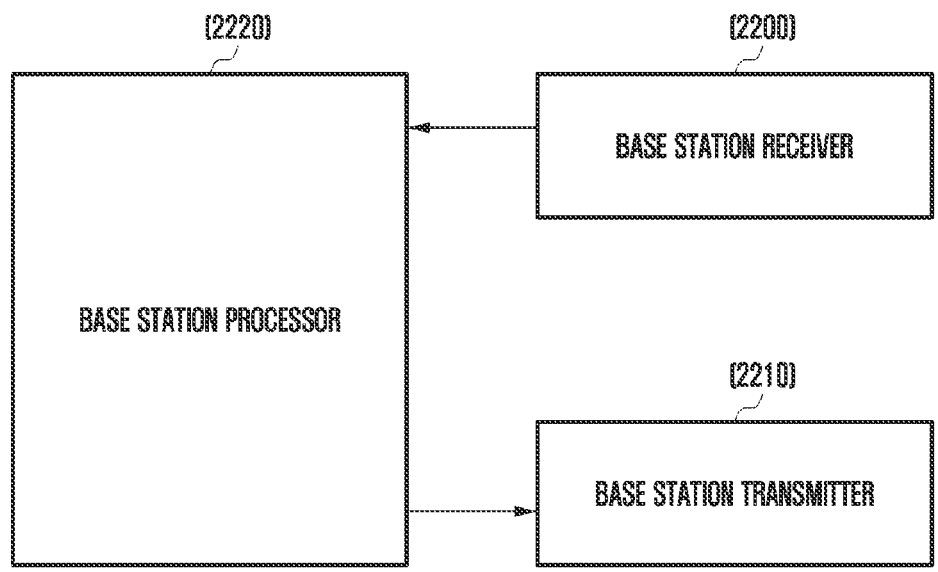
FIG. 22 is a block diagram of a base station according to an embodiment of the disclosure.

FIGS. 21 and 22 each illustrate a transmitter, a receiver, and a processor of a terminal and a base station for performing embodiments. In order to calculate an actual data rate and perform a transmission/reception method according to the disclosure, the receiver, the processor, and the transmitter of the base station and the terminal may operate according to the above-described embodiments.

FIG. 21 is a block diagram of a terminal according to an embodiment of the disclosure.

Referring to FIG. 21, a terminal of the disclosure may include a terminal receiver 2100, a terminal transmitter 2110, and a terminal processor 2120. In the disclosure, the terminal receiver 2100 and the terminal transmitter 2110 may be collectively referred to as a transceiver. The transceiver may transmit or receive a signal to or from a base station. The signal may include control information and data. To this end, the transceiver may include an RF transmitter for up-converting and amplifying a frequency of the transmitted signal, and an RF receiver for low-noise amplifying the received signal and down-converting a frequency of the received signal.

Further, the transceiver may receive a signal through a wireless channel, output the signal to the terminal processor 2120, and transmit the signal output from the terminal processor 2120 through a wireless channel. The terminal processor 2120 may control a series of processes such that the terminal may operate according to the above-described embodiment. For example, the terminal receiver 2100 receives data and control information including scheduling information for data transmission from the base station, and the terminal processor 2120 may compare a peak data rate and a scheduled data amount of the terminal and determine whether to decode and transmit the same, and perform signal processing according thereto. Thereafter, signals that need to be transmitted by the terminal transmitter 2110 may be transmitted to the base station.

FIG. 22 is a block diagram of a base station according to an embodiment of the disclosure.

Referring to FIG. 22, a base station of the disclosure may include a base station receiver 2200, a base station transmitter 2210, and a base station processor 2220. In the disclosure, the base station receiver 2200 and the base station transmitter 2210 may be collectively referred to as a transceiver. The transceiver may transmit or receive a signal to or from a terminal. The signal may include control information and data. To this end, the transceiver may include an RF transmitter for up-converting and amplifying a frequency of the transmitted signal, and an RF receiver for low-noise amplifying the received signal and down-converting a frequency of the received signal. Further, the transceiver may receive a signal through a wireless channel, output the signal to the base station processor 2220, and transmit the signal output from the base station processor 2220 through a wireless channel.

The base station processor 2220 may control a series of processes such that the base station may operate according to the above-described embodiment. For example, the base station processor 2220 may calculate a peak data rate of the terminal, determine TBS within a range not exceeding the peak data rate, and schedule the TBS so as to generate control information.

Thereafter, the control information generated by the base station transmitter 2210 may be transmitted, and the base station receiver 2200 may receive an uplink data signal and feedback of the terminal.

On the other hand, embodiments disclosed in the specification and drawings are merely presented as specific examples to easily explain the technical contents of the disclosure and help understanding of the disclosure, and are not intended to limit the scope of the disclosure. It will be apparent to those skilled in the art belonging to the disclosure that other modifications based on the technical idea of the disclosure may be implemented. In addition, each of the above embodiments may be combined with each other, as necessary, and operate. For example, it may be possible to apply the first embodiment and the second embodiment in combination, or it may be possible to apply a combination of a part of the first embodiment and a part of the second embodiment. In addition, the above embodiments may be implemented in other modifications based on the technical spirit of the embodiment, such as LTE system and 5G system.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a communication system, the method comprising:
    transmitting, to a terminal, configuration information for a plurality of bandwidth parts (BWPs), wherein configuration on each of the plurality of BWPs indicates a type of a modulation and coding scheme (MCS) table for a physical downlink shared channel (PDSCH) in each BWP;
    identifying a downlink limited buffer rate matching (LBRM) is applied;
    identifying a length of a circular buffer $N_{cb}$ based on an LBRM transport block size (TBS); and
    transmitting, to the terminal, downlink data on the PDSCH based on the length of circular buffer $N_{cb}$,
    wherein the LBRM TBS is identified based on a temporary number of information bits $N_{info}$,
    wherein the temporary number of information bits $N_{info}$ corresponds to $N_{RE} \cdot R \cdot Q_m \cdot v$, where NRE is a number of resource elements for the PDSCH, R is a code rate for the PDSCH, $Q_m$ is a maximum modulation order for the PDSCH and v is a maximum number of layers for one transport block for the PDSCH, and
    wherein, in case that at least one type of the MCS table indicated by the configuration information corresponds to qam256, the maximum modulation order for the PDSCH $Q_m$ is 8.

2. The method of claim 1, wherein, in case that all types of the MCS table indicated by the configuration information do not correspond to qam256, the maximum modulation order for the PDSCH $Q_m$ is 6.

3. The method of claim 1,
    wherein the maximum number of layers for one transport block for the PDSCH v corresponds to minimum of X and 4, and
    wherein the X corresponds to information on maximum multi-input multi-output (MIMO) layers for the PDSCH, in case that the information on MIMO layers for the PDSCH is configured.

4. The method of claim 3, wherein the X corresponds to a maximum number of layers for the PDSCH supported by the terminal, in case that the information on MIMO layers for the PDSCH is not configured.

5. The method of claim 1, wherein the PDSCH is associated with a downlink shared channel (DL-SCH) or a paging channel (PCH).

6. A method performed by a terminal in a communication system, the method comprising:
    receiving, from a base station, configuration information for a plurality of bandwidth parts (BWPs), wherein configuration on each of the plurality of BWPs indi-
    cates a type of a modulation and coding scheme (MCS) table for a physical downlink shared channel (PDSCH) in each BWP;
    identifying a downlink limited buffer rate matching (LBRM) is applied;
    identifying a length of circular buffer $N_{cb}$ based on an LBRM transport block size (TBS); and
    receiving, from the base station, downlink data on the PDSCH based on the length of circular buffer $N_{cb}$,
    wherein the LBRM TBS is identified based on a temporary number of information bits $N_{info}$,
    wherein the temporary number of information bits $N_{info}$ corresponds to $N_{RE} \cdot R \cdot Q_m \cdot v$, where NRE is a number of resource elements for the PDSCH, R is a code rate for the PDSCH, $Q_m$ is a maximum modulation order for the PDSCH, and v is a maximum number of layers for one transport block for the PDSCH, and
    wherein, in case that at least one type of the MCS table indicated by the configuration information corresponds to qam256, the maximum modulation order for the PDSCH $Q_m$ is 8.

7. The method of claim 6, wherein, in case that all types of the MCS table indicated by the configuration information do not correspond to qam256, the maximum modulation order for the PDSCH $Q_m$ is 6.

8. The method of claim 6,
    wherein the maximum number of layers for one transport block for the PDSCH v corresponds to minimum of X and 4, and
    wherein the X is given by information on maximum multi-input multi-output (MIMO) layers for the PDSCH, in case that the information on MIMO layers for the PDSCH is configured.

9. The method of claim 8, wherein the X corresponds to a maximum number of layers for the PDSCH supported by the terminal, in case that the information on MIMO layers for the PDSCH is not configured.

10. The method of claim 6, wherein the PDSCH is associated with a downlink shared channel (DL-SCH) or a paging channel (PCH).

11. A base station in a communication system, the base station comprising:
    a transceiver; and
    a controller coupled with the transceiver and configured to:
        transmit, to a terminal, configuration information for a plurality of bandwidth parts (BWPs), wherein configuration on each of the plurality of BWPs indicates a type of a modulation and coding scheme (MCS) table for a physical downlink shared channel (PDSCH) in each BWP,
        identify a downlink limited buffer rate matching (LBRM) is applied,
        identify a length of circular buffer $N_{cb}$ based on an LBRM transport block size (TBS), and
        transmit, to the terminal, downlink data on the PDSCH based on the length of circular buffer $N_{cb}$,
    wherein the LBRM TBS is identified based on a temporary number of information bits $N_{info}$,
    wherein the temporary number of information bits $N_{info}$ corresponds to $N_{RE} \cdot R \cdot Q_m \cdot v$, where NRE is a number of resource elements for the PDSCH, R is a code rate for the PDSCH, $Q_m$ is a maximum modulation order for the PDSCH, and v is a maximum number of layers for one transport block for the PDSCH, and wherein, in case that at least one type of the MCS table indicated by the configuration information corresponds to qam256, the maximum modulation order for the PDSCH $Q_m$ is 8.

12. The base station of claim 11, wherein, in case that all types of the MCS table indicated by the configuration information do not correspond to qam256, the maximum modulation order for the PDSCH $Q_m$ is 6.

13. The base station of claim 11,
wherein the maximum number of layers for one transport block for the PDSCH ν corresponds to minimum of X and 4, and
wherein the X corresponds to information on maximum multi-input multi-output (MIMO) layers for the PDSCH, in case that the information on MIMO layers for the PDSCH is configured.

14. The base station of claim 13, wherein the X corresponds to a maximum number of layers for the PDSCH supported by the terminal, in case that the information on MIMO layers for the PDSCH is not configured.

15. The base station of claim 11, wherein the PDSCH is associated with a downlink shared channel (DL-SCH) or a paging channel (PCH).

16. A terminal in a communication system, the terminal comprising:
a transceiver; and
a controller coupled with the transceiver and configured to:
receive, from a base station, configuration information for a plurality of bandwidth parts (BWPs), wherein configuration on each of the plurality of BWPs indicates a type of a modulation and coding scheme (MCS) table for a physical downlink shared channel (PDSCH) in each BWP,
identify a downlink limited buffer rate matching (LBRM) is applied,
identify a length of circular buffer $N_{cb}$ based on an LBRM transport block size (TBS), and
receive, from the base station, downlink data on the PDSCH based on the length of circular buffer $N_{cb}$,
wherein the LBRM TBS is identified based on a temporary number of information bits $N_{info}$,
wherein the temporary number of information bits $N_{info}$ corresponds to $N_{RE} \cdot R \cdot Q_m \cdot v$, where NRE is a number of resource elements for the PDSCH, R is a code rate for the PDSCH, $Q_m$ is a maximum modulation order for the PDSCH, and ν is a maximum number of layers for one transport block for the PDSCH, and
wherein, in case that at least one type of the MCS table indicated by the configuration information corresponds to qam256, the maximum modulation order for the PDSCH $Q_m$ is 8.

17. The terminal of claim 16, wherein, in case that all types of the MCS table indicated by the configuration information do not correspond to qam256, the maximum modulation order for the PDSCH $Q_m$ is 6.

18. The terminal of claim 16,
wherein the maximum number of layers for one transport block for the PDSCH ν corresponds to minimum of X and 4, and
wherein the X is given by information on maximum multi-input multi-output (MIMO) layers for the PDSCH, in case that the information on MIMO layers for the PDSCH is configured.

19. The terminal of claim 18, wherein the X corresponds to a maximum number of layers for the PDSCH supported by the terminal, in case that the information on MIMO layers for the PDSCH is not configured.

20. The terminal of claim 16, wherein the PDSCH is associated with a downlink shared channel (DL-SCH) or a paging channel (PCH).

* * * * *